US012604810B2

(12) United States Patent
Babler et al.

(10) Patent No.: US 12,604,810 B2
(45) Date of Patent: Apr. 21, 2026

(54) SYSTEMS, APPARATUS, AND RELATED METHODS FOR USE WITH MERGERS

(71) Applicant: KUHN NORTH AMERICA, INC., Brodhead, WI (US)

(72) Inventors: Damion D. Babler, Albany, WI (US); Dana E. Redman, Orfordville, WI (US); Dennis Williams, Albany, WI (US); Reid L. Christ, Evansville, WI (US); Thomas J. Hoffman, Sun Prairie, WI (US); Timothy G. Osterhaus, Stoughton, WI (US); William J. Bassett, Brodhead, WI (US)

(73) Assignee: KUHN NORTH AMERICA, INC., Brodhead, WI (US)

( * ) Notice: Subject to any disclaimer, the term of this patent is extended or adjusted under 35 U.S.C. 154(b) by 0 days.

(21) Appl. No.: 18/758,355

(22) Filed: Jun. 28, 2024

(65) Prior Publication Data

US 2024/0349651 A1 Oct. 24, 2024

Related U.S. Application Data

(63) Continuation of application No. 16/541,704, filed on Aug. 15, 2019, now Pat. No. 12,063,892.

(51) Int. Cl.
*A01D 89/00* (2006.01)
*A01D 84/00* (2006.01)

(52) U.S. Cl.
CPC ......... *A01D 89/008* (2013.01); *A01D 89/002* (2013.01); *A01D 84/00* (2013.01)

(58) Field of Classification Search
CPC .................................................... A01D 89/008
See application file for complete search history.

(56) References Cited

U.S. PATENT DOCUMENTS

| | | | | |
|---|---|---|---|---|
| 3,924,391 A | * | 12/1975 | Cheatum | ................. A01F 15/08 |
| | | | | 56/364 |
| 4,411,127 A | | 10/1983 | Diederich | |
| 5,450,717 A | * | 9/1995 | Delperdang | ........... A01D 84/00 |
| | | | | 56/366 |
| 6,295,797 B1 | | 10/2001 | Naaktgeboren | |
| 7,062,368 B2 | * | 6/2006 | Ho | ..................... A01D 41/1274 |
| | | | | 56/10.2 G |
| 7,650,736 B1 | | 1/2010 | Salley | |
| 7,823,371 B2 | | 11/2010 | Gantzer | |

(Continued)

FOREIGN PATENT DOCUMENTS

| | | | | |
|---|---|---|---|---|
| CH | 711210 B1 | * | 12/2016 | ............. A01D 84/00 |
| DE | 10234302 A1 | | 2/2004 | |

(Continued)

*Primary Examiner* — Alicia Torres
(74) *Attorney, Agent, or Firm* — Oblon, McClelland, Maier & Neustadt, L.L.P.

(57) ABSTRACT

An agricultural machine includes: a pickup configured to pick up material from a ground; a conveyor configured to eject the material provided thereon by the pickup; a wind guard configured to change a trajectory of the material from the pickup to the conveyor; a wind guard actuator operatively coupled to the wind guard; and a controller configured to control the wind guard actuator to adjust a position of the wind guard to adjust a distribution of the material relative to the conveyor.

11 Claims, 20 Drawing Sheets

(56)          References Cited

U.S. PATENT DOCUMENTS

| | | | | |
|---|---|---|---|---|
| 7,861,506 | B2 * | 1/2011 | Humbert | A01D 89/008 |
| | | | | 100/88 |
| 8,109,070 | B1 | 2/2012 | Schmidt | |
| 9,192,102 | B2 | 11/2015 | Gantzer | |
| 9,521,807 | B2 * | 12/2016 | Ubaldi | A01D 89/008 |
| 2006/0277889 | A1 * | 12/2006 | Sheedy | A01D 89/008 |
| | | | | 56/364 |
| 2007/0119140 | A1 * | 5/2007 | Gette | A01D 89/008 |
| | | | | 56/364 |
| 2010/0242427 | A1 | 9/2010 | Anstey | |
| 2014/0250855 | A1 * | 9/2014 | Vandamme | A01D 89/008 |
| | | | | 56/379 |
| 2017/0303471 | A1 | 10/2017 | Williams | |

FOREIGN PATENT DOCUMENTS

| | | | |
|---|---|---|---|
| EP | 3 238 525 | A1 | 11/2017 |
| WO | 2020/242303 | A1 | 12/2020 |

* cited by examiner

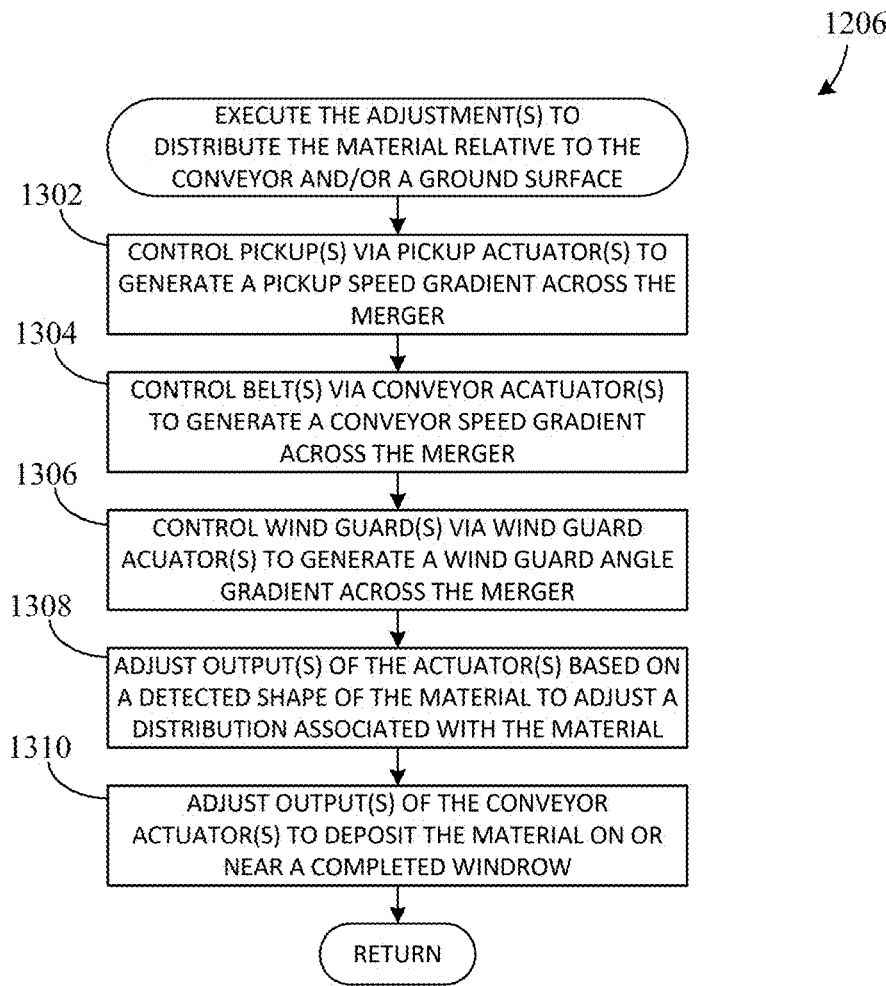

1206

EXECUTE THE ADJUSTMENT(S) TO DISTRIBUTE THE MATERIAL RELATIVE TO THE CONVEYOR AND/OR A GROUND SURFACE

1302

CONTROL PICKUP(S) VIA PICKUP ACTUATOR(S) TO GENERATE A PICKUP SPEED GRADIENT ACROSS THE MERGER

1304

CONTROL BELT(S) VIA CONVEYOR ACATUATOR(S) TO GENERATE A CONVEYOR SPEED GRADIENT ACROSS THE MERGER

1306

CONTROL WIND GUARD(S) VIA WIND GUARD ACUATOR(S) TO GENERATE A WIND GUARD ANGLE GRADIENT ACROSS THE MERGER

1308

ADJUST OUTPUT(S) OF THE ACTUATOR(S) BASED ON A DETECTED SHAPE OF THE MATERIAL TO ADJUST A DISTRIBUTION ASSOCIATED WITH THE MATERIAL

1310

ADJUST OUTPUT(S) OF THE CONVEYOR ACTUATOR(S) TO DEPOSIT THE MATERIAL ON OR NEAR A COMPLETED WINDROW

RETURN

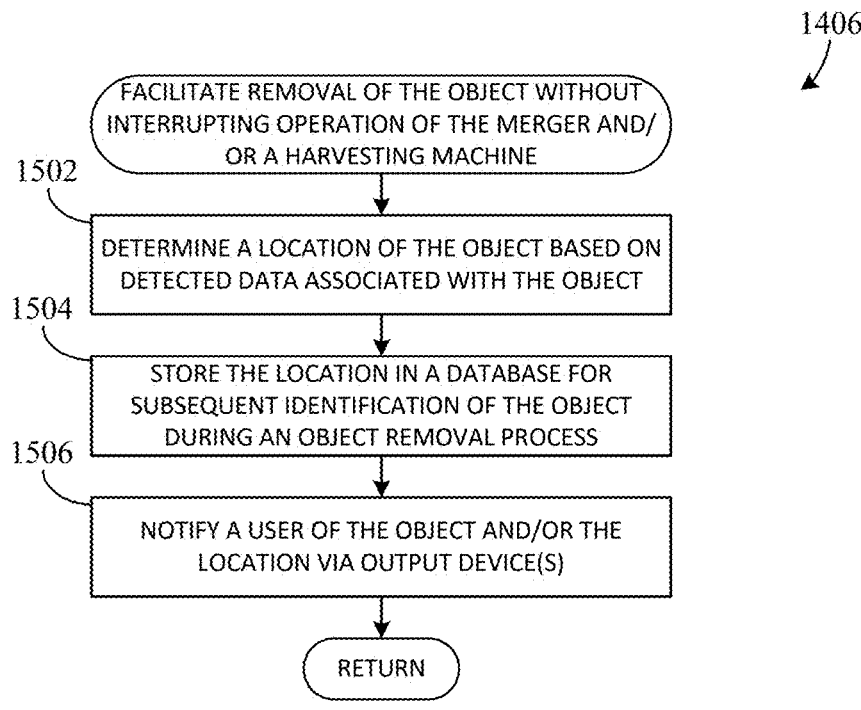

1502

FACILITATE REMOVAL OF THE OBJECT WITHOUT INTERRUPTING OPERATION OF THE MERGER AND/OR A HARVESTING MACHINE

1504

DETERMINE A LOCATION OF THE OBJECT BASED ON DETECTED DATA ASSOCIATED WITH THE OBJECT

1506

STORE THE LOCATION IN A DATABASE FOR SUBSEQUENT IDENTIFICATION OF THE OBJECT DURING AN OBJECT REMOVAL PROCESS

NOTIFY A USER OF THE OBJECT AND/OR THE LOCATION VIA OUTPUT DEVICE(S)

RETURN

FIG. 15

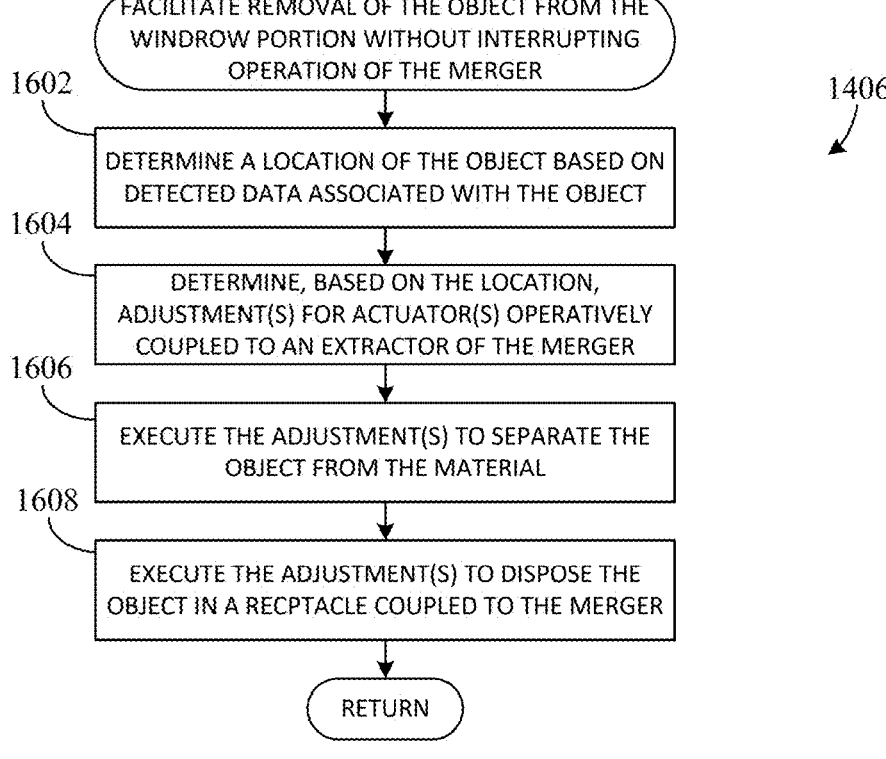

1406

1602 — FACILITATE REMOVAL OF THE OBJECT FROM THE WINDROW PORTION WITHOUT INTERRUPTING OPERATION OF THE MERGER

1604 — DETERMINE A LOCATION OF THE OBJECT BASED ON DETECTED DATA ASSOCIATED WITH THE OBJECT

1606 — DETERMINE, BASED ON THE LOCATION, ADJUSTMENT(S) FOR ACTUATOR(S) OPERATIVELY COUPLED TO AN EXTRACTOR OF THE MERGER

1608 — EXECUTE THE ADJUSTMENT(S) TO SEPARATE THE OBJECT FROM THE MATERIAL

EXECUTE THE ADJUSTMENT(S) TO DISPOSE THE OBJECT IN A RECPTACLE COUPLED TO THE MERGER

RETURN

FIG. 16

SYSTEMS, APPARATUS, AND RELATED METHODS FOR USE WITH MERGERS

CROSS-REFERENCE TO RELATED APPLICATIONS

This application is a continuation of U.S. application Ser. No. 16/541,704 filed Aug. 15, 2019, the entire contents of which is incorporated herein by reference.

BACKGROUND

Field of the Disclosure

The present disclosure relates to agricultural equipment for harvesting. More precisely, the present application relates to mergers that may be used to pick up material, e.g., crops, from a ground surface, e.g., a field, and to distribute the material laterally to form at least one windrow on the ground surface that may later be collected.

Description of the Related Art

The most complex and expensive piece of equipment for harvesting forages is generally accepted to be the forage chopper. This machine can cost hundreds of dollars an hour to operate and therefore it is desired to use this machine as efficiently as possible. Driving back and forth in a large field utilizing a small portion of the chopping capacity is very inefficient so a machine to pick-up and gather multiple small windrows from a ground surface to form one larger windrow was created to reduce the time in the field for the forage chopper.

For this task, assemblies of several mergers placed side by side are typically used. These mergers are configured to collect material with the use of a pickup and distribute the materials to one or both sides with the use of rotating belt(s). In this assembly of mergers, the belts and pickups of all the merger assemblies rotate at substantially equal speed.

Although such assemblies of mergers are widely used they present important drawbacks. As the material moves along the length of the belt, more material is continuously added to the belt surface. This can eventually lead to the belt becoming full and no longer allowing material onto the belt due to a lack of space, leading to plugging of the machine.

To increase the carrying capacity of the belt some mergers utilize a wider belt to carry more material. This solution is limited because the material fails to utilize the portion of the belt further from the pickup of the merger assembly. This increase in belt width also increases the cost and weight of the merger assembly. Increases in weight are detrimental due to compaction of the ground below the machine. Other mergers tilt the belt away from the pickup to entice material to travel to the back of the belt relative to the direction of travel as can be seen in Schneider et al. (U.S. Pat. No. 3,518,819). This modification, however, reduces the ground clearance for discharging the material and therefore becomes another capacity-limiting factor as the discharged material piles up and cannot be discharged from the belts.

Another drawback of the current merger assemblies are that they can introduce foreign objects such as rocks, metal, dirt clumps, etc. into the windrow. These foreign objects are then processed by the forage chopper which can cause significant damage to the blades of the forage chopper requiring costly repairs. Even if the chopper does utilize a metal detection system, such as the one described by Johnson (U.S. Pat. No. 5,504,428), a great deal of time is required to stop the machine and find the detected object within the large windrow of gathered material. At the same time, the rotation of trucks or trailers that are hauling the material away from the chopper, come to a halt. Now many machines and operators are idle while the problem is investigated.

A further hindrance to efficiency is the varying properties of the material being harvested by the chopper. Excessive moisture can compromise the quality of the material when placed into storage. If the chopper operator experiences moistures that are too high, they may be forced to move within the field, or even to a different field, looking for drier material to optimize feed quality. Conversely if the material gets too dry, the quality of the feed is also diminished. Therefore, the operator would traverse the field trying to find material of higher moisture content to blend the dry material with to achieve a desired average moisture content.

Accordingly, an assembly of mergers with increased functional belt capacity, the ability to incorporate sensors and software to limit the downtime of the following operations by forming even windrows, free of foreign objects, as well as the ability to monitor and record the parameters and position of the material being deposited, without some of the adverse effects on cost and weight mentioned above is desired.

SUMMARY

Accordingly, the object of the present disclosure is to provide an assembly of mergers or a single merger with increased functional belt capacity and reduced downtime which overcome the above-mentioned limitations of cost and weight.

Examples of the present disclosure ensure increased capacity by utilizing particular control measures. A first method of increasing the capacity of the belts includes increasing speeds of respective belts of subsequent merger assemblies along the length of the merger in a direction a material is being discharged. This increases the belt capacity by increasing the surface area per unit of time available to move material toward the discharge. Progressively increasing the speed of subsequent ones of belts increases the theoretical capacity of the merger in the direction of discharge, which is ideal as material is continually added along the length of the belts. It also overcomes the challenge of accelerating the material by gradually increasing the speed of the material and then using the accelerated material to catch and move the further material being added.

Another embodiment of the present invention includes varying rotational speeds of respective pickups along the length of the merger. In such examples, each pickup rotates at a slower speed along the length of the pickup towards the direction that the material is being discharged. Such a reduction in rotational speed allows a furthest pickup from the discharge to throw the material all the way to the back of the belt and a pickup nearest the discharge to deposit material closest to the front of the belt in the direction of travel more fully utilizing the available belt surface. The reduction in rotational speed also allows for reduced wear on the pickup components and improved feed quality by running the pickup nearest the discharge at a slower rotational speed than would be necessary if they all ran at the same speed. All the pickups running the same speed would throw the material to the back of the belt, however imparting unnecessary energy into the material increases leaf loss reducing feed quality.

A further embodiment of the current invention includes varying the position of the wind-guard to, in turn, vary the position where the material lands on the belt. If the wind-guard is tilted forward, the trajectory of the material coming off the pickup is higher allowing the material to travel to the back of the belt. Contrarily, if the wind-guard is tilted back, the trajectory is lower and the material is deposited further forward on the belt, relative to the direction of travel.

All of the aforementioned adjustments and control sequences can be programed into a control box. The control box varies the rotational speeds and wind-guard angle or rotational speeds or wind-guard angle when the desired manner of deposition, such as half to each side, all to one side, or anything in between, is selected.

An additional embodiment of the current invention incorporates sensors such as a sensor of a Light Detection and Ranging (LiDAR) instrument (sometimes referred to as a LiDAR sensor) or similar sensors to measure the shape of the windrow on the belt, or being discharged from the belt, to determine the distribution of the material on the surface of the belt. In such examples, based on this feedback, an example control system makes decisions on, for example, adjustments for one or more of a wind-guard angle, a pick-up speed, and/or a belt speed to improve distribution of material on the belt and more efficiently utilize the belt surface, allowing for faster working speeds and a more uniform windrow.

Another embodiment of the invention includes a sensor for observing the windrow at or near the discharge of the conveyor and measuring further parameters beyond shape, including moisture, density, volume, and further constituents such as fat, protein, sugar, fiber content, etc. A sensor that measures reflectance of light such as a near-infrared sensor can determine the properties of the material within the windrow. This constituent data can be recorded and ana-lyzed. Based on the analysis of the data, the operator or the software can make decisions on when and/or how to harvest the windrows. For example, if edges of a field are signifi-cantly higher in moisture, the operator or the software may choose to harvest the center of the field first giving the outside of the field further time to dry.

A further aspect of the current invention involves the incorporation of a sensor using induction or other similar method to detect the presence of metallic objects. Detecting the presence of metallic objects and marking their locations using either physical markers (e.g. paint, powder, windrow displacement, etc.) or GPS technology, allows for the removal of objects from the windrow prior to the subsequent chopping operation. Removing these metallic objects pre-vents damage to the blades of the chopper and avoids needing the chopper operator to find the object once detected by the chopper sensor.

A yet further aspect of the current invention involves the incorporation of a sensor utilizing dual-energy x-ray absorp-tiometry or a similar technology capable of distinguishing differences in density can determine the presence of foreign objects, such as stones, metal, plastics, etc., within the windrow. This sensor includes a receiver that measures a pass-through signal to map the windrow. The identification and marking of foreign objects allows the operator to remove the object prior to the subsequent chopping opera-tion, avoiding costly downtime. The location of the objects is marked, or recorded in a database that can be accessed later, to find the position of the foreign objects.

A further embodiment of the invention includes any further known sensor technologies including but not limited to radio frequency, microwave and ultrasound.

A further embodiment of the invention includes a first one of the disclosed sensors next to a second one of the disclosed sensors that measures the same parameters a second time to limit the likelihood of false readings. The sensor and receiver may reside on different planes so that the penetra-tion of the signal through the windrow is at a different orientation, improving the accuracy of detecting foreign objects.

The aforementioned sensors may be located at a first end of the merger assembly. A further sensor(s) may be located at a second end of the merger assembly. These sensors simultaneously map the locations of foreign objects.

A further embodiment of the invention includes an object extractor. The object extractor may include a moveable device that physically removes the object or a portion of the windrow including the object from the remaining material.

In one embodiment, the object extractor is a grabbing device that can grab and displace the object or a portion of the windrow including the object.

In a further embodiment, the object extractor is a magnet.

In a further embodiment, the object extractor is a dis-placement system that moves the portion of the windrow including the object away from the remaining material.

BRIEF DESCRIPTION OF THE DRAWINGS

A more complete appreciation of the disclosure and many of the attendant advantages thereof will be readily obtained as the same becomes better understood by reference to the following detailed description when considered in connec-tion with the accompanying drawings, wherein:

FIG. 13 is a flowchart representative an example method that may be executed to implement the example merger control system of FIG. 11 to carry out adjustments for one or more merger actuators to distribute a material relative to a conveyor and/or a ground surface;

FIGS. 15 and 16 are flowcharts of example methods that may be executed to implement the example merger control system of FIG. 11 to facilitate removal of an object without interrupting operation of the merger and/or a harvesting machine.

DETAILED DESCRIPTION

Figure 1:
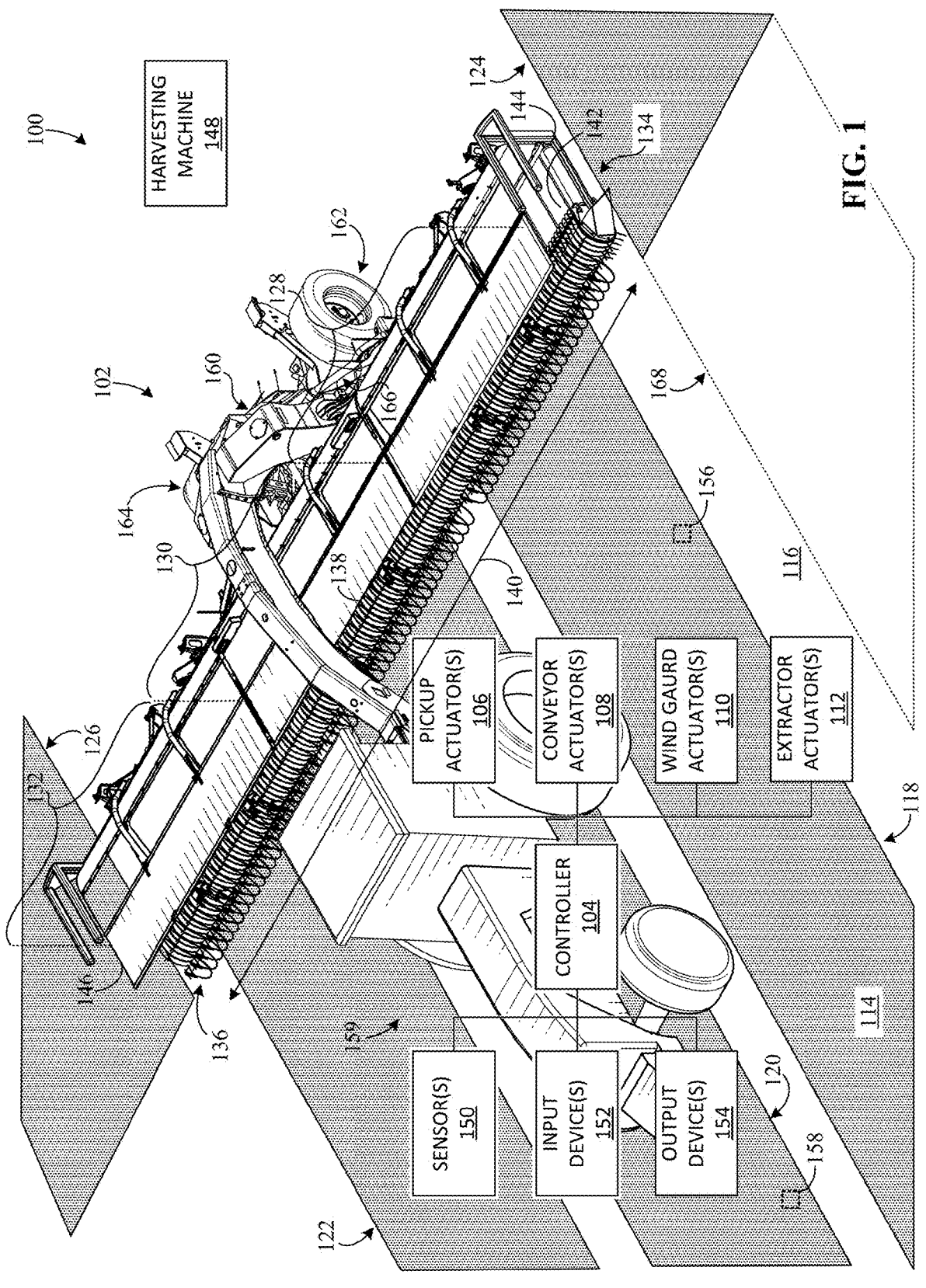
FIG. 1 is view of an example material processing system in which disclosed example can be implemented.

All publications, patent applications, patents, and other references mentioned herein are incorporated by reference in their entirety. Further, the materials, methods, and examples discussed herein are illustrative only and are not intended to be limiting.

In the drawings, like reference numerals designate identical or corresponding parts throughout the several views. Further, as used herein, the words "a", "an", and the like include a meaning of "one or more", unless stated otherwise. The drawings are generally drawn not to scale unless specified otherwise or illustrating schematic structures or flowcharts.

FIG. 1 is a view of an example material processing system 100 in which examples disclosed herein can be implemented. The material processing system 100 of FIG. 1 includes an example merger (e.g., a hay merger) 102, an example controller 104, one or more example pickup actuators 106, one or more example conveyor actuators 108, one or more example wind guard actuators 110, and one or more example extractor actuators 112. The merger 102 of FIG. 1 is structured and/or configured to process an example material (e.g., a crop) 114 positioned on a ground surface 116, for example, in a field or an area of land. In some examples, the material 114 is distributed on the ground surface 116 due to previous processing of the material 114 such that the material 114 forms one or more example windrows 118, 120, 122, three of which are shown in this example (i.e., a first windrow 118, a second windrow 120, and a third windrow 122). Each of the first windrow 118, the second windrow 120, and the third windrow 122 is sometimes referred to as an input windrow. As shown in FIG. 1, the input windrow(s) 118, 120, 122 are relatively small and/or closely spaced relative to each other. In some examples, during operation of the merger 102 when the merger 102 moves along the ground surface 116, the merger 102 receives and/or combines the input windrow(s) 118, 120, 122 and, as a result, forms and/or otherwise provides one or more other example windrows 124, 126 on the ground surface 116, two of which are shown in this example (i.e., a fourth windrow 124 and a fifth windrow 126). However, in example where the material 114 does not form input windrow(s) (e.g., the material 114 has a more even or uniform distribution relative to the ground surface 116), the merger 102 similarly receives the material 114 from the ground surface 116 and likewise provides the fourth windrow 124 and/or the fifth windrow 126. Each of the fourth windrow 124 and the fifth windrow 126 is sometimes referred to as an output windrow.

In some examples, to facilitate processing the material 114 and/or the input windrow(s) 118, 120, 122, the merger 102 includes one or more example header assemblies 128, 130, 132 operatively coupled together, three of which are shown in this example (i.e., a first header assembly 128, a second header assembly 130, and a third header assembly 132). Additionally, in some examples, to facilitate combining at least some of the input windrows 118, 120, 122 and/or otherwise further translating the material 114, the merger 102 includes an example conveyor (e.g., a belt conveyor) 134 operatively coupled thereto, which is formed and/or defined by components (e.g., belts) of the one or more header assemblies 128, 130, 132. In particular, each of the one or more header assemblies 128, 130, 132 is configured to lift the input windrow(s) 118, 120, 122 from the ground surface 116 and distribute the input windrow(s) 118, 120, 122 onto the conveyor 134, for example, via one or more example pickups 136 positioned on or near a first side (e.g., a front side) 138 of the merger 102 and/or distributed at least partially along a length 140 of the merger 102. Further, after receiving the input windrow(s) 118, 120, 122, the conveyor 134 is configured to convey the input windrow(s) 118, 120, 122 to one or more ends of the conveyor 134 and eject the input windrow(s) 118, 120, 122 from the respective end(s), for example, via one or more example conveyor belts 142 positioned near respective ones of the pickup(s) 136 and/or distributed at least partially along the length 140. For example, as shown in FIG. 1, the conveyor 134 is ejecting one or more of the input windrow(s) 118, 120, 122 and/or, more generally, the material 114 from (a) a first end 144 of the conveyor 134 to form the fourth windrow 124 and (a) a second end 146 of the conveyor 134, opposite the first end 144, to form the fifth windrow 126. In this manner, the merger 102 advantageously distributes the material 114 relative to the ground surface 116, which facilitates harvesting the material 114 by using an example harvesting machine (e.g., a forage chopper or harvester) 148.

Although FIG. 1 depicts the merger 102 ejecting the material 114 from the two ends 144, 146, in some examples, the controller 104 controls the merger 102 differently, for example, such that the conveyor 134 ejects the material 114 from a single end 144, 146 of the conveyor 134 and/or the conveyor 134 to form a single output windrow 124, 126. Further, although FIG. 1 depicts the merger 102 having the three header assemblies 128, 130, 132, in some examples, the merger 102 is implemented differently, for example, having one or more additional or fewer header assemblies 128, 130, 132.

The pickup actuator(s) 106 of FIG. 1 can be implemented, for example, using one or more motors (e.g., electric motor(s)) and/or any other appropriate actuator(s). In particular, the pickup actuator(s) 106 are operatively coupled to respective one(s) of the pickup(s) 136 to control an operational parameter (e.g., a speed) of the respective pickup(s) 136 during operation of the merger 102 via output (e.g., a force and/or a torque) that is generated by the pickup actuator(s) 106. In some examples, the pickup actuator(s) 106 adjust the operational parameter in response to receiving one or more control signals or commands and/or electrical power from the controller 104.

The conveyor actuator(s) 108 of FIG. 1 can be implemented, for example, using one or more example motors (e.g., electric motor(s)) and/or any other appropriate actuator(s). In particular, the conveyor actuator(s) 108 are operatively coupled to respective ones of the conveyor belt(s) 142 to control an operational parameter (e.g., speed) of the respective conveyor belt(s) 142 via output (e.g., a force and/or a torque) that is generated by the conveyor actuator(s) 108. In some examples, the conveyor actuator(s) 108 adjust the operational parameter in response to receiving one or more control signals or commands and/or electrical power from the controller 104.

In some examples, to facilitate operation of the merger 102, the material processing system 100 includes one or more example sensors 150, one or more example input devices 152, and one or more example output devices 154. The controller 104 of FIG. 1 is communicatively coupled to any one or more (e.g., all) of the pickup actuator(s) 106, the conveyor actuator(s) 108, the wind guard actuator(s) 110, the extractor actuator(s) 112, the sensor(s) 150, the input device(s) 152, and/or the output device(s) 154, for example, via one or more transmission or signal wires, a bus, radio frequency, etc. In particular, in some examples, during operation of the merger 102, the controller 104 of FIG. 1 is configured to particularly control, via the actuator(s) 106, 108, 110, 112, one or more example movable devices operatively coupled to the merger 102 to adjust a distribution of the material 114 relative to the conveyor 134 and/or the distribution of the material 114 relative to the ground surface 116, as discussed further below in connection with FIGS. 2-17. Additionally or alternatively, in some examples, the controller 104 is configured to detect one or more example objects of interest (e.g., metal, one or more rocks, one or more dirt clumps, etc.) 156, 158 positioned within and/or on a portion of the material 114 (e.g., a portion of an input windrow(s) 118, 120, 122), two of which are shown in this example (i.e., a first object 156 and a second object 158). In such examples, in response to such detection(s), the controller 104 is configured to remove the object(s) 156, 158 and/or otherwise facilitate removal thereof without interrupting operation of the merger 102 and/or the harvesting machine 148.

The controller 104 of FIG. 1 can be implemented, for example, using one or more example electronic control units (ECUs). The controller 104 of FIG. 1 is sometimes referred to as a merger controller. In some examples, the controller 104 is coupled to and/or otherwise positioned on an example motor vehicle (e.g., a tractor) 159 configured to tow the merger 102. However, in some examples, the controller 104 is implemented differently. For example, the controller 104 may be alternatively coupled and/or otherwise positioned on a portion of the merger 102. In any case, the controller 104 is configured to receive electrical power for operation thereof, for example, generated by the vehicle 159 and/or stored in an example power source (e.g., a battery) connected to the controller 104.

The sensor(s) 150 of FIG. 1 include any of one or more light sensors, one or more LiDAR sensors, one or more X-ray sensors or detectors (e.g., a sensor(s) or detector(s) having Dual Energy X-Ray Absorptiometry (DEXA) functionality), one or more inductive sensors, one or more GPS locators, and/or any other suitable sensor(s). In particular, the sensor(s) 150 are configured to generate sensor data associated with the material 114 during merger operation and/or otherwise provide the data to the controller 104. In some such examples, at least one of the sensor(s) 150 includes a single device configured to transmit and receive a signal for processing by the controller 104. Additionally, in such examples, the single device includes a first portion configured to transmit the signal and a second portion configured to receive the signal. Additionally or alternatively, in some examples, at least one of the sensor(s) 150 includes a first device configured to transit the signal and a second device, separate from the first device, configured to receive the signal. In any case, the signal is processed by the controller 134. The input device(s) 152 of FIG. 1 include one or more of lever, a button, a switch, a touch screen, a microphone, a voice command system, etc. that is/are communicatively coupled to the controller 104 and configured to provide user data to the controller 104, which enable a user to configure the merger 102 and/or select an operating mode thereof. For example, in response to the user interacting with the input device(s) 152, the controller 104 detects resulting user input(s) or selection(s) and/or data (e.g., a user request) corresponding to a desired operating mode of the merger 102.

The output device(s) 154 of FIG. 1 include one or more of a light-emitting diode (LED), a liquid crystal display, a touchscreen a transducer (e.g., a speaker), etc. that is communicatively coupled to the controller 104 and configured to present information (e.g., visual information and/or auditory information) to one or more end users. For example, the controller 104 control(s) the output device(s) 154 to generate any one or more images, video, one or more sounds, natural speech, etc. that notify the user(s), for example, of one or more instructions for harvesting the output windrow(s) 124, 126.

The merger 102 of FIG. 1 includes an example frame or chassis 160 structured and/or configured to support the one or more header assemblies 128, 130, 132. In particular, to facilitate movement along the ground surface 116, the merger 102 includes one or more example wheels 162, 164 rotatably coupled (e.g., via one or more bearings and/or wheel hubs) to the frame 160 and configured to engage the ground surface 116, two of which are shown in this example (i.e., a first wheel 162 and a second wheel 164).

According to the illustrated example of FIG. 1, the first, second, and third header assemblies 128, 130, 132 are connected to together, for example, via one or more example fasteners and/or fastening methods or techniques. As shown in FIG. 1, the second header assembly 130 is interposed between the first and third header assemblies 128, 132. In some examples, the first header assembly 128 is adjustably coupled to the frame 160 and/or a portion of the second header assembly 130, for example, via a movable joint at least partially formed by the first header assembly 128. Similarly, in some examples, the third header assembly 132 is adjustably coupled to the frame 160 and/or a different portion of the second header assembly 130, for example, via another movable joint at least partially formed by the third header assembly 132. In particular, in such examples, each of the first header assembly 128 and/or the third header assembly 132 is movable between a first position (e.g., a lowered position) thereof and a second position (e.g. a raised position) thereof, which facilitates storing and/or transporting the merger 102. As shown in FIG. 1, the first header assembly 128 is in the first position thereof, and the third header assembly 132 is in the first position thereof. Additionally, in some such examples, to facilitate such header assembly adjustments, the merger 102 includes one or more example actuators 166 operatively coupled between the frame 160 and respective ones of the first header assembly 128 and/or the third header assembly 132, one of which is shown in this example.

In some examples, the merger controller 104 controls the conveyor 134 via the conveyor actuator(s) 108 to form the fourth windrow 124 and/or the fifth windrow 126 by particularly depositing the material 114 on the ground surface 116 relative to one or more completed windrows 168 that are formed by the merger 102, one of which is shown in this example (as represented by the dotted/dashed lines of FIG. 1). That is, in some such examples, the merger 102 may form the completed windrow(s) 168 during a previous pass across the field in which the merger 102 is operating. In particular, in such examples, each of the output windrow(s) 124, 126 of FIG. 1 is positioned on or near (e.g., adjacent) a respective one of the completed windrow(s) 168 when the merger 102 forms the output windrow(s) 124, 126. In such example, the merger controller 104 determines one or more adjustment(s)

for the conveyor actuator(s) 108 associated with such positioning of the output windrow(s) 124, 126 and/or otherwise executes the adjustment(s) to position the output windrow(s) 124, 126 relative to the respective ones of the completed windrow(s) 168, which is discussed further below. As such, the completed windrow(s) 168 include the fourth windrow 124 and/or the fifth windrow 126 when the merger 102 completes its current pass across the field.

Figure 2:
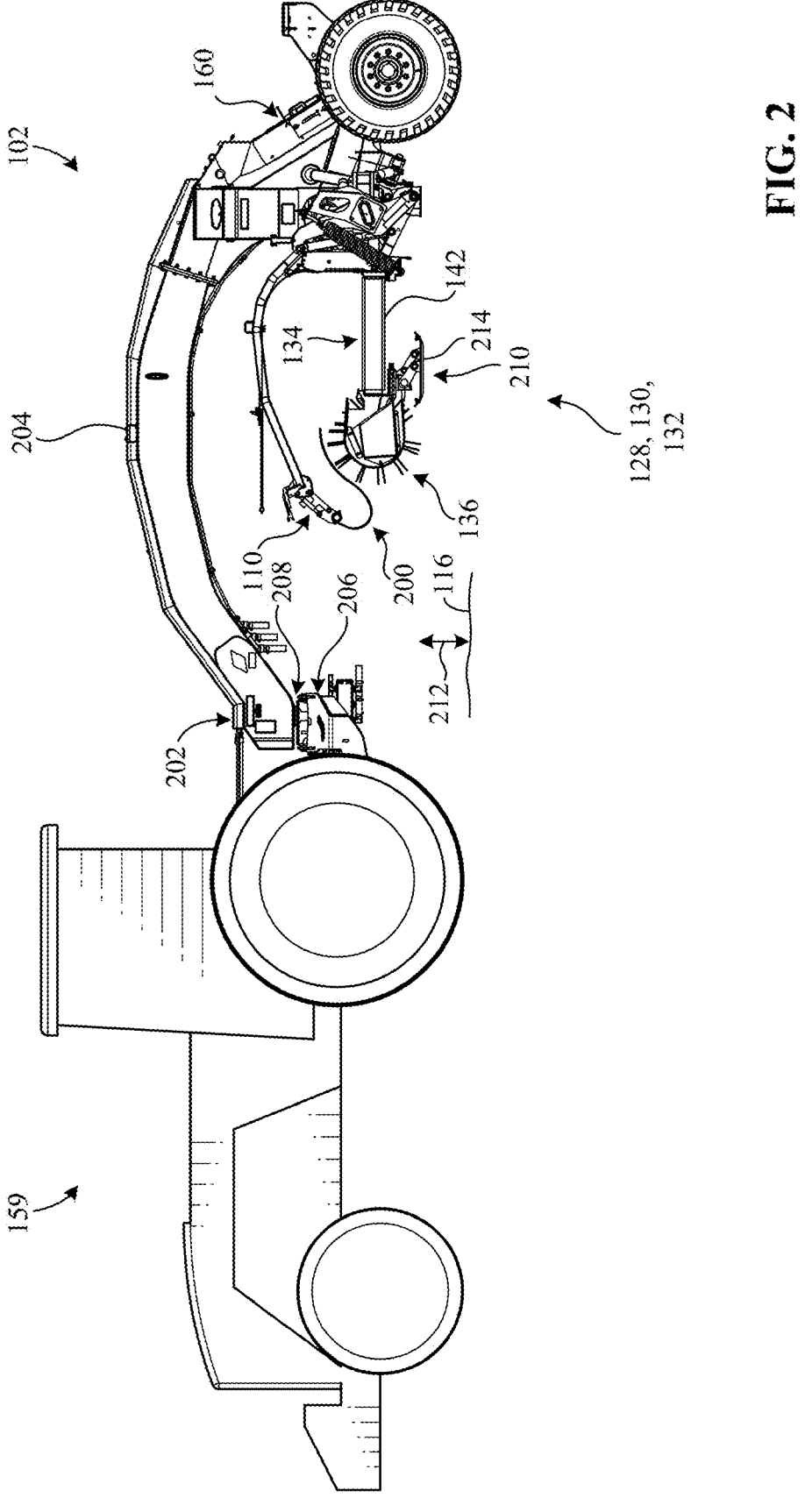
FIG. 2 is a side view of an example merger in accordance with the teachings of this disclosure.

FIG. 2 is a side view of the example merger 102 of FIG. 1. In some examples, to guide a trajectory of the material 114 provided by one of the pickup(s) 136, the merger 102 of FIG. 2 includes one or more example wind guards (e.g., one or more floating wind guards) 200 positioned near respective ones of the pickup(s) 136 and/or distributed at least partially along the length 140 of the merger 102. As shown in FIG. 2, the pickup(s) 136 are positioned between the conveyor belt(s) 142 and the wind guards 200. The wind guard(s) 200 of FIG. 2 are adjustably coupled to the respective one or more header assembly 128, 130, 132, for example, via the wind guard actuator(s) 110 and/or associated support structure(s), which is discussed further below in connection with FIGS. 4-6. In particular, the wind guard actuator(s) 110 are configured to actuate to adjust positions and/or orientations of respective ones of the wind guard(s) 200 relative to the frame 160 and/or the conveyor 134, thereby changing the trajectory of the material 114. In some examples, the wind guard actuator(s) 110 can be implemented, for example, using one or more linear actuators (e.g., one or more mechanical (i.e., a manually operated) linear actuator or one or more electro-mechanical linear actuators) and/or any other appropriate actuator(s).

In some examples, to facilitate towing and/or otherwise moving the one or more header assemblies 128, 130, 132 via the vehicle 159, the merger 102 includes an example coupler 202 that is affixed to the frame 160, for example, via an example arm 204 extending from the frame 160 to the coupler 202. That is, the arm 204 of FIG. 2 is coupled between the frame 160 and the coupler 202, for example, via one or more fasteners and/or fastening methods or techniques. The coupler 202 of FIG. 2 is configured to engage an example receiver 206 affixed to the vehicle 159, which movably couples the merger 102 and the vehicle 159 together. In some examples, the coupler 202 and the receiver 206 form and/or define a first example movable joint 208 relative to which the arm 204 and, thus, the frame 160 are to pivot as the vehicle 159 tows the merger 102. Additionally, in some examples, the coupler 202 is configured to decouple or disconnect from the receiver 206, thereby decoupling the merger 102 from the vehicle 159, for example, when a different machine and/or tool is desired for the vehicle 159 such as any one or more of a bailer, a wrapper, a mower, a rake, etc.

In some examples, to facilitate positioning the pickup(s) 136, the merger 102 includes one or more example skid shoes 210 positioned beneath the pickup(s) 136 and/or the conveyor 134, one of which is shown in this example. In particular, the skid shoe(s) 210 are configured to slidably engage the ground surface 116 to provide a sufficient clearance 212 between the ground surface 116 and a portion of the merger 102 near the ground surface 116. Additionally, in some examples, the skid shoe(s) 210 are adjustably coupled (e.g., via a suspension system) to a portion of the merger 102 such that each of the skid shoe(s) 210 is movable relative to the portion of the merger 102, which facilitates damping harsh vibrations and/or sudden movements that may be experienced by the frame 160 during merger operation. In some examples, each of the skid shoe(s) 210 defines an example abutment surface 214 contacting the ground surface 116. In some such examples, the abutment surface 214 includes one or more portions that are curved and/or angled, which better enables the skid shoe(s) 210 to traverse terrain.

Figure 3:
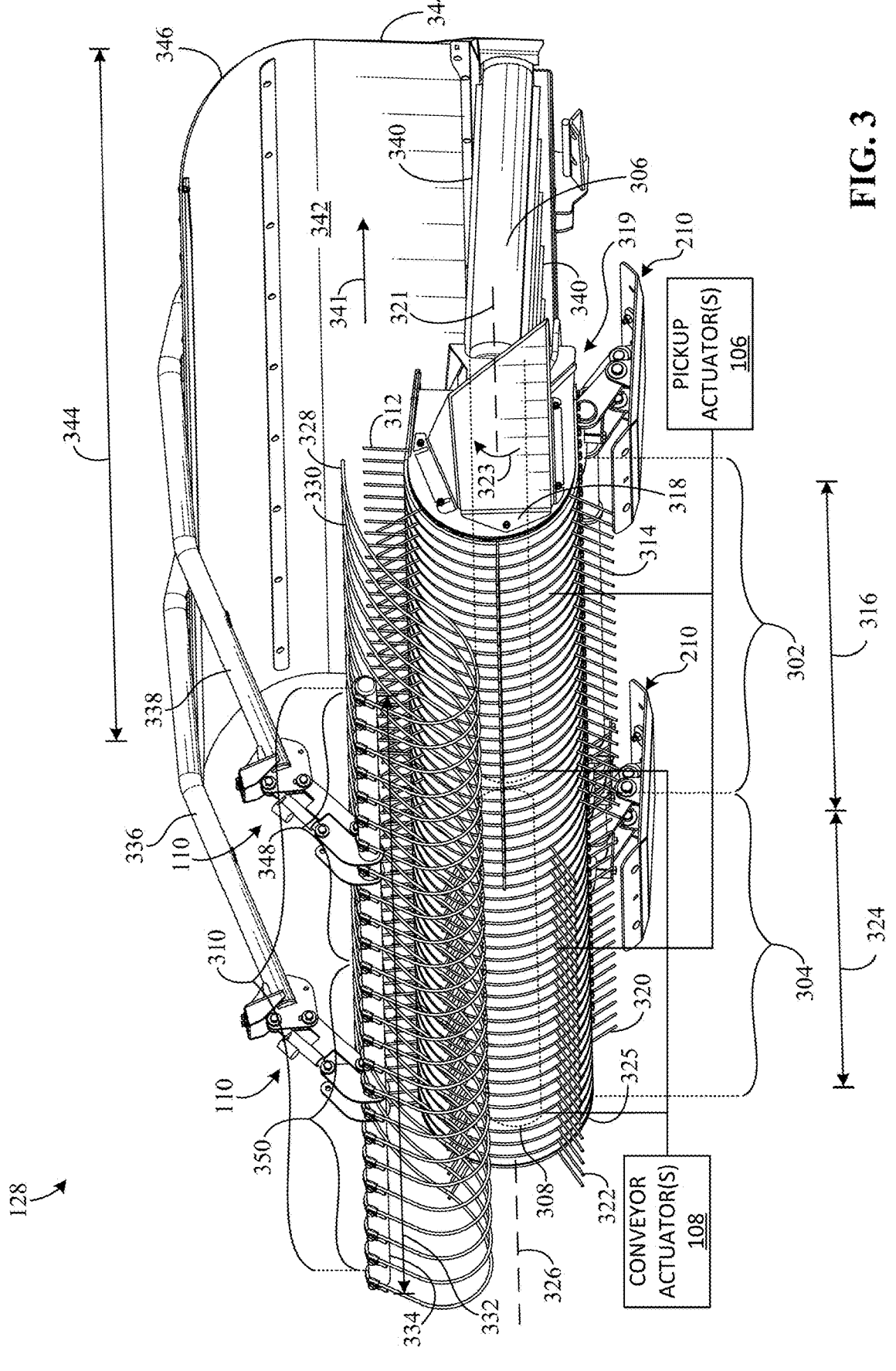
FIG. 3 is a view of an example header assembly in accordance with the teachings of this disclosure.

FIG. 3 is a view of the first header assembly 128 of FIGS. 1 and 2. Although FIG. 3 depicts aspects in connection with a single header assembly 128, in some examples, such aspects likewise apply to one or more other header assemblies associated with the merger 102 such as, for example, the second header assembly 130 and/or the third header assembly 132. According to the illustrated example of FIG. 3, the first header assembly 128 includes one or more example pickups 302, 304 operatively coupled thereto, two of which are shown in this example (i.e., a first pickup 302 and a second pickup 304). The first header assembly 128 of FIG. 3 also includes one or more example belts 306, 308 operatively coupled thereto, two of which are shown in this example (i.e., a first belt 306 and a second belt 308 (as represented by the dotted/dashed lines of FIG. 3)). Additionally, in some examples, the first header assembly 128 of FIG. 3 includes an example first wind guard (e.g., a floating wind guard) 310 operatively coupled thereto, one of which is shown in this example.

As such, in some examples, the first and second pickups 302, 304 of FIG. 3 correspond to and/or are used to implement at least some of the pickups 136 of FIGS. 1 and 2. Further, in some examples, the first and second belts 306, 308 of FIG. 3 correspond to and/or are used to implement at least some of the belts 142 of FIGS. 1 and 2. Further still, in some examples, the first wind guard 310 of FIG. 3 corresponds to and/or is used to implement at least one of the wind guard(s) 200 of FIG. 2.

The first pickup 302 of FIG. 3 includes one or more first example material extraction members (e.g., tines) 312, 314 rotatably coupled thereto and distributed at least partially along a length 316 of the first pickup 302, which enables the first header assembly 128 to catch or obtain the material 114 and/or otherwise receive (e.g., repeatedly and/or continuously) the material 114 from the ground surface 116. For example, the first pickup 302 includes first rotatable support structures (e.g., tine bars) that are positioned in a body or housing 318 associated with the first pickup 302 and supported by a frame 319 of the first header assembly 128, for example, via one or more bearings (e.g., ball bearing(s)) interposed between the frame 319 and the first rotatable support structures. In such examples, the first material extraction members 312, 314 are coupled to the first rotatable support structures and/or distributed thereon, for example, via one or more fasteners and/or one or more fastening methods or techniques. In such examples, in response to a force or load (e.g., generated by the pickup actuator(s) 106) imparted on the first rotatable support structures, the first support structures and, thus, the first material extraction members 312, 314 rotate relative to a first example axis 321 associated with the first support structures and/or, more generally, associated with the first pickup 302. As shown in FIG. 3, the first material extraction members 312, 314 are radially distributed relative to the first example axis 321 associated with the first pickup 302 and/or extend away from respective ones of the first rotatable support structures radially outward relative to the first axis 321. In particular, the first material extraction members 312, 314 of FIG. 3 are configured to rotate relative to the first axis 321 based on the output of the pickup actuator(s) 106 to lift the material 114 from the ground surface 116 and/or otherwise urge the material 114 toward a particular area (e.g., any one or more of a front area, a back area, and/or a central or intermediate area interposed between the front and back areas) of the first belt 306.

In some examples, a first one of the pickup actuator(s) 106 is operatively coupled to and/or otherwise connected (e.g., via the first rotatable support structures) to the first material extraction members 312, 314 such that the controller 104 can control, via the first one of the pickup actuator(s) 106, a rate (e.g., revolutions per minute (RPM)) at which the first material extraction members 312, 314 rotate relative to the first axis 321 (i.e., a speed of the first pickup 302), for example, in a first direction (e.g., clockwise or counterclockwise) 323. For example, the first rotatable support structures are coupled to the first one of the pickup actuator(s) 106 to receive a force and/or a torque generated by the first one of the pickup actuator(s) 106. In response to receiving such output from the first one of the pickup actuator(s) 106, the first rotatable support structures rotate relative to the first axis 321 and, thus, the first material extraction members 312, 314 rotate relative to the first axis 321, as previously mentioned. In this manner, the controller 104 controls a speed at which the material 114 is ejected from the first pickup 302 and/or a trajectory of the material 114 resulting from such operation of the first pickup 302.

Similarly, in some examples, the second pickup 304 of FIG. 3 includes one or more second example material extraction members (e.g., tines) 320, 322 rotatably coupled thereto and distributed at least partially along a length 324 of the second pickup 304. For example, the second pickup 304 includes second rotatable support structures (e.g., tine bars) that are positioned in a body or housing 325 associated with the second pickup 304 and supported by the frame 319, for example, via one or more bearings (e.g., ball bearing(s)) interposed between the frame 319 and the second rotatable support structures. In such examples, the second material extraction members 320, 322 are coupled to the second rotatable support structures and/or distributed thereon, for example, via one or more fasteners and/or one or more fastening methods or techniques. In such examples, in response to a force or load (e.g., generated by the pickup actuator(s) 106) imparted on the second rotatable support structures, the second support structures and, thus, the second material extraction members 320, 322 rotate relative to a second example axis 326 associated with the second support structures and/or, more generally, associated with the second pickup 304. As shown in FIG. 3, the second material extraction members 320, 322 are radially distributed relative to the second example axis 326 associated with the second pickup 304 and/or extend away from the second rotatable support structure radially outward relative to the first axis 321. In particular, the first material extraction members 312, 314 of FIG. 3 are configured to rotate relative to the second axis 326 based on the output of the pickup actuator(s) 106 to lift the material 114 from the ground surface 116 and/or otherwise urge the material 114 toward a particular area (e.g., any one or more of a front area, a back area, and/or a central or intermediate area interposed between the front and back areas) of the second belt 308.

In some examples, a second one of the pickup actuator(s) 106 is operatively coupled and/or otherwise connected (e.g., via the second rotatable support structures) to the second material extraction members 320, 322 such that the controller 104 can control, via the second one of the pickup actuator(s) 106, a rate at which the second material extraction members 320, 322 rotate relative to the second axis 326 (i.e., a speed of the second pickup 304), for example, in the first direction (e.g., clockwise or counterclockwise) 323. For example, the second rotatable support structures are coupled to the second one of the pickup actuator(s) 106 to receive a force and/or a torque generated by the second one of the pickup actuator(s) 106. In response to receiving such output from the second one of the pickup actuator(s) 106, the second rotatable shaft rotates relative to the second axis 326 and, thus, the second material extraction members 320, 322 rotate relative to the second axis 326, as previously mentioned. In this manner, the controller 104 controls a speed at which the material 114 is ejected from the second pickup 304 and/or a trajectory of the material 114 resulting from such operation of the second pickup 304.

The first wind guard 310 of FIG. 3 includes one or more example material guiding members (e.g., tines, contoured panels, rollers, or a combination) 328, 330 coupled thereto and distributed at least partially across a length 332 of the first wind guard 310. In particular, the material guiding members 328, 330 are positioned near the first material extraction members 312, 314 and/or the second material extraction members 320, 322 and configured engage the material 114 when the material extraction members 312, 314, 320, 322 are conveying the material 114. In this manner, the first wind guard 310 guides movement of the material 114 and/or maintains engagement between the material 114 and the material extraction members 312, 314, 320, 322 (e.g., during relatively windy conditions), which ensures the material 114 is appropriately thrown from the material extraction members 312, 314, 320, 322 onto at least a portion (e.g., the belt(s) 306, 308) of the conveyor 134 during merger operation.

In some examples, the first wind guard 310 includes an example support structure (e.g., one of a rod, a shaft, a bracket, etc.) 334 supporting the material guiding members 328, 330. That is, in such examples, the material guiding members 328, 330 are distributed on the support structure 334 and coupled thereto, for example, via one or more fasteners and/or fastening methods or techniques.

Additionally, in some examples, the first wind guard 310 is supported by the frame 319 of the first header assembly 128, for example, via one or more arms 336, 338 extending between the frame 319 and the support structure 334. In other words, the first header assembly 128 of FIG. 3 includes a second example arm 336 and a third example arm 338. In such examples, the second arm 336 and/or the third arm 338 are coupled between the support structure 334 and the frame 319 and configured to provide support to any one or more of the material guide members 328, 330, the support structure, 334 and/or, more generally, the first wind guard 310.

Additionally, in some examples, the first wind guard 310 is adjustably coupled to the arm(s) 336, 338 such that the first wind guard 310 is moveable relative to the arm(s) 336, 338. In such examples, to facilitate adjustments of the first wind guard 310, one or more of the wind guard actuator(s) 110 are operatively coupled between the support structure 334 and the arm(s) 336, 338, two of which are shown in this example. In other words, a first one of the wind guard actuator(s) 110 and a second of the wind guard actuator(s) 110 are operatively coupled to the support structure 334, as discussed further below in connection with FIGS. 4-6. Further, in examples where the wind guard actuator(s) 110 are electro-mechanical actuator(s), the controller 104 is configured to adjust a position and/or an angle of the material guide members 328, 330 and/or, more generally, a position of the first wind guard 310 via the first one and/or the second one of the wind guard actuator(s) 110.

The material extraction members 312, 314, 320, 322 of FIG. 3 can be implemented, for example, using example tines (e.g., spring tines) and/or any other oblong bodies or structures that are shaped appropriately and/or have appropriate material properties associated therewith such as, for example, sufficient strength, sufficient rigidity, sufficient flexibility, sufficient durability, etc. As shown in FIG. 3, each of the material extraction members 312, 314, 320, 322 is substantially linear and extends substantially along a linear path. However, in some examples, one or more (e.g., all) of the material extraction members 312, 314, 320, 322 are at least partially curved, coiled, angled, and/or otherwise shaped differently. Similarly, the material guiding members 328, 330 of FIG. 3 can be implemented, for example, using one or more example tines (e.g., spring tines) and/or any other oblong bodies or structures that are appropriately shaped and/or have appropriate material properties associate therewith. As shown in FIG. 3, each of the material guiding members 328, 330 is curved and extends substantially along a curved path. However, in some examples, one or more (e.g., all) of the material guiding members 328, 330 are shaped differently.

The belt(s) 306, 308 of FIG. 3 can be implemented, for example, using one or more toothed conveyor belts and/or any other appropriate substrate for transporting the material 114. In particular, each of the belt(s) 306, 308 is operatively coupled, via one or more pulleys and/or rollers, to the frame 319 of the first header assembly 128 such that each belt 306, 308 moves in response to rotation of the pulley(s) and/or the roller(s). In some examples, the first belt 306, the second belt 308, and/or one or more other belts associated with the conveyor 134 include example protrusions (e.g., ridges) 340 positioned thereon for receiving the material 114, which facilitates conveying relatively large amounts of the material 114. As shown in FIG. 3, the first protrusions 340 are positioned on and/or distributed relative to the first belt 306.

In some examples, a first one of the conveyor actuator(s) 108 is operatively coupled and/or otherwise connected to the first belt 306 such that the controller 104 can control, via the first one of the conveyor actuator(s) 108, a rate at which the first belt 306 conveys the material 114 (i.e., a speed of the first belt 306), for example, in a second direction (e.g., a substantially horizontal direction) 341. For example, the pulley(s) associated with the first belt 306 is/are coupled to the first one of the conveyor actuator(s) 108 to receive a force and/or a torque generated by the second one of the conveyor actuator(s) 108. In response to receiving such output from the second one of the conveyor actuator(s) 108, the pulley(s) associated with the first belt 306 rotate and, thus, drive the first belt 306. In this manner, the controller 104 controls a speed at which the material 114 is ejected from the first belt 306.

Similarly, in some examples, a second one of the conveyor actuator(s) 108 is operatively coupled and/or otherwise connected to the second belt 308 such that the controller 104 can control, via the second one of the conveyor actuator(s) 108, a rate at which the second belt 306 conveys the material 114 (i.e., a speed of the second belt 308), for example, in the second direction 341. For example, the pulley(s) associated with the second belt 308 are coupled to the second one of the conveyor actuator(s) 108 to receive a force and/or a torque generated by the second one of the conveyor actuator(s) 108. In response to receiving such output from the second one of the conveyor actuator(s) 108, the pulley(s) associated with the second belt 308 rotate and, thus, drive the second belt 308. In this manner, the controller 104 controls a speed at which the material 114 is ejected from the first belt 306.

In some examples, to reduce leaf loss and/or maintain the material 114 in proximity to the first and second belts 306, 308, the first header assembly 128 includes an example cover (e.g., netting such as crop netting) 342 positioned near the first and second belts 306, 308 and/or extending at least partially along a length 344 of the first header assembly 128. In some examples, the cover 342 includes a first example portion (e.g., a straight and/or a flat portion) 344 and a second example portion (e.g., a curved portion) 346 connected to the first portion 344. The first portion 344 of FIG. 3 is coupled to the frame 319 of the first header assembly 128, for example, via one or more fasteners and/or fastening methods or techniques. Further, the second portion 346 of FIG. 3 curves away from the first portion 344 and extends at least partially over the belt(s) 306, 308 and/or the pickup(s) 302, 304.

In some examples, as shown in FIG. 3, the first header assembly 128 includes two of the skid shoes 210 operatively coupled thereto, for example, via a coupling mechanism interposed between the frame 319 and each of skid shoes 210. The two skid shoes 210 of FIG. 3 are spaced from each other and positioned at or near a bottommost (in the orientation of FIG. 3) of the first header assembly 128. However, in some examples, the first header assembly 128 includes one or more other skid shoes in addition or alternatively to the two skid shoes 210 shown in FIG. 3.

Although FIG. 3 depicts the single wind guard 310, in some example, the first header assembly 128 is implemented differently, for example, using one or more other wind guards in addition or alternatively to the first wind guard 310 shown in FIG. 3. In some examples, the first wind guard 310 includes multiple portions that are independently adjustable from each other. In such examples, the first wind guard 310 includes a first example portion 348 corresponding to a first set of the material guide members 328, 330 and a second portion 350 corresponding to second set of the material guide members 328, 330 different from the first set. In such examples, each of the first and second portions 348, 350 move based on output provided by a respective one of the wind guard actuator(s) 110. For example, the first one of the wind guard actuator(s) 110 controls movement of the first wind guard portion 348, and the second one of the wind guard actuator(s) 110 controls movement of the second wind guard portion 350.

Further, although FIG. 3 depicts aspects in connection with the two pickups 302, 304, in some examples, such aspects likewise apply to one or more other pickups associated with the merger 102 such as, for example, any one or more of the pickup(s) 136 of FIGS. 1 and 2, the third pickup 808 of FIGS. 8A, 8B, 8C, and 8D, the fourth pickup 810 of FIGS. 8A, 8B, 8C, and 8D, the fifth pickup 812 of FIGS. 8A, 8B, 8C, and 8D, and/or the sixth pickup 814 of FIGS. 8A, 8B, 8C, and 8D.

Further still, although FIG. 3 depicts aspects in connection with the two conveyor belts 306, 308, in some examples, such aspects apply to one or more other conveyor belts associated with the merger 102 such as, for example, any one or more of the belt(s) 142 of FIGS. 1 and 2, the third belt 800 of FIGS. 8A, 8B, 8C, and 8D, the fourth belt 802 of FIGS. 8A, 8B, 8C, and 8D, the fifth belt 804 of FIGS. 8A, 8B, 8C, and 8D, and/or the sixth belt 806 of FIGS. 8A, 8B, 8C, and 8D.

Figure 8A:
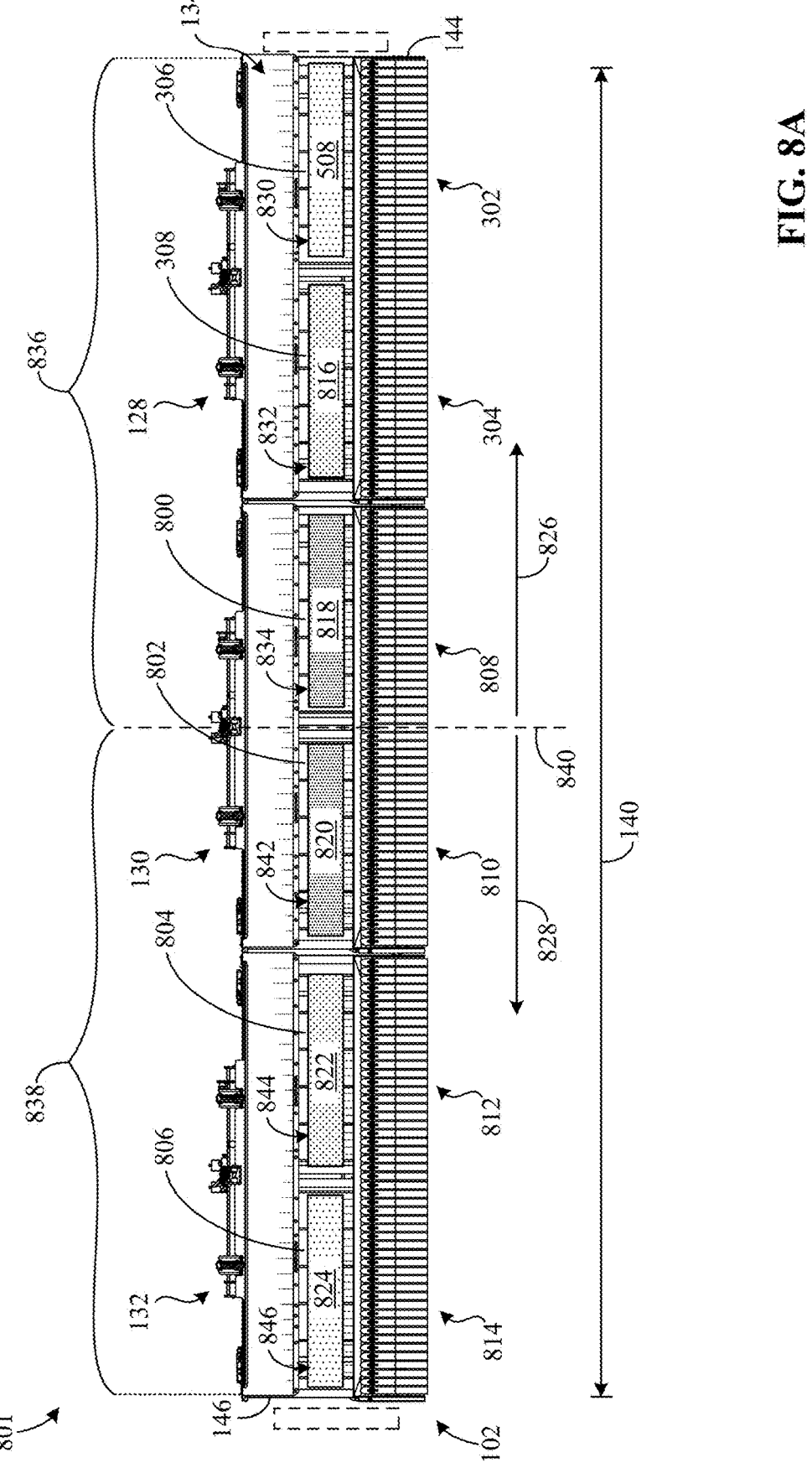
FIGS. 8A, 8B, 8C, and 8D are partial views of an example merger in accordance with the teachings of this disclosure and show the example merger in different example operating modes thereof.
Figure 8B:
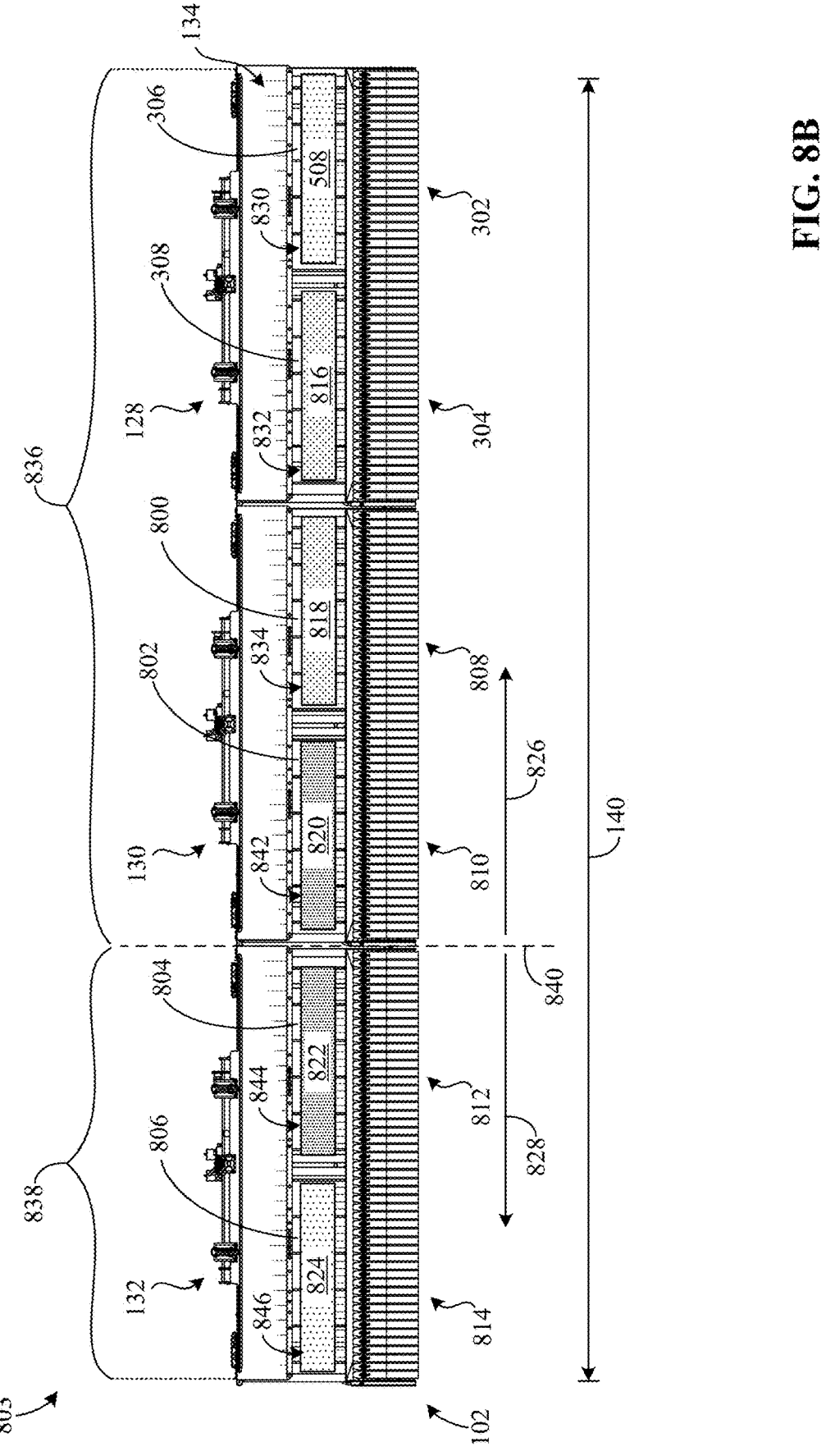
Figure 8C:
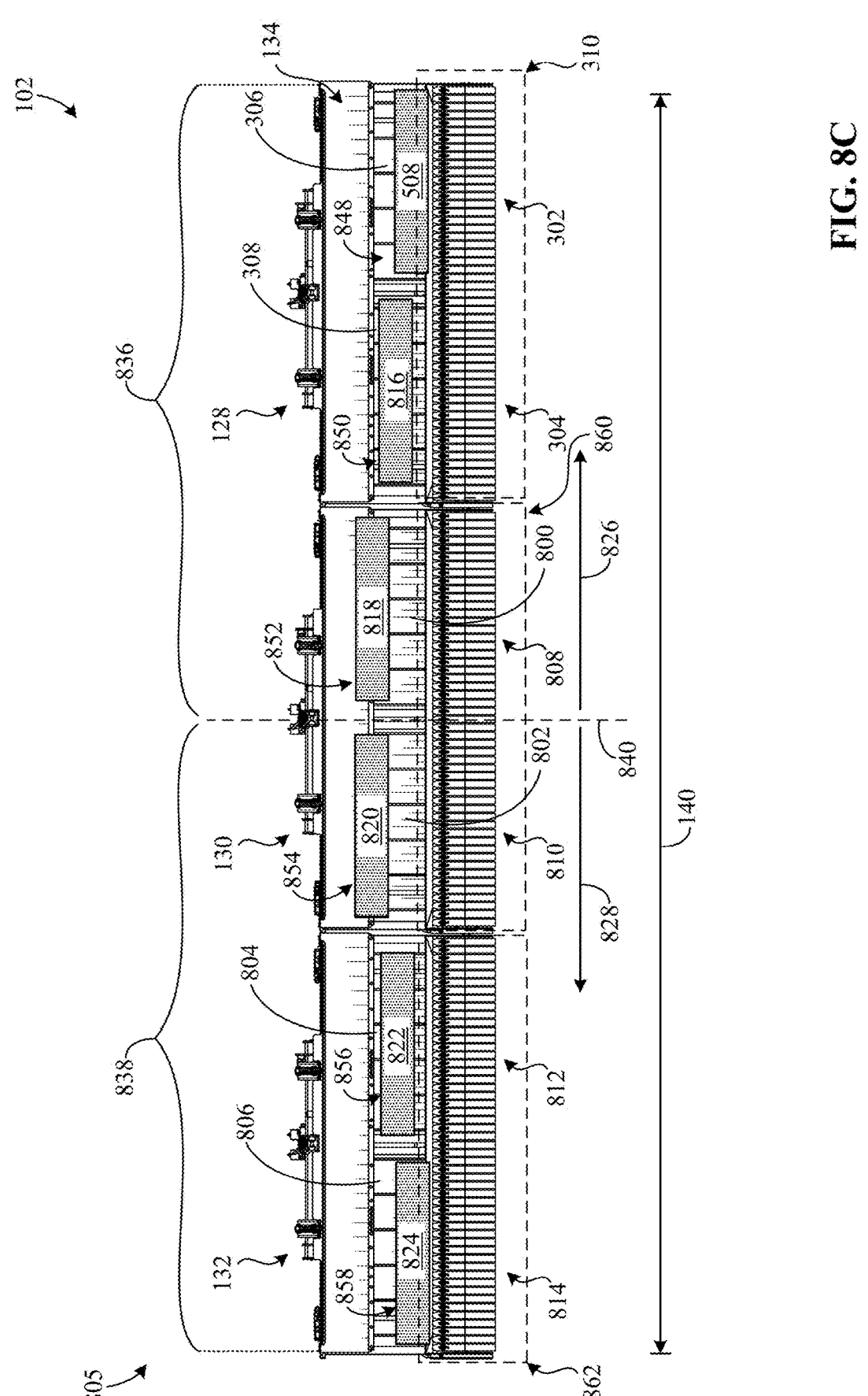
Figure 8D:
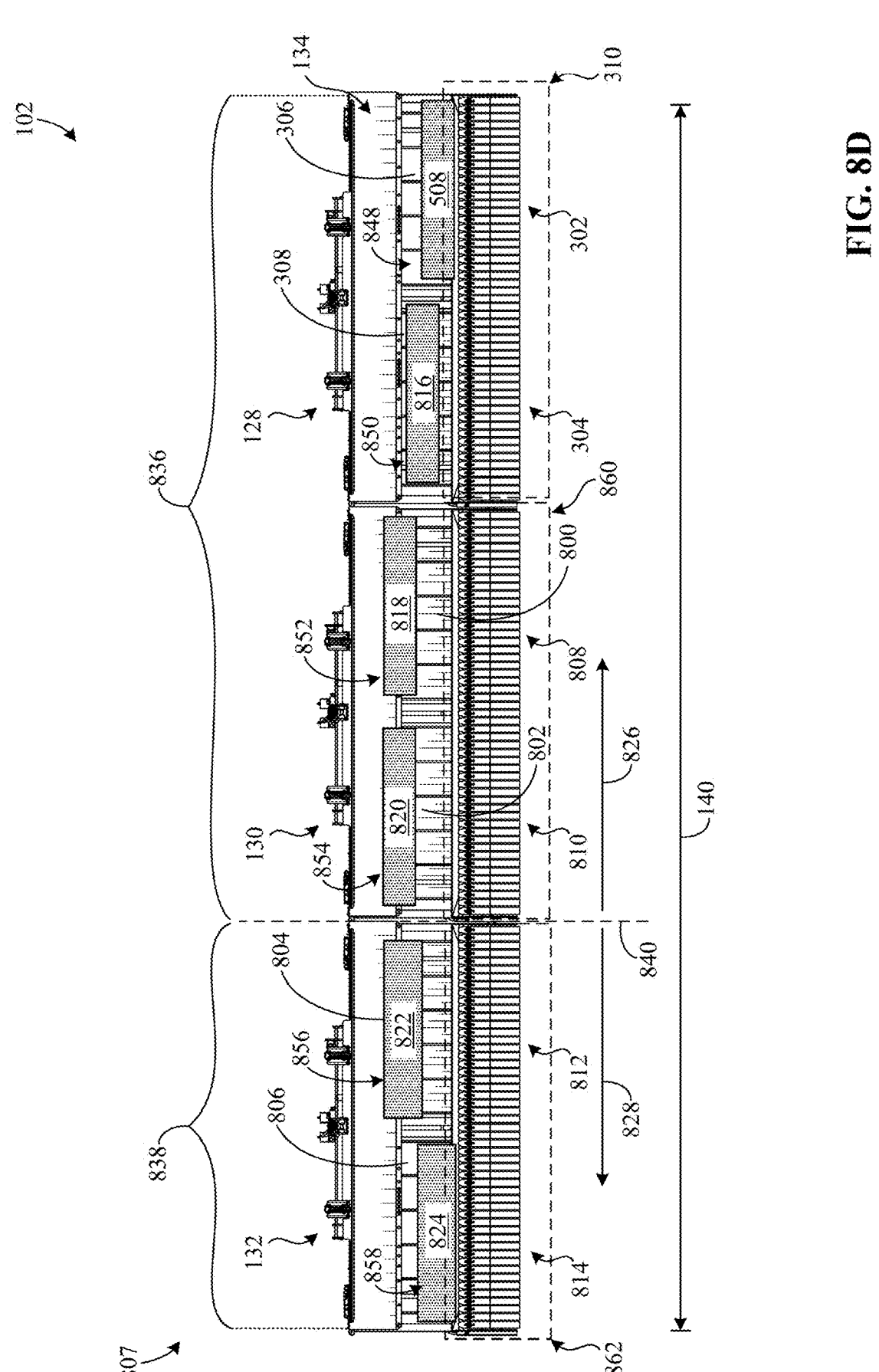

Further still, although FIG. 3 depicts aspects in connection with the single wind guard 310, in some examples, such aspects likewise apply to one or more other wind guards associated with the merger 102 such as, for example, any one or more of the wind guard(s) 200 of FIG. 2, the second wind guard 860 of FIGS. 8C and 8D, and/or the third wind guard 862 of FIGS. 8C and 8D.

Figure 4:
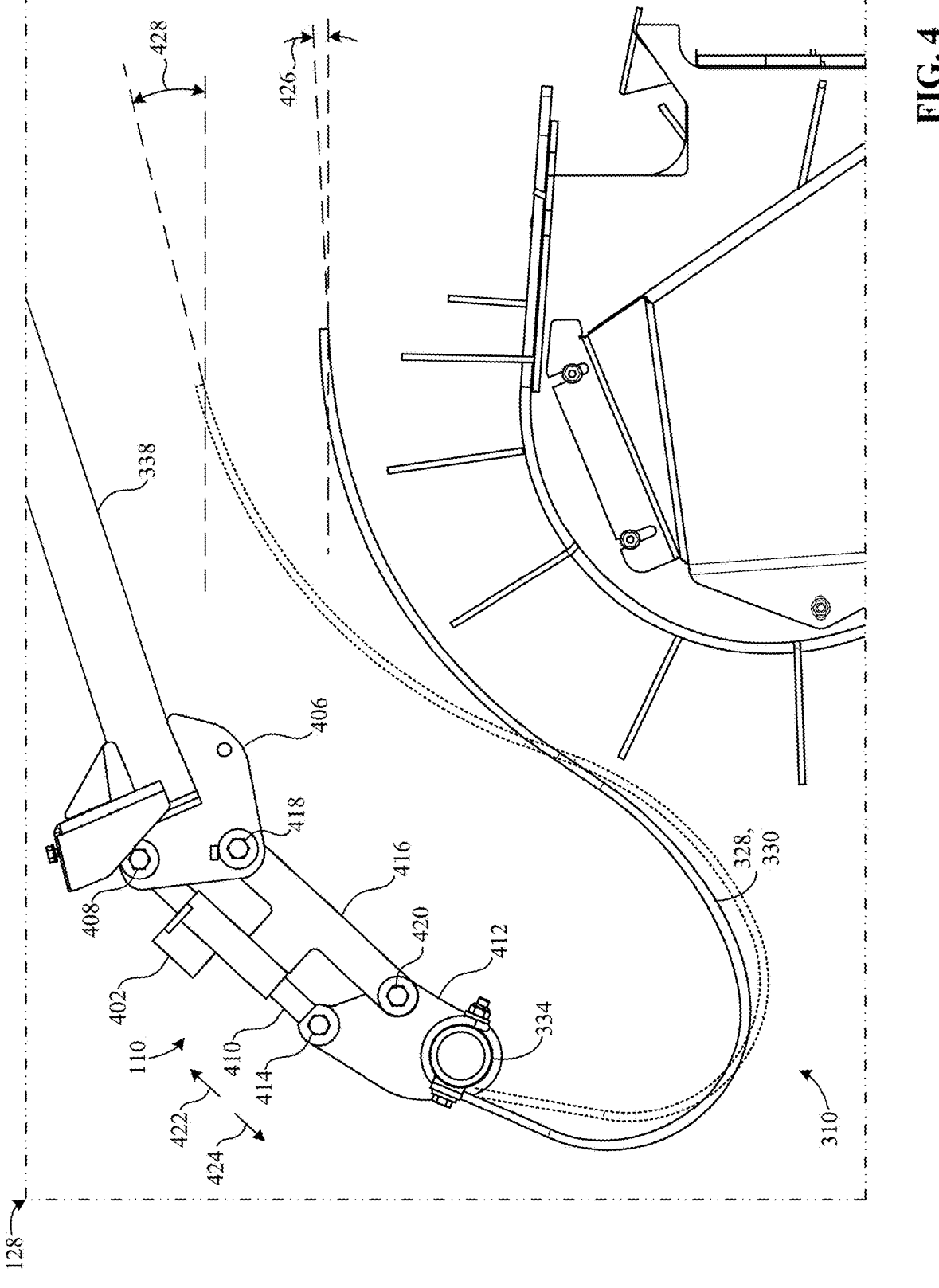
FIG. 4 is an enlarged portion view of the example header assembly of FIG. 3 and shows an example wind guard actuator in accordance with the teachings of this disclosure.

FIG. 4 is an enlarged portion view of the first header assembly 128 and shows the first one of the wind guard actuators 110. Although FIG. 4 depicts aspects in connection with a single wind guard actuator 110, in some examples, such aspects likewise apply one or more of the other wind guard actuator(s) 110. For clarity, the first one of the wind guard actuator(s) 110 of FIG. 4 will be referred to as "the wind guard actuator 110" in connection with FIG. 4. According to the illustrated example of FIG. 4, the wind guard actuator 110 includes a first example portion (e.g., a ball nut) 402 pivotably coupled to a first example bracket 406, for example, via one or more fasteners 408 and/or fastening methods or techniques. Further, the wind guard actuator 110 also includes a second example portion (e.g., a ball screw) 410 pivotably coupled to a second example bracket 412, for example, via one or more fasteners 414 and/or fastening methods or techniques. The wind guard actuator 110 also includes a third example portion (e.g., a link) 416 abutted to the first portion 402. In such examples, the third portion 416 is pivotably coupled to the first bracket 406 and the second bracket 412, for example, via one or more fasteners 418, 420. The first, second, and third portions 402, 410, 416 are sometimes referred to as a parallel linkage system.

In particular, the first portion 402 is configured to generate a force and/or a torque and impart the force and/or the torque on the second portion 410, thereby causing the second portion 410 to move relative to (e.g., toward or away from) the first portion 402 in a third direction 422 and/or a fourth direction 424, opposite the third direction 422, between a first position (e.g., a retracted position) and a second position (e.g., an extended position). As a result of such actuation of the wind guard actuator 110, the second bracket 412 pivots relative to a joint formed by the fastener 420, which changes a position and/or an angle of the first wind guard 310. That is, in some examples, the material guide members 328, 330 and/or, more generally, the first wind guard 310 is/are movable between a first example position (e.g., a lowered position) corresponding to the first position of the second actuator portion 410 and a second example position (e.g., a raised position) corresponding to the second position of the second actuator portion 410. As shown in FIG. 4, the first wind guard 310 is in the first position thereof, and the second position of the first wind guard 310 is represented by the dotted/dashed lines of FIG. 4.

In some examples, a tangent line near an end of the material guide members 328, 330 and a horizontal axis form a first example wind guard angle (e.g., a relatively small angle such as about 5 degrees or less) 426 when the first wind guard 310 is in or near the first position. In other words, the first wind guard 310 has the first angle 426 associated therewith when the first wind guard 310 is in or near the first position. Additionally, in some examples, the tangent line near the end of the material guide members 328, 330 and the horizontal axis form a second example wind guard angle (e.g., about 30 degrees) 428 greater than the first wind guard angle 426 when the first wind guard 310 is in or near the second position. In other words, the first wind guard 310 has the second angle 428 associated therewith when the first wind guard 310 is in or near the second position.

In some examples, the first bracket 406 of FIG. 4 is coupled to the third arm 338, for example, via one or more fasteners and/or fastening methods or techniques. Further, in some examples, the second bracket 412 coupled to the support structure 334, for example, via one or more fasteners and/or fastening methods or techniques.

Additionally, in some examples, the first portion 402 of the wind guard actuator 110 includes an example motor (e.g., an electric motor) operatively coupled thereto and communicatively coupled to the controller 104. However, in some examples, the first portion 402 includes a gear system configured operatively coupled thereto for manual operation of the wind guard actuator 310 by a user.

Figure 5:
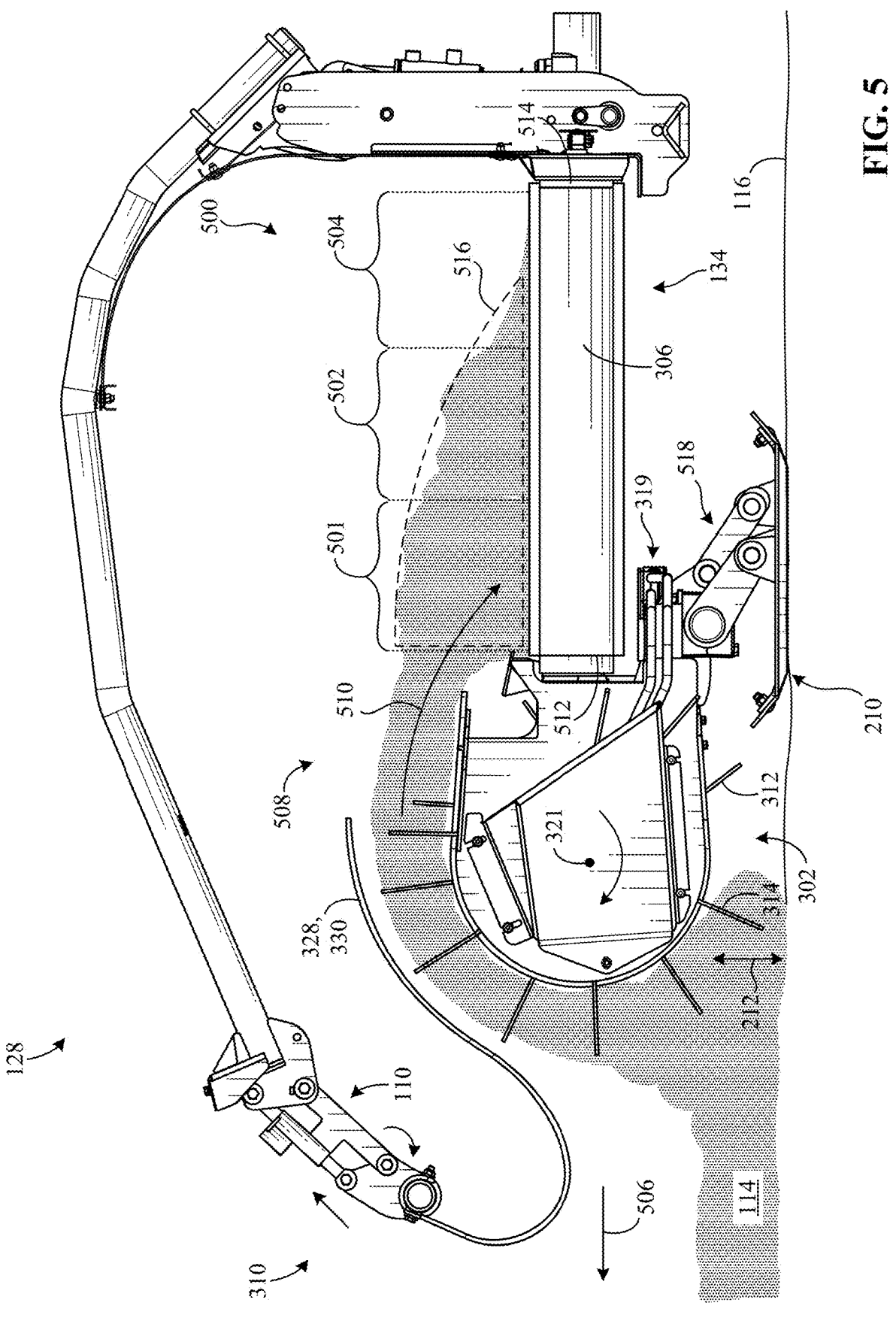
FIGS. 5 and 6 are side views of the example header assembly of FIG. 3 and show an example distribution of the material relative to the conveyor.

FIG. 5 is a side view of the first header assembly 128 and shows an example distribution (e.g., a positional distribution) 500 of the material 114 relative to the conveyor 134. The distribution 500 of FIG. 5 is provided by and/or otherwise corresponds to the first pickup 302. According to the illustrated example of FIG. 5, the first pickup 302 receives the material 114 and provides the material 114 to one or more example areas 501, 502, 504 of the first belt 306 and/or, more generally, of the conveyor 134 as the first header assembly 128 moves along the ground surface 116 in a fifth direction (e.g., a substantially horizontal direction in which the vehicle 159 driving) 506. That is, the conveyor 134 of FIG. 5 includes a first example area (e.g., a front area) 501, a second example area (e.g., a central or intermediate area), and a third example area (e.g., a back area). In particular, the first material extraction members 312, 314 rotate relative to the first axis 321 to engage the material 114, thereby translating the material 114 and/or otherwise carrying at least a first portion 508 of the material 114 around the first axis 321 such as, for example, a portion of an input windrow 118, 120, 122. As a result of the first material extraction members 312, 314 imparting force(s) on the first material portion 508, the first material extraction members 312, 314 eject the first portion 508 of the material 114 therefrom such that the ejected portion 508 substantially travels along an example trajectory 510 toward the first belt 306.

As previously mentioned, the first portion 508 of the material 114 of FIG. 5 follows the trajectory 510 provided by the first pickup 302. The trajectory 510 of FIG. 5 is substantially based on (a) the speed of the first pickup 302 (i.e., the rate at which the first material extraction members 312, 314 rotate relative to the first axis 321) and/or (b) the position and/or the angle 426, 428 of the first wind guard 310. As shown in FIG. 5, the trajectory 510 associated with the material 114 is directed toward the first area 501 of the conveyor, for example, resulting from (a) the first pickup 302 operating at a relatively low speed and/or (b) the wind guard being in or near the first position to limit movement of the first portion 508 when the first portion 508 is translating. In particular, in some examples, the trajectory 510 changes when the speed of the first pickup 302 increases or decreases. Additionally, or alternatively, in some examples, the trajectory 510 changes when the first wind guard 310 moves between the first position and the second position (i.e., when the angle of the first wind guard 310 increases or decreases).

As such, in some examples, the controller 104 is configured to adjust (a) the speed of the first pickup 302 via the first one of the pickup actuator(s) 106 and/or (b) the position and/or the angle of the first wind guard 310 via the wind guard actuator(s) 110, thereby changing the trajectory 510 such that the first material portion 508 is provided to a different area (e.g., the second or third area 502, 504) of the first belt 306. In this manner, the controller 104 adjusts the distribution of the material 114 relative to the conveyor 134 and/or otherwise changes the distribution, as discussed further below in connection with FIG. 6.

As shown in FIG. 5, the material 114 is substantially positioned at or near a first side 512 of the first belt 306 but not a second side 514 of the first belt 306 opposite the first side 512. Stated differently, the material 114 is substantially positioned in the first and second areas 501, 502 but not the third area 504. In particular, in such examples, the material 114 forms and/or defines a first example geometry or shape (e.g., a nonuniform or varying shape) 516 and/or otherwise has the first shape 516 associated therewith when the first translated portion 508 is at or near one of the end(s) 144, 146 of the conveyor 134, as represented by the dotted/dashed lines of FIG. 5. That is, the material 114 of FIG. 5 is not evenly distributed relative to the conveyor 134 when the material 114 is ejected from the end(s) 144, 146 of the conveyor 134 and/or relative to the ground surface 116 after the material 114 is ejected from the end(s) 144, 146. In some examples, such a shape 516 enables the user and/or the controller 104 to determine adjustments for one or more of the actuator(s) 106, 108, 110 associated with adjusting the distribution 500 and/or one or more other distributions of the material 114 relative to the conveyor.

In some examples, to facilitate maintaining the clearance 212, the first header assembly 128 includes one or more example adjusters 518 operatively coupled between the frame 319 of the first header assembly 128 and respective one(s) of the skid shoe(s) 210, one of which is shown in this example. Each of the adjuster(s) 518 includes one or more linkages movably coupling the respective one of the skid shoe(s) 210 to the frame 319. In particular, each of the adjuster(s) 518 includes an example spring (e.g., a coil spring) and/or an example damper (e.g., a fluid damper such as a shock absorber) operatively coupled thereto that are configured to absorb, reduce, mitigate, and/or otherwise eliminate harsh vibrations and/or sudden movements that would have otherwise been experienced by the frame 319 of the first header assembly 128. Additionally, in this manner, the adjuster(s) 518 substantially maintain the clearance 212. In some such examples, the adjuster(s) 518 at least partially form a suspension system of the first header assembly 128 and/or the merger 102.

Additionally, in some examples, each of the adjuster(s) 518 includes an example actuator (e.g., a linear actuator) operatively coupled thereto that is configured to actuate and/or otherwise change between a first position (e.g., a retracted position) and a second position (e.g., an extended position), which causes the linkage(s) to rotate and/or urges a portion of the frame 319 away from the skid shoe(s) 210. As a result, in such examples, the clearance 212 increases or decreases based on output generated by the actuator(s) of the adjuster(s) 518.

Figure 6:
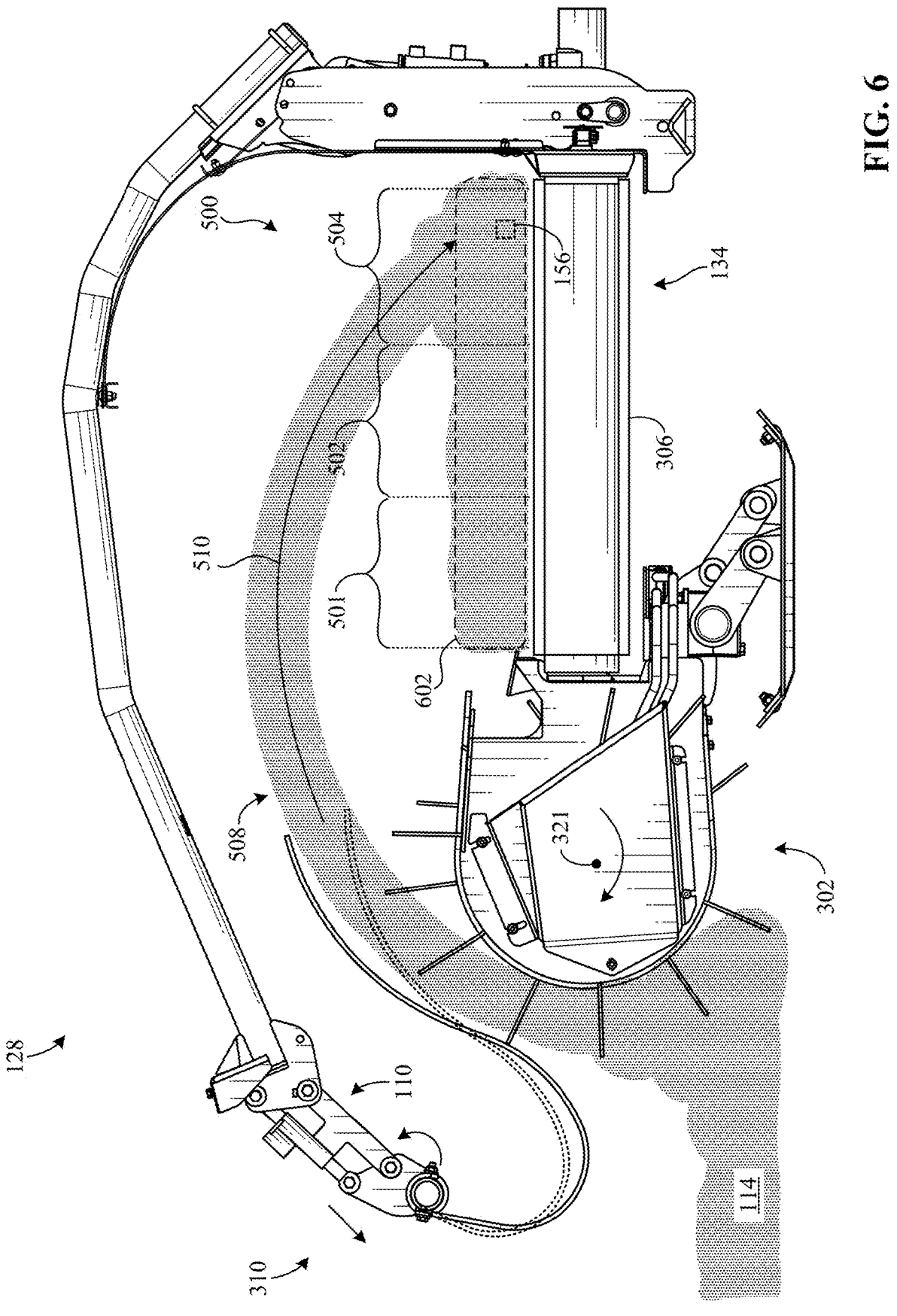

FIG. 6 is another side view of the first header assembly 128 and shows the distribution 500 of the material 114 relative to the conveyor 134. In particular, the distribution 500 of FIG. 6 has changed as a result of the controller 104 and/or a user carrying out example actuator adjustments. Unlike FIG. 5, the trajectory 510 of FIG. 6 is directed toward the third area 504 of the conveyor 134, for example, resulting from (a) the first pickup 302 operating at a relatively high speed and/or (b) the first wind guard 310 being in or near the second position thereof. In some examples, when the disclosed actuator adjustments are carried out, the material 114 is substantially positioned at or near the first side 512 of the first belt 306 and the second side 514 of the first belt 306, as shown in FIG. 6. Stated differently, the material 114 of FIG. 6 is substantially positioned in the first, second, and third areas 501, 502, 504. In particular, when the conveyor 134 conveys the material 114, the portion of the material 114 at the end(s) 144, 146 of the conveyor 134 forms a second example geometry or shape (e.g., a substantially uniform shape) 602 and/or otherwise has the second shape 602 associated therewith, as represented by the dotted/dashed lines of FIG. 6. That is, the material 114 of FIG. 6 is evenly distributed relative to the conveyor 134 when ejected from the end(s) 144, 146 of the conveyor 134 and/or relative to the ground surface 116 after the material 114 is ejected from the end(s) 144, 146. In such examples, the second shape 602 is different from the first shape 516.

In some examples, the first one and/or the second one of wind guard actuator(s) 110 actuates and/or moves from the first position to the second position, which causes the first wind guard 310 to move from the first position (as represented by the dotted/dashed lines of FIG. 6) to the second position. As shown in FIG. 6, the first wind guard 310 is in the second position.

As shown in FIG. 6, the first object of interest 156 is on the first belt 306. In such examples, the controller 104 detects the first object of interest 158 via the sensor(s) 150, for example, when first object of interest 156 is on the first belt 306 and/or when the first object of interest 156 is ejected from the first belt 306.

Although FIGS. 5 and 6 depict aspects in connection with the controller 104 controlling the first pickup 302, in some examples, such aspects likewise apply to one or more other pickup(s) 136 associated with the merger 102 in addition or alternatively to the first pickup 302 such as, for example, any one or more the second pickup 304, the third pickup 808, the fourth pickup 810, the fifth pickup 812, and/or the sixth pickup shown in the merger 102 of FIGS. 8A, 8B, 8C, and 8D, which is discussed in greater detail below in connection with FIGS. 8A, 8B, 8C, and 8D. Further, although FIGS. 5 and 6 depicts aspects in connection with the controller 104 controlling the first belt 306, in some examples, such aspects likewise apply to one or more other conveyor belts 142 associated with the merger 102 in addition or alternatively to the first belt 306 such as, for example, any one or more (e.g., all) of the second belt 308, the third belt 800, the fourth belt 802, the fifth belt 804, and/or the sixth belt 806 shown in the merger 102 of FIGS. 8A, 8B, 8C, and 8D. Further still, although FIGS. 5 and 6 depicts aspects in connection with the controller 104 controlling the first wind guard 310, in some examples, such aspects likewise apply to one or more of the other wind guard(s) 200 associated with the merger 102 in addition or alternatively to the first wind guard 310 such as, for example, the second wind guard 860 and/or the third wind guard 862 shown in the merger of FIGS. 8C and 8D.

Figure 7:
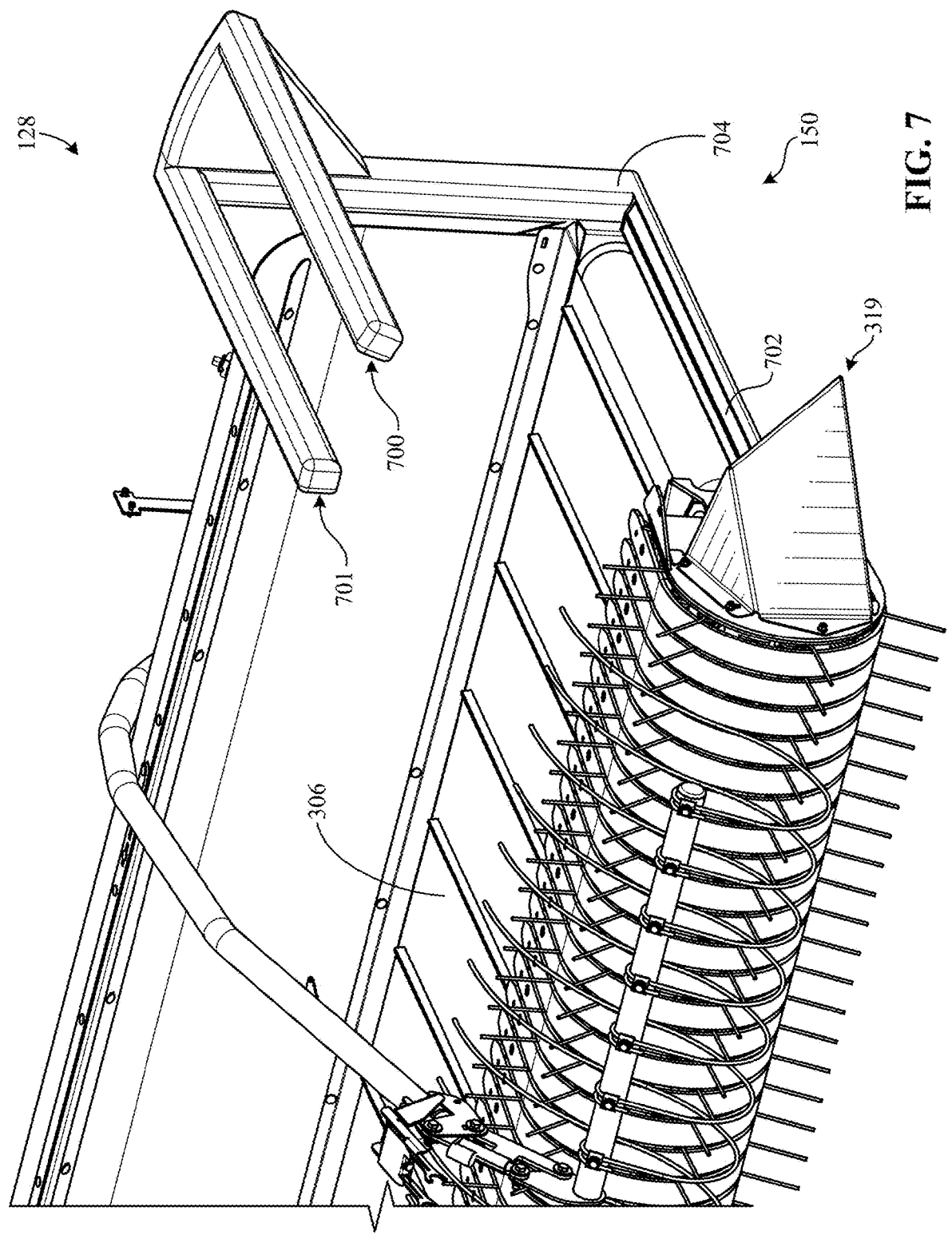
FIG. 7 is an enlarged partial view of the example header assembly of FIG. 3 and shows an example sensor for monitoring an example material.

FIG. 7 is an enlarged partial view of the first header assembly 128 and shows a first one of the sensor(s) 150 for monitoring the material 114. Although FIG. 7 depicts aspects in connection with a single sensor 150, in some example, such aspects likewise apply to one or more of the other sensor(s) 150. For clarity, the first one of the sensor(s) 150 of FIG. 7 will be referred to as "the sensor 150" in connection with FIG. 7. According to the illustrated example of FIG. 7, an example receiver 702 is configured to receive electromagnetic radiation emitted by one or more example sources or generators (e.g., one or more X-ray generators) 700, 701 positioned near the receiver 702, two of which are shown in this example (i.e., a first generator 700 and a second generator 701). In particular, the material 114 passes between the receiver 702 and the generator(s) 700, 701 during merger operation such that the electromagnetic radiation passes through the material 114, which enables the controller 104 to determine a density associated with the material 114 and/or otherwise detect the object(s) 156, 158 of interest based related sensor data.

The sensor 150 of FIG. 7 consist of the receiver 702 supported by the frame 319 of the first header assembly 128 and extending beneath and/or along an end of the first belt 306. That is, the sensor 150 is positioned on the first header assembly 128 at or near a first end 704 of the first header assembly 128 corresponding to one of the end(s) 144, 146 of the conveyor 134. In such examples, the receiver 702 functions cooperatively with the generator(s) 700, 701 to facilitate the detection of one or more objects of interest.

As shown in FIG. 7, each of the generator(s) 700, 701 is supported by the frame 319 and positioned above the first belt 306. Further, as shown in FIG. 7, each of the generator(s) 700, 701 extends substantially parallel relative to the receiver 702 of the sensor 150. In some examples, the receiver 702 and the generator(s) 700, 701 are positioned on different planes, which facilitate objection detection accuracy.

Although FIG. 7 depicts the receiver 702 forming and/or defining the sensor 150, in some examples, the sensor 150 is implemented differently. For example, the sensor 150 of FIG. 7 may include the receiver 702 and the generator(s) 700, 701 such that the receiver 702 and the generator(s) 700, 701 form and/or define a single or complete sensor. In another example, the sensor 150 of FIG. 7 may include only the generator(s) 700, 701 such that the receiver 702 is separate from the sensor 150. In such examples, the generator(s) 700, 701 function cooperatively with the receiver 702 to facilitate the detection of one or more objects of interest.

FIGS. 8A, 8B, 8C, and 8D are partial views of the merger 102 of FIG. 1 and show the merger 102 in different operating modes 801, 803, 805, 807. That is, FIG. 8A shows the merger 102 in a first example operating mode 801 associated with a first characteristic of the merger 102, FIG. 8B shows the merger 102 in a second example operating mode 803 associated with a second characteristic of the merger 102 different from the first characteristic, FIG. 8C shows the merger 102 in a third example operating mode 805 associated with a third characteristic of the merger 102 different from the first and second characteristics, and FIG. 8D shows the merger 102 in a fourth example operating mode 807 associated with a fourth characteristic of the merger 102 different from the first, second, and third characteristics. According to the illustrated example of FIGS. 8A, 8B, 8C, and 8D, the conveyor 134 is formed and/or defined by the first belt 306 of the first header assembly 128, the second belt 308 of the first header assembly 128, a third example belt 800 of the second header assembly 130, a fourth example belt 802 of the second header assembly 130, a fifth example belt 804 of the third header assembly 132, and a sixth example belt 806 of the third header assembly 132. Each of the belts 306, 308, 800, 802, 804, 806 receives the material 114 and/or the input windrow(s) 118, 120, 122 from respective ones of the first pickup 302 of the first header assembly 128, the second pickup 304 of the first header assembly 128, a third example pickup 808 of the second header assembly 130, a fourth example pickup 810 of the second header assembly 130, a fifth example pickup 812 of the third header assembly 132, and a sixth example pickup 814 of the third header assembly 132. As shown in FIGS. 8A, 8B, 8C, and 8D, the first portion 508 of the material 114 is ejected onto and/or otherwise positioned on the first belt 306 by the first pickup 302, a second portion 816 of the material 114 is ejected onto and/or otherwise positioned on the second belt 308 by the second pickup 304, a third portion 818 of the material 114 is ejected onto and/or otherwise positioned on the third belt 800 by the third pickup 808, a fourth portion

820 of the material 114 is ejected onto and/or otherwise positioned on the fourth belt 802 by the fourth pickup 810, a fifth portion 822 of the material 114 is ejected onto and/or otherwise positioned on the fifth belt 804 by the fifth pickups 812, and a sixth portion 824 of the material 114 is ejected onto and/or otherwise positioned on the sixth belt 806 by the sixth pickup 814.

According to the illustrated examples of FIGS. 8A, 8B, 8C, and 8D, each of the pickups 302, 304, 808, 810, 812, 814 is operatively coupled to a respective one of the pickup actuator(s) 106. In such examples, the first pickup 302 is operatively coupled to the first one of the pickup actuator(s) 106 such that an output generated by the first one of the pickup actuator(s) 106 drives the first pickup 302, and the second pickup 304 is operatively coupled to the second one of the pickup actuator(s) 106 such that an output generated by the second one of the pickup actuator(s) 106 drive the second pickup 304, as previously mentioned. Additionally, the third pickup 808 is operatively coupled to a third one of the pickup actuator(s) 106 such that an output generated by the third one of the pickup actuator(s) 106 drives the third pickup 808. Additionally, the fourth pickup 810 is operatively coupled to a fourth one of the pickup actuator(s) 106 such that an output generated by the fourth one of the pickup actuator(s) 106 drives the fourth pickup 810. Additionally, the fifth pickup 812 is operatively coupled to a fifth one of the pickup actuator(s) 106 such that an output generated by the fifth one of the pickup actuator(s) 106 drives the fifth pickup 812. Additionally, the sixth pickup 814 is operatively coupled to a sixth one of the pickup actuator(s) 106 such that an output generated by the sixth one of the pickup actuator(s) 106 drives the sixth pickup 810.

The pickups 302, 304, 808, 810, 812, 814 are connected in series and/or adjacent to each other. For example, the first pickup 302 is adjacent the second pickup 304, the second pickup 304 is interposed between and/or adjacent the first and third pickups 302, 808, the third pickup 808 is interposed between and/or adjacent the second and fourth pickups 304, 810, the fourth pickup 810 is interposed between and/or adjacent the third and fifth pickups 808, 812, 800, the fifth pickup 812 is interposed between and/or adjacent the fourth and sixth pickups 810, 814, and the sixth pickup 814 is adjacent the fifth pickup 812.

Further, each of the belts 306, 308, 800, 802, 804, 806 of FIGS. 8A, 8B, 8C, and 8D is operatively coupled to a respective one of the conveyor actuator(s) 108. In such examples, the first belt 306 is operatively coupled to the first one of the conveyor actuator(s) 108 such that an output generated by the first one of the conveyor actuator(s) 108 drives the first belt 306, and the second belt 308 is operatively coupled to the second one of the conveyor actuator(s) 108 such that an output generated by the second one of the conveyor actuator(s) 108 drives the second belt 308, as previously mentioned. Additionally, the third belt 800 is operatively coupled to a third one of the conveyor actuator(s) 108 such that an output generated by the third one of the conveyor actuator(s) 108 drives the third belt 800. Additionally, the fourth belt 802 is operatively coupled to a fourth one of the conveyor actuator(s) 108 such that an output generated by the fourth one of the conveyor actuator(s) 108 drives the fourth belt 802. Further still, the fifth belt 804 is operatively coupled to a fifth one of the conveyor actuator(s) 108 such that an output generated by the fifth one of the conveyor actuator(s) 108 drives the fifth belt 804. Additionally, the sixth belt 806 is operatively coupled to a sixth one of the conveyor actuator(s) 108 such that an output generated by the sixth one of the conveyor actuator(s) 108 drives the sixth belt 806.

The belts 306, 308, 800, 802, 804, 806 are connected in series and/or adjacent to each other. For example, the first belt 306 is adjacent the second belt 308, the second belt 308 is interposed between and/or adjacent the first and third belts 306, 800, the third belt 800 is interposed between and/or adjacent the second and fourth belts 308, 802, the fourth belt 802 is interposed between and/or adjacent the third and fifth belts 800, 804, the fifth belt 804 is interposed between and/or adjacent the fourth and sixth belts 802, 806, and the sixth belt 806 is adjacent the fifth belt 804.

As previously mentioned, the merger 102 of FIG. 8A is in the first operating mode thereof. In particular, according to the illustrated example of FIG. 8A, the controller 104 is configured to control, via the conveyor actuator(s) 108, the belt(s) 306, 308, 800, 802, 804, 806 such that a conveyor speed associated with the conveyor 134 varies (e.g., decreases or increases) along at least a portion of the length 140 of the merger 102 in one or more directions (e.g., opposite directions) 826, 828 in which the material 114 is being discharged or conveyed by the conveyor 134, which varies a distribution of the material 114 along at least the portion of the length 140 of the merger 102. In other words, in some examples, the controller 104 directs the conveyor actuator(s) 108 to generate and/or form a first example conveyor speed gradient at least partially across the merger length 140 whereby each subsequent one of the belts 306, 308, 800, 802, 804, 806 in one of the directions 826, 828 is moving at a higher speed compared to an adjacent or previous one of the belts 306, 308, 800, 802, 804, 806. As shown in FIG. 8A, the conveyor 134 is conveying the material 114 in the sixth direction (e.g., a substantially horizontal direction) 826 and the seventh direction (e.g., a substantially horizontal direction) 828 opposite the sixth direction 826.

In such examples, a distribution (e.g., a density distribution) of the material 114 relative to a particular belt 306, 308, 800, 802, 804, 806 is based on a speed of that belt 306, 308, 800, 802, 804, 806. More particularly, as the belt speed increases, a rate of a surface area of that belt 306, 308, 800, 802, 804, 806 available for conveying the material 114 increases. In some such examples, an amount of the material 114 per area or volume of the belt 306, 308, 800, 802, 804, 806 is relatively low when the belt speed is relatively high. Conversely, as the belt speed decreases, the rate of surface area of that belt 306, 308, 800, 802, 804, 806 decreases. In some such examples, the amount of the material 114 per area or volume of the belt 306, 308, 800, 802, 804, 806 is relatively high when the belt speed is relatively low.

In some examples, the controller 104 controls, via the first one of the conveyor actuator(s) 108, the first belt 306 of FIG. 8A to move at a first example belt speed (e.g., a relatively fast speed such as a speed that is about 15 feet per second or more) in the sixth direction 826. As a result of such control, when the first pickup 302 provides the first material portion 508 to the first belt 306, the first belt 306 further translates the material portion 508 to provide a first example distribution (e.g., a relatively low density) 830 of the material 114 relative to the first belt 306 (i.e., relative to the conveyor 134). Further, in such examples, as the first belt 306 of FIG. 8A continues operating at the first belt speed, the first belt 306 ejects the first material portion 508, the second material portion 816, and the third material portion 818 from the first end 144 of the conveyor 134, thereby forming the fourth windrow 124 on the ground surface 116.

Additionally, in some examples, the controller 104 controls, via the second one of the conveyor actuator(s) 108, the second belt 308 of FIG. 8A to move at a second example belt speed (e.g., a moderate speed such as a speed that is between about 12 feet per second and about 15 feet per second) in the sixth direction 826. In some such examples, the second belt speed is less than the first belt speed. As a result of such control, when the second pickup 304 provides the second material portion 816 to the second belt 308, the second belt 308 further translates the second material portion 816 to provide a second example distribution (e.g., a moderate density) 832 of the material 114 relative to the second belt 308 (i.e., relative to the conveyor 134). Further, in such examples, as the second belt 308 of FIG. 8A continues operating at the second belt speed, the second belt 308 transfers the second material portion 816 and the third material portion 818 from the second belt 308 to the first belt 306, which combines the first, second, and third material portions 508, 816, 818.

Additionally, in some examples, the controller 104 controls, via the third one of the conveyor actuator(s) 108, the third belt 800 of FIG. 8A to move at a third example belt speed (e.g., a relatively low speed such as a speed that is about a 12 feet per second or less) in the sixth direction 826. In some such examples, the third belt speed is less than the first and second belt speeds. As a result of such control, when the third pickup 808 provides the third material portion 818 to the third belt 800, the third belt 800 further translates the third material portion 818 to provide a third example distribution (e.g., a relatively high density) 834 of the material 114 relative to the third belt 800 (i.e., relative to the conveyor 134). Further, in such examples, as the third belt 800 continues operating at the third belt speed, the third belt 800 transfers the third material portion 818 from the third belt 800 to the second belt 308, which combines the second and third material portions 816, 818.

In some examples, the controller 104 generates the first conveyor speed gradient using all or only some of the belts 306, 308, 800, 802, 804, 806 of FIG. 8A. For example, according to the illustrated example of FIG. 8A, the controller 104 controls the first, second, and third belts 306, 308, 800 via the respective first, second, and third ones of the conveyor actuator(s) 108 to provide the first conveyor speed gradient, which extends partially across the merger length 140 in the sixth direction 826 from the third belt 800 to the first belt 306 in this example. In some such examples, each of the first, second, and third belts 306, 308, 800 of FIG. 8A is operating at a unique belt speed and, thus, provides a unique distribution of the material 114 relative thereto based on the belt speed.

Although FIG. 8A depicts only the first, second, and third belts 306, 308, 800 moving in the sixth direction 826, in some examples, the controller 104 controls any one or more (e.g., all) of the fourth, fifth, and sixth belts 802, 804, 806 to move in the sixth direction 826 in addition or alternatively to the first, second, and third belts 306, 308, 800. On the other hand, in some examples, the controller 104 controls any one or more (e.g., all) of the first belt, 306, the second belt 308, the third belt 800, the fourth belt 802, the fifth belt 804, and/or the sixth belt 806 to move in the seventh direction 828.

In some examples, to facilitate user control, the merger 102 includes first and second reconfigurable portions 836, 838 that are structured to move the material 114 in opposite directions, two of which are shown in this example (i.e., a first reconfigurable portion 836 and a second reconfigurable portion 838). According to the illustrated example of FIG.

8A, the first reconfigurable portion 836 of the merger 102 includes the first header assembly 128 and part of the second header assembly 130 such as, for example, the first, second, and third belts 306, 308, 800, each of which is moving the material 114 in the sixth direction 826 (i.e., the same direction) in this example. Further, according to the illustrated example of FIG. 8A, the second reconfigurable portion 838 of the merger 102 includes the third header assembly 132 and a different part of the second header assembly 130 such as, for example, the fourth, fifth, and sixth belts 802, 804, 806, each of which is moving the material 114 in the seventh direction 828 in this example. As shown in FIG. 8A, the seventh direction 828 is opposite the sixth direction 826.

In such examples, the controller 104 controls, via the fourth one of the conveyor actuator(s) 108, the fourth belt 802 of FIG. 8A to move at a fourth example belt speed (e.g., a relatively low speed that is substantially equal to the third belt speed) in the seventh direction 828. As a result of such control, when the fourth pickup 810 provides the fourth material portion 820 to the fourth belt 802, the fourth belt 802 further translates the fourth material portion 820 to provide a fourth example distribution (e.g., a relatively high density) 842 of the material 114 relative to the fourth belt 802 (i.e., relative to the conveyor 134). Further, as the fourth belt 802 of FIG. 8A continues operating at the fourth belt speed, the fourth belt 802 transfers the fourth material portion 820 from the fourth belt 802 to the fifth belt 804, which combines the fourth and fifth material portions 820, 822.

Additionally, in some examples, the controller 104 controls, via the fifth one of the conveyor actuator(s) 108, the fifth belt 804 of FIG. 8A to move at a fifth example belt speed (e.g., a moderate speed substantially equal to the second speed) in the seventh direction 828. In some such examples, the fifth belt speed is greater than the fourth belt speed. As a result of such control, when the fifth pickup 812 provides the fifth material portion 822 to the fifth belt 804, the fifth belt 804 further translates the fifth material portion 822 to provide a fifth example distribution (e.g., a moderate density) 844 of the material 114 relative to the fifth belt 804 (i.e., relative to the conveyor 134). Further, as the fifth belt 804 of FIG. 8A continues operating at the fifth belt speed, the fifth belt 804 transfers the fourth and fifth material portions 820, 822 to the sixth belt 806, which combines the fourth, fifth, and sixth material portions 820, 822, 824.

Additionally, in some examples, the controller 104 controls, via the sixth one of the conveyor actuator(s) 108, the sixth belt 806 of FIG. 8A to move at a sixth example belt speed (e.g., a relatively high speed substantially equal to the first belt speed) in the seventh direction 828. In some such examples, the sixth belt speed is greater than the fourth and fifth belt speeds. As a result of such control, when the sixth pickup 814 provides the sixth material portion 824 to the sixth belt 806, the sixth belt 806 further translates the sixth material portion 824 to provide a sixth example distribution (e.g., a relatively low density) 846 of the material 114 relative to the sixth belt 806 (i.e., relative to the conveyor 134). Further, in such examples, as the sixth belt 806 of FIG. 8A continues operating at the sixth belt speed, the sixth belt 806 ejects the fourth material portion 820, the fifth material portion 822, and the sixth material portion 824 from the second end 146 of the conveyor 134, thereby forming the fifth windrow 126 on the ground surface 116.

In other words, in such examples, the controller 104 controls the fourth, fifth, and sixth belts 802, 804, 806 via the respective fourth, fifth, and sixth ones of the conveyor actuator(s) 108 to generate and/or form a second example conveyor speed gradient, which extends partially across the merger length 140 in the seventh direction 828 from the fourth belt 802 to the sixth belt 806 in this example. In some such examples, each of the fourth, fifth, and sixth belts 802, 804, 800 of FIG. 8A is operating at a unique belt speed and, thus, provides a unique distribution of the material 114 relative thereto based on the belt speed.

In some examples, as shown in FIG. 8A, two of the sensor(s) 150 are positioned at or near the opposite ends 144, 146 of the conveyor 134 to detect and/or facilitate detecting the parameter(s) associated with the material 114. For example, the controller 104 detects the first shape 516 and/or the second shape 602 associated with the material 114 via the sensor(s) 150 of FIG. 8A when the material 114 is at or near the first end 144 and/or the second end 146.

The first and second reconfigurable portions 836, 838 of FIG. 8A are substantially symmetrical relative to a third example axis (e.g., a symmetry axis) 840 when the merger 102 is in the first operating mode. In such examples, as a result of the merger 102 processing the material 114 in the first operating mode, the fourth and fifth windrows 124, 126 are substantially the same size and/or shape when the merger 102 forms the fourth and fifth windrows 124, 126 on the ground surface 116. However, in some examples, the first and second reconfigurable merger portions 836, 838 are implemented differently when the merger 102 is in the first operating mode and/or shifts or changes to a different operating mode, which is discussed further below in connection with FIGS. 8B, 8C, and 8D. In particular, a user may configure the merger portions 836, 838 differently via interacting with the input device(s) 152.

In some examples, in response to a user interacting with the input device(s) 152, the controller 104 adjusts at least some of the output(s) of the respective actuator(s) 106, 108, 110 to change and/or transition the merger 102 from the first operating mode thereof to a different operating mode thereof. In such examples, the reconfigurable portions 836, 838 of the merger 102 change based on the selection(s) and/or input(s) provided to the input device(s) 152.

According to the illustrated example of FIG. 8B, the controller 104 changed the reconfigurable merger portions 836, 838, for example, based on a user selection or request corresponding to the second operating mode 803 of the merger 102. As previously mentioned, FIG. 8B shows the merger 102 in the second operating mode 803 thereof. That is, the first reconfigurable portion 836 of FIG. 8B includes the first, second, third, and fourth belts 306, 308, 800, 802, each of which is moving in the sixth direction 826 in this examples. In particular, in such examples, the controller 104 controls the first, second, third, and fourth belts 306, 308, 800, 802 via the respective, first, second, third, and fourth ones of the conveyor actuator(s) 108 to generate and/or form the first conveyor speed gradient, which extends partially across the merger length 140 in the sixth direction 826 from the fourth belt 802 to the first belt 306 in this example. As such, according to the illustrated example of FIG. 8B, the fourth belt speed is less than the third belt speed, the third belt speed is less than the second belt speed, and the second belt speed is less than the first belt speed.

Further, the second reconfigurable portion 838 of FIG. 8B includes the fifth and sixth belts 804, 806, each of which is moving in the seventh direction 828 in this example. In particular, the controller 104 controls the fifth and sixth belts 804, 806 via the respective fifth and sixth conveyor actuator(s) 108 to generate and/or form the second conveyor speed gradient, which extends partially across the merger length 140 in the seventh direction 828 from the fifth belt 804 to the sixth belt 806 in this example. As such, according to the illustrated example of FIG. 8B, the fifth belt speed is less than the sixth belt speed.

The reconfigurable portions 836, 838 of FIG. 8B are not symmetrical relative to the axis 840. In such examples, as a result of the merger 102 processing the material 114 in the second operating mode 803, the fourth windrow 124 is substantially larger and/or shaped differently relative to the fifth windrow 126

According to the illustrated example of FIG. 8C, the controller 104 changed the reconfigurable merger portions 836, 838, for example, based on a user selection or request corresponding to the third operating mode 805 of the merger 102. As previously mentioned, FIG. 8C shows the merger 102 in the third operating mode 805 thereof. In particular, according to the illustrated example of FIG. 8C, the controller 104 is controlling, via the pickup actuator(s) 106, the pickups 302, 304, 808, 810, 812, 814 such that a pickup speed associated with the header assemblies 128, 130, 132 varies (e.g., decreases or increases) along at least a portion of the length 140 of the merger 102 in the direction(s) 826, 828 in which the material 114 is being discharged, which varies a distribution of the material 114 along at least the portion of the length 140. In other words, in some examples, the controller 104 controls the pickup(s) 302, 304, 808, 810, 812, 814 via the respective pickup actuator(s) 106 to generate and/or form a first example pickup speed gradient at least partially across the merger length 140 whereby each subsequent one of the pickups 302, 304, 808, 810, 812, 814 in one of the direction(s) 826, 828 is operating at a lower speed compared to an adjacent or previous one of the pickups 302, 304, 808, 810, 812, 814. As shown in FIG. 8C, the conveyor 134 is conveying the material 114 in the sixth direction 826 across the first reconfigurable portion 836 and the seventh direction 828 across the second reconfigurable portion 838.

As previously mentioned, in some examples, a distribution of the material 114 relative to a particular belt 306, 308, 800, 802, 804, 806 is based on a speed of a respective one of the pickups 302, 304, 808, 810, 812, 814. More particularly, as the pickup speed increases, the material 114 is thrown further away from the respective one of the pickups 302, 304, 808, 810, 812, 814. Conversely, as the pickup speed decreases, the material 114 is thrown closer to the respective one of the pickups 302, 304, 808, 810, 812, 814.

In some examples, the controller 104 controls, via the first one of the pickup actuator(s) 106, the first pickup 302 of FIG. 8C to operate at a first example pickup speed (e.g., relatively low speed such as a speed that is about 75 RPM or less). As a result of such control, the first pickup 302 translates the first material portion 508 to provide a seventh example distribution 848 of the material 114 relative to the first belt 306 (i.e., relative to the conveyor 134), which corresponds to the first material portion 508 being positioned substantially or mostly in the first area 501 of the conveyor.

Additionally, in some examples, the controller 104 controls, via the second one of the pickup actuator(s) 106, the second pickup 304 of FIG. 8C to operate at a second example pickup speed (e.g., a moderate speed such as a speed that is between about 75 RPM and about 125 RPM). In some such examples, the second pickup speed is greater than the first pickup speed. As a result of such control, the second pickup 304 translates the second material portion 816 to provide an eighth example distribution 850 of the material 114 relative to the second belt 308 (i.e., relative to the conveyor 134), which corresponds to the second material portion 816 being positioned substantially or mostly in the second area 502 of the conveyor 134.

Additionally, in some examples, the controller 104 controls, via the third one of the pickup actuator(s) 106, the third pickup 808 of FIG. 8C to operate at a third example pickup speed (e.g., a relatively high speed such as a speed that is about 125 RPM or more). In some such examples, the third pickup speed is greater than the second pickup speed. As a result of such control, the third pickup 808 translates the third material portion 818 to provide a ninth example distribution 852 of the material 114 relative to the third belt 800 (i.e., relative to the conveyor 134), which corresponds to the third material portion 818 being positioned substantially or mostly in the third area 504 of the conveyor 134.

In some examples, the controller 104 controls all or only some of the pickups 302, 304, 808, 810, 812, 814 of FIG. 8C to provide the first pickup speed gradient. According to the illustrated example of FIG. 8C, the first reconfigurable portion 836 of the merger 102 includes the first header assembly 128 and part of the second header assembly 130 such as, for example, the first, second, and third pickups 302, 304, 808. In particular, in such examples, the controller 104 controls the first, second, and third pickups 302, 304, 808 via the respective first, second, and third ones of the pickup actuator(s) 106 to provide the first pickup speed gradient, which extends partially across the merger length 140 in the sixth direction 826 from the third pickup 808 to the first pickup 302 in this example. As such, the first pickup speed is less than the second pickup speed, and the second pickup speed is less than the third pickup speed. In such examples, each of the first, second, and third pickups 302, 304, 808 of FIG. 8C is operating at a unique pickup speed and, thus, provides a unique distribution of the material 114 relative to respective ones of the first, second, and third belts 306, 308, 800 based on the pickup speed.

Further, according to the illustrated example of FIG. 8C, the second reconfigurable portion 838 of the merger 102 includes the third header assembly 132 and a different part of the second header assembly 130 such as, for example, the fourth, fifth, and sixth pickups 810, 812, 814. In particular, in such examples, the controller 104 controls the fourth, fifth, and sixth pickups 810, 812, 814 via the respective fourth, fifth, and sixth ones of the pickup actuator(s) 106 to provide a second example pickup speed gradient, which extends partially across the merger length 140 in the seventh direction 828 from the fourth pickup 810 to the sixth pickup 814 in this example. In such examples, each of the fourth, fifth, and sixth pickups 810, 812, 814 of FIG. 8C is operating at a unique pickup speed and, thus, provides a unique distribution of the material 114 relative to respective ones of the fourth, fifth, and sixth belts 802, 804, 806 based on the pickup speed.

In such examples, the controller 104 controls, via the fourth one of the pickup actuator(s) 106, the fourth pickup 810 of FIG. 8C to operate at a fourth example pickup speed (e.g., a relatively high speed such as a speed that is substantially equal to the third pickup speed). As a result of such control, the fourth pickup 810 translates the fourth material portion 820 to provide a tenth example distribution 854 of the material 114 relative to the fourth belt 802 (i.e., relative to the conveyor 134), which corresponds to the fourth material portion 820 being positioned substantially or mostly in the third area 504 of the conveyor 134.

Additionally, in some examples, the controller 104 controls, via the fifth one of the pickup actuator(s) 106, the fifth pickup 812 of FIG. 8C to operate at a fifth example pickup speed (e.g., a moderate speed such as a speed that is substantially equal to the second pickup speed). In some such examples, the fifth pickup speed is less than the fourth pickup speed. As a result of such control, the fifth pickup 812 translates the fifth material portion 822 to provide an eleventh example distribution 856 of the material 114 relative to the fifth belt 804 (i.e., relative to the conveyor 134), which corresponds to the fifth material portion 822 being positioned substantially or mostly in the second area 502 of the conveyor 134.

Additionally, in some examples, the controller 104 controls, via the sixth one of the pickup actuator(s) 106, the sixth pickup 814 of FIG. 8A to operate at a sixth example pickup speed (e.g., a relatively low speed such as a speed that is substantially equal to the first pickup speed). In some such examples, the sixth pickup speed is less than the fifth pickup speed. As a result of such control, the sixth pickup 814 translates the sixth material portion 824 to provide a twelfth example distribution 858 of the material 114 relative to the sixth belt 806 (i.e., relative to the conveyor 134), which corresponds to the sixth material portion 824 being positioned substantially or mostly in the first area 501 of the conveyor 134.

Although the FIG. 8C depicts the pickups 302, 304, 808, 810, 812, 814 distributing the material 114 relative to the conveyor 134, in some examples, the controller 104 controls the first wind guard 310 of the first header assembly 128 (as represented by the dotted/dashed lines of FIG. 8C), a second example wind guard 860 (as represented by the dotted/dashed lines of FIG. 8C) of the second header assembly 130, and a third example wind guard 862 (as represented by the dotted/dashed lines of FIG. 8C) of the third header assembly 132 to similarly provide the respective seventh, eighth, ninth, tenth, eleventh, and twelfth material distributions 848, 850, 852, 854, 856, 858. In such examples, each of the wind guards 310, 860, 862 is operatively coupled to a respective one of the wind guard actuator(s) 110. For example, the first wind guard 310 is operatively coupled to the first one and/or the second one of the wind guard actuator(s) 110 such that output generated by the first one and/or the second one of the wind guard actuator(s) 110 drives the first wind guard 310, as previously mentioned. Additionally, in some examples, the second wind guard 860 is operatively coupled to a third one and/or a fourth one of the wind guard actuator(s) 110 such output generated by the third one and/or the fourth one of the wind guard actuator(s) 110 drives the second wind guard 860. Additionally, in some examples, the third wind guard 862 is operatively coupled to a fifth one and/or a sixth one of the wind guard actuator(s) 110 such that an output generated by the fifth and/or the sixth one of the wind guard actuator(s) drives the third wind guard 862.

The wind guards 310, 860, 862 are connected in series and/or adjacent to each other. For example, the first wind guard 310 is adjacent the second wind guard 860, the second wind guard 860 is interposed between and/or adjacent the first and third wind guards 310, 862, and the third wind guard 862 is adjacent the second wind guard 860.

In such examples, when the merger 102 is in the third operating mode 805, the controller 104 controls the wind guard(s) 310, 860, 862 via the wind guard actuator(s) 110 such that a wind guard angle 426, 428 and/or a wind guard position varies (e.g., decreases or increases) along at least a portion of the length 140 of the merger 102 in the directions 826, 828, which varies a distribution of the material 114 along at least the portion of the length 140. In other words, in some examples, the controller 104 controls the wind guard(s) 310, 860, 862 via the wind guard actuator(s) 110 to generate and/or form a first example wind guard angle gradient at least partially across the merger length 140 whereby each subsequent one of the wind guards 310, 860, 862 in one of the directions 826, 828 has a smaller angle 426, 428 associated therewith compared to an adjacent or a previous one of the wind guards 310, 860, 862.

In some examples, the controller 104 controls, via the first one and/or the second one of the wind guard actuator(s) 110, the first wind guard 310 of FIG. 8C to move to the first position (e.g., the lowered position) or an intermediate position (e.g., a partially raised position) between the first and second positions of the first wind guard 310. As a result of such control, when the first and second pickups 302, 304 provide the first and second material portions 508, 816 to the first wind guard 310, the first wind guard 310 guides movement of the first and second material portions 508, 816 to provide the respective seventh and eighth distributions 848, 850.

Additionally, in some examples, the controller 104 controls, via the third one and/or the fourth one of the wind guard actuator(s) 110, the second wind guard 860 of FIG. 8C to move to the second position (e.g., the raised position) of the second wind guard 860. As a result of such control, when the third and fourth pickups 808, 810 provide the third and fourth material portions 818, 820 to the second wind guard 860, the second wind guard 860 guides movement of the third and fourth material portions 818, 820 to provide the respective ninth and tenth distributions 852, 854.

Additionally, in some examples, the controller 104 controls, via the fifth one and/or the sixth one of the wind guard actuator(s) 110, the third wind guard 862 of FIG. 8C to move to the first position (e.g., the raised position) or an intermediate position (e.g., a partially raised position) between the first and second positions of the third wind guard 862. As a result of such control, when the fifth and sixth pickups 812, 814 provide the fifth and sixth material portions 822, 824 to the third wind guard 862, the third wind guard 862 guides movement of the fifth and sixth material portions 822, 824 to provide the respective eleventh and twelfth distributions 856, 858.

In some examples, the controller 104 controls all or only some of the wind guards 310, 860, 862 of FIG. 8C to provide the first wind guard angle gradient. According to the illustrated example of FIG. 8C, the first reconfigurable portion 836 of the merger 102 includes the first wind guard 310 and a portion of the second wind guard 860. In such examples, the controller 104 controls the first and second wind guards 310, 860 via the respective first, second, and third ones of the wind guard actuator(s) 110 to provide the first wind guard gradient, which extends partially across the merger length 140 in the sixth direction 826 from a portion of the second wind guard 860 to the first wind guard 310 in this example. In such examples, each of the first and second wind guards 310, 860 is at a unique position and/or angle and, thus, provides a unique distribution of the material 114 relative to respective ones of the first, second, and third belts 306, 308, 800 based on the position.

Further, in some examples, the second reconfigurable portion 838 of FIG. 8C includes the third wind guard 862 and a different portion of the second wind guard 860. In such examples, the controller 104 controls the second and third wind guards 860, 862 via the respective fourth, fifth, and sixth ones of the wind guard actuator(s) 110 to generate and/or form a second example wind guard gradient, which extends partially across the merger length 140 in the seventh direction 828 from a portion of the second wind guard 860 to the third wind guard 862 in this example. In such examples, each of the third and second wind guards 860, 862 is at a unique position and/or angle and, thus, provides a unique distribution of the material 114 relative to respective ones of the fourth, fifth, and sixth belts 802, 804, 806 based on the position.

According to the illustrated example of FIG. 8D, the controller 104 changed the reconfigurable merger portions 836, 838, for example, based on a user selection or request corresponding to the fourth operating mode 807 of the merger 102. As previously mentioned, FIG. 8D shows the merger 102 in the fourth operating mode 807 thereof. That is, the first reconfigurable portion 836 of FIG. 8D includes the first, second, third, and fourth pickups 302, 304, 808, 810. In particular, in such examples, the controller 104 controls the first, second, third, and fourth pickups 302, 304, 808, 810 via the respective, first, second, third, and fourth ones of the pickup actuator(s) 106 to generate the first pickup speed gradient, which extends partially across the merger length 140 in the sixth direction 826 from the fourth pickup 810 to the first pickup 302 in this example. As such, according to the illustrated example of FIG. 8D, the fourth pickup speed is greater than the third pickup speed, the third pickup speed is greater than the second pickup speed, and the second pickup speed is greater than the first pickup speed.

Additionally or alternatively, in some examples, the first reconfigurable merger portion 836 of FIG. 8D includes the first wind guard 310 and the second wind guard 860. In particular, in such examples, the controller 104 controls the first and second wind guards 310, 860 via the respective first, second, third, and fourth wind guard actuator(s) 110 to generate and/or form the first wind guard gradient, which extends partially across the merger length 140 in the sixth direction 826 from the second wind guard 860 to the first wind guard 310 in this example.

Further, the second reconfigurable portion 838 of the merger 102 includes the fifth and sixth pickups 812, 814. In particular, in such examples, the controller 104 controls the fifth and sixth pickups 812, 814 via the respective fifth and sixth pickup actuator(s) 106 to generate and/or form the second pickup speed gradient, which extends partially across the merger length 140 in the seventh direction 828 from the fifth pickup 812 to the sixth pickup 814 in this example. As such, according to the illustrated example of FIG. 8D, the fifth pickup speed is greater than the sixth pickup speed.

Additionally or alternatively, in some examples, the second reconfigurable portion 838 of FIG. 8D includes the third wind guard 862. In particular, in such examples, the controller 104 controls the third wind guard 864 via the respective fifth and sixth ones of the wind guard actuator(s) 110 to generate and/or form the second wind guard gradient across the third wind guard 864 in the seventh direction 828.

In some examples, conveyor 134 is configured to particularly deposit the material 114 on the ground surface 116 relative to the completed windrow(s) 168, as previously mentioned. In such examples, the merger controller 104 controls the first belt 306 via the first one of the conveyor actuator(s) 108 to eject at least a portion of the material 114 from the first conveyor end 144 such that, when the fourth windrow 124 is formed, the fourth windrow 124 is positioned on or near (e.g., adjacent) a first one of the completed windrow(s) 168. Similarly, in some such examples, the merger controller 104 controls the sixth belt 806 via the sixth one of the conveyor actuator(s) 108 to eject at least a portion of the material 114 from the second conveyor end 146 such that, when the fifth windrow 126 is formed, the fifth windrow 126 is positioned on or near (e.g., adjacent) a second one of the completed windrow(s) 168.

As used herein, the term "movable device" refers to (a) any one of the belt(s) 142, 306, 308, 800, 802, 804, 806, (b) any one of the pickup(s) 136, 302, 304, 808, 810, 812, 814, and/or (c) any one of the wind guard(s) 200, 310. That is, each of the pickup(s) 136 of FIGS. 1 and 2, the first pickup 302 of FIGS. 3, 5, 6, 8A, 8B, 8C, and 8D, the second pickup 304 of FIGS. 3, 8A, 8B, 8C, and 8D, the third pickup 808 of FIGS. 8A, 8B, 8C, and 8D, the fourth pickup 810 of FIGS. 8A, 8B, 8C, and 8D, the fifth pickup 812 of FIGS. 8A, 8B, 8C, and 8D, and/or the sixth pickup 814 of FIGS. 8A, 8B, 8C, and 8D is sometimes referred to as a movable device. Similarly, each of the belt(s) 142 of FIGS. 1 and 2, the first belt 306 of FIGS. 3, 5-7, 8A, 8B, 8C, and 8D, the second belt 308 of FIGS. 3, 8A, 8B, 8C, and 8D, the third belt 800 of FIGS. 8A, 8B, 8C, and 8D, the fourth belt 802 of FIGS. 8A, 8B, 8C, and 8D, the fifth belt 804 of FIGS. 8A, 8B, 8C, and 8D, and the sixth belt 806 of FIGS. 8A, 8B, 8C, and 8D is sometimes referred to as a movable device. Similarly, each of the wind guard(s) 200 of FIG. 2, the first wind guard 310 of FIGS. 3-6, 8C, and 8D, the second wind guard 860 of FIGS. 8C and 8D, and the third wind guard 862 of FIGS. 8C and 8D is sometimes referred to as a movable device.

Figure 9:
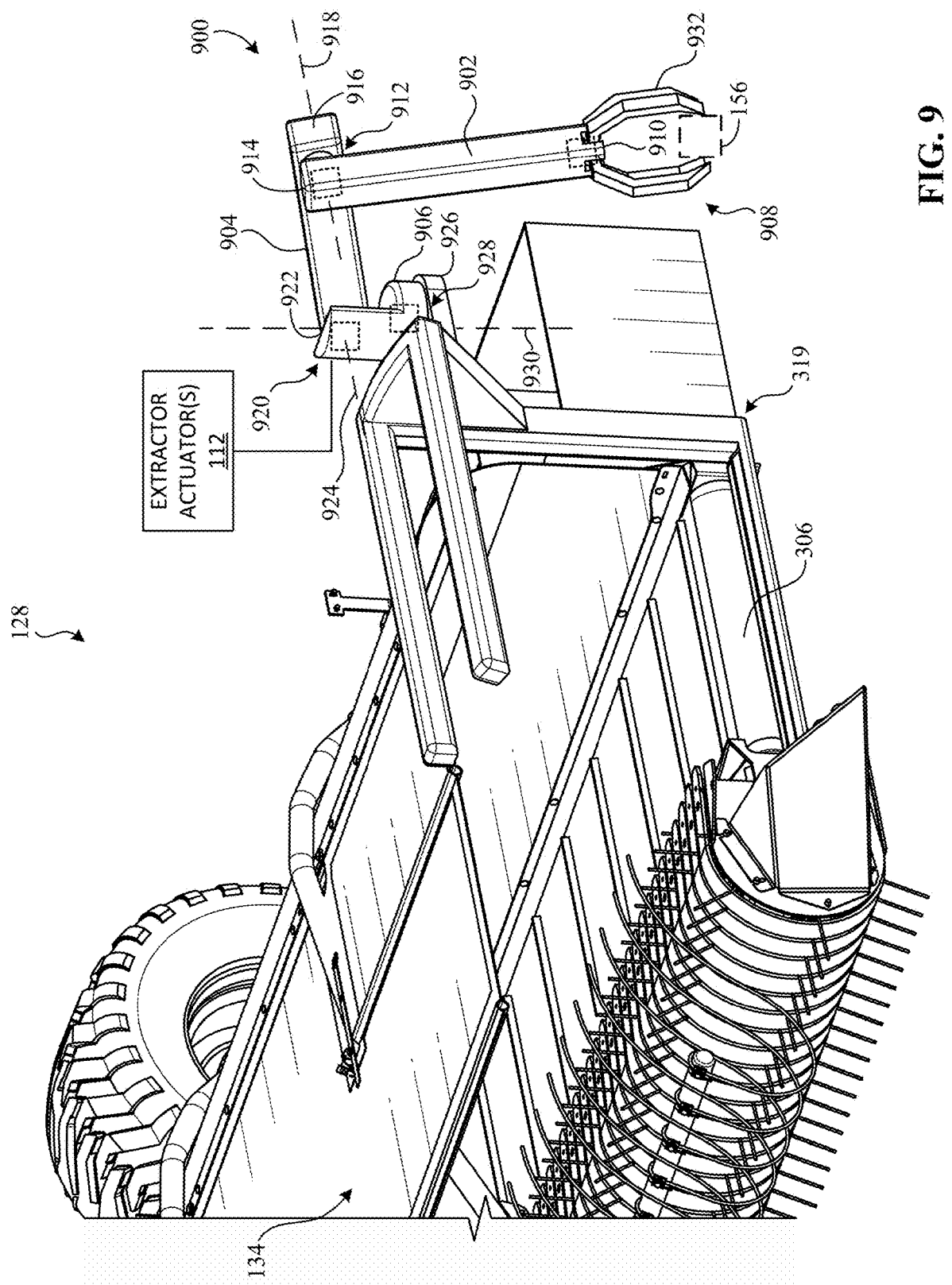
FIGS. 9 and 10 are other enlarged partial views of the example header assembly of FIG. 3 and show an example object extractor in accordance with the teachings of this disclosure.

FIG. 9 is another enlarged partial view of the first header assembly 128 and shows an example object extractor 900 in accordance with the teachings of this disclosure. The object extractor 900 is positioned near a portion of the conveyor 134 (e.g., the first belt 306) and supported by the frame 319 of the first header assembly 128. According to the illustrated example of FIG. 9, the object extractor 900 includes one or more example portions 902, 904, 906 movably coupled together, three of which are shown in this example. That is, the object extractor of FIG. 9 includes a first example portion (e.g., an arm) 902, a second example portion (e.g., an arm) 904, and third example portion (e.g., a base or turret) 906. In particular, the object extractor 900 includes an example object extraction device (e.g., a claw structured to grasp an object) 908 operatively coupled thereto and positioned at or near a first end 910 of the first portion 902, which enables the controller 104 to grab, carry, and/or otherwise dispose of detected objects of interest associated with the material 114, as discussed further below.

In some examples, the second portion 904 of FIG. 9 is interposed between the first and third portions 902, 906. As shown in FIG. 9, the first portion 902 is connected to the second portion 904, for example, via a second example movable joint 912 that is at least partially formed and/or defined by the first and second portions 902, 904. In some examples, the second movable joint 912 is positioned at or near a second end 914 of the first portion 902, opposite the first end 910, and a first end 916 of the second portion 904. In such examples, the first portion 902 is pivotable relative to the second joint 912 and/or a third example axis 918 associated with the second joint 912 in a first direction (e.g., clockwise) and/or a second direction (e.g., counterclockwise) opposite the first direction.

Further, in some examples, to facilitate positioning the objection extraction device 908, the second portion 904 of the object extractor 900 is connected to the third portion 904, for example, via a third example movable joint 920 that is at least partially formed and/or defined by the second and third portions 904, 906. In some examples, the third movable joint 920 is positioned at or near a second end 922 of the second portion 904 opposite the first end 916. In such examples, the second portion 904 is pivotable relative to the third joint 920 and/or a fourth example axis 924 associated with the third joint 920 in the first direction and/or the second direction.

Further still, in some examples, to further facilitate positioning the objection extraction device 908, the third portion 906 is connected to an example bracket 926 affixed to the frame 319, for example, via a fourth example movable joint 928 at least partially formed and/or defined by the third portion 906 and the bracket 926. In such examples, the third portion 906 is pivotable relative to the fourth joint 928 and/or a fifth example axis 930 associated with the fourth joint 928 in the first direction and/or the second direction.

The extractor actuator(s) 112 of FIG. 9 can be implemented, for example, using one or more motor(s) (e.g., electric motor(s)) and/or any other appropriate actuator(s). In particular, the extractor actuator(s) 112 are operatively coupled to respective one(s) of the second, third, and/or fourth joint(s) 912, 920, 928 to control a position and/or an orientation of the object extraction device 908 during operation of the merger 102 via output (e.g., a force and/or a torque) that is generated by the extractor actuator(s) 112. That is, in some examples, the extractor actuator(s) 112 adjust the position and/or the orientation of the object extraction device 908 in response to receiving one or more control signals or commands and/or electrical power from the controller 104. In this manner, the controller 104 is enabled to position and/or otherwise effectively operate the object extraction device 908.

In some examples, a first one of the extractor actuator(s) 112 is operatively coupled to the second joint 912 such that the first portion 902 pivots relative to the second joint 912 and/or the third axis 918 based on an output generated by the first one of the extractor actuator(s) 112. Further, in some examples, a second one of the extractor actuator(s) 112 is operatively coupled to the third joint such that the second portion 904 pivots relative to the third joint 920 and/or the fourth axis 924 based on an output generated by the second one of the extractor actuator(s) 112. Further still, in some examples, a third one of the extractor actuator(s) 112 is operatively coupled to the fourth joint 928 such that the third portion 906 pivots relative to the fourth joint 928 and/or the fifth axis 930 based on an output generated by the third one of the extractor actuator(s) 112. Further still, in some examples, a fourth one of the extractor actuator(s) 112 is operatively coupled to the grasping members 932 to change a state of the objection extraction device from a first state (e.g., an open state) to a second state (e.g., a closed state). As shown in FIG. 9, the grasping members 932 are in the second state and holding the first object of interest 156, which has been substantially separated from the material 114 in this example.

Figure 10:

FIG. 10 is another enlarged partial view of the first header assembly 128 and shows the object extractor 900. In some examples, to facilitate removal of the object(s) of interest 156, 158 from the material 114 and/or temporary storage thereof, the first header assembly 128 includes an example receptacle (e.g., a container such as bin) 1000 coupled to a portion of the frame 319 of the first header assembly 128, for example, via one or more fasteners and/or fastening methods or techniques. In particular, the receptacle is sized, shaped, structured, and/or otherwise configured to receive and/or hold one or more objects of interest obtained by the object extractor 900. For example, after the object extraction device 908 grabs an object of interest when the object of interest is on the conveyor 134 or being ejected therefrom, the controller 104 controls, via the extractor actuator(s) 112, the portion(s) 902, 906, 906 and/or the object extraction device 908 to dispose the object of interest in the receptacle 1000 for later removal of the object of interest. As shown in FIG. 10, the first object of interest 156 has been disposed in the receptacle 1000 by the object extractor 900.

Although FIGS. 9 and 10 depict the object extractor 900 having the three movable portions 902, 904, 906 and the object extraction device 908, in some examples, the object extractor 900 is implemented differently while still enabling the controller 104 to remove one or more detected objects of interest from the material 114 when the material 114 is on or near a portion (e.g., one of the belts 142, 306, 308, 800, 802, 804, 806) of the conveyor 134 or being ejected therefrom. Further, in some examples, other appropriate means for separating an object of interest from the material 114 may be used in addition or alternatively to the example object extractor 900.

Figure 11:
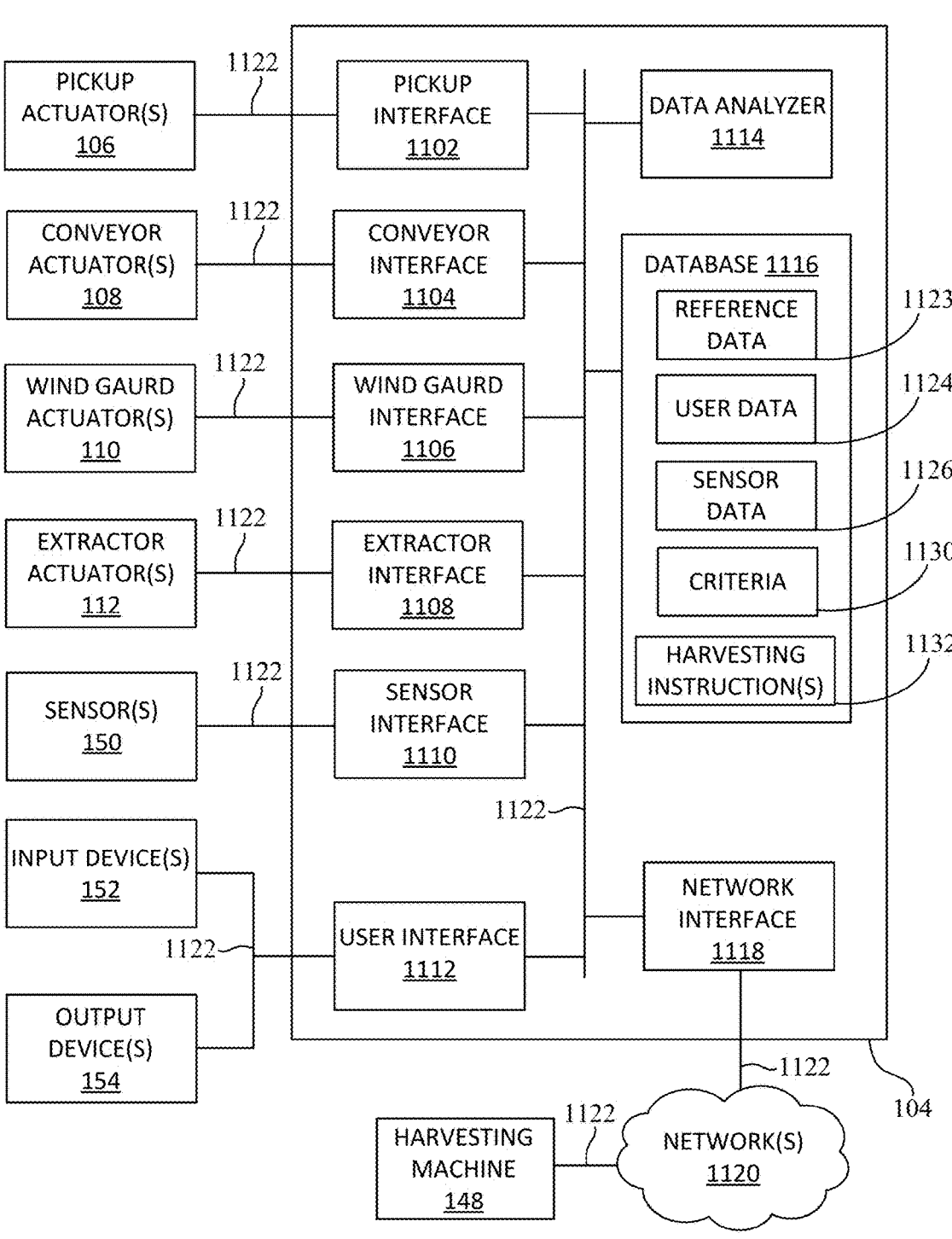
FIG. 11 is a block diagram of an example merger control system in accordance with the teachings of this disclosure.

FIG. 11 is a block diagram of an example merger control system 1100 in accordance with the teachings of this disclosure. In some examples, the merger control system 1100 is implemented by any one or more of the controller 104 of FIG. 1, the merger 102 of FIGS. 1, 2, 8A, 8B, 8C, and 8D, and/or the vehicle 159 of FIGS. 1 and 2. According to the illustrated example of FIG. 11, the merger control system 1100 includes an example pickup interface 1102, an example conveyor interface 1104, an example wind guard interface 1106, an example extractor interface 1108, an example sensor interface 1110, an example user interface 1112, an example data analyzer 1114, and an example database 1116, and an example network interface 1118. The merger control system 1100 of FIG. 11 is communicatively coupled to any one or more (e.g., all) of the pickup actuator(s) 106, the conveyor actuator(s) 108, the wind guard actuator(s) 110, the extractor actuator(s) 112, the sensor(s) 150, the input device(s) 152, the output device(s) 154, and/or one or more example networks 1120 via one or more example communication links 1122 such as, for example, one or more signal or transmission wires, a bus, radio frequency, etc.

The pickup interface 1102 of FIG. 11 facilitates interactions between the merger control system 1100 and the pickup(s) 136, 302, 304, 808, 810, 812, 814 and/or better enables the merger control system 1100 to execute one or more example control methods to implement the pickup(s) 136, 302, 304, 808, 810, 812, 814. In some examples, the pickup interface 1102 is communicatively coupled, via the link(s) 1122, to any one or more (e.g., all) of the first, second, third, fourth, fifth, and sixth ones of the pickup actuator(s) 106. In particular, the pickup interface 1102 is configured to direct the pickup actuator(s) 106 to control respective speed(s) of the pickup(s) 136, 302, 304, 808, 810, 812, 814. For example, the pickup interface 1102 generates one or more control signals or commands and/or otherwise provides the control signal(s) or command(s) and/or electrical power to respective ones of the pickup actuator(s) 106. In such examples, each of the pickup actuator(s) 106 generates a particular output based on and/or in response to receiving the control signal(s) or command(s) and/or the electrical power from the pickup interface 1102.

In some examples, the pickup interface 1102 directs the pickup actuator(s) 106 to operate the pickup(s) 136, 302, 304, 808, 810, 812, 814 at one or more particular speeds and/or within one or more particular ranges of speeds, which correspond to the area(s) 501, 502, 504 of the conveyor 134 in which the material 114 will land resulting from such pickup operation. In such examples, when the pickup interface 1102 directs a pickup actuator 106 to operate a pickup 136, 302, 304, 808, 810, 812, 814 at the aforementioned first pickup speed and/or within a first example range of pickup speeds (e.g., about 75 RPM or less), a portion of the material 114 translated by that pickup 136, 302, 304, 808, 810, 812, 814 lands substantially or mostly in the first area 501 of the conveyor 134. In this manner, the merger control system 1100 provides the seventh material distribution 848 of FIGS. 8C and 8D and/or the twelfth material distribution 858 of FIGS. 8C and 8D.

Further, in some examples, when the pickup interface 1102 directs a pickup actuator 106 to operate a pickup 136, 302, 304, 808, 810, 812, 814 at the aforementioned second pickup speed and/or within a second example range of pickup speeds (e.g., between about 75 RPM and about 125 RPM), a portion of the material 114 translated by that pickup 136, 302, 304, 808, 810, 812, 814 lands substantially or mostly in the second area 502 of the conveyor 134. In this manner, the merger control system 1100 provides the eighth material distribution 850 of FIGS. 8C and 8D and/or the eleventh material distribution 856 of FIG. 8C.

Further still, in some examples, when the pickup interface 1102 directs a pickup actuator 106 to operate a pickup 136, 302, 304, 808, 810, 812, 814 at the aforementioned third pickup speed and/or within a third example range of pickup speeds (e.g., about 125 RPM or more), a portion of the material 114 translated by that pickup 136, 302, 304, 808, 810, 812, 814 lands substantially or mostly in the third area 504 of the conveyor 134. In this manner, the merger control system 1100 provides the ninth material distribution 852 of FIGS. 8C and 8D, the tenth material distribution 854 of FIG. 8C, and/or the eleventh material distribution 856 of FIG. 8D.

Such pickup speed(s) and/or range(s) of pickup speeds is/are predetermined, preprogrammed into the controller 104, and/or otherwise stored in the database 1116 as example reference data 1123. That is, the reference data 1123 of FIG. 11 includes any one or more (e.g., all) of the first pickup speed, the second pickup speed, the third pickup speed, the first range of pickup speeds, the second range of pickup speeds, and/or the third range of pickup speeds. As such, in some examples, the data analyzer 1114 accesses and/or uses the reference data 1123 to determine how to control the pickup actuator(s) 106 and/or the pickup(s) 136, 302, 304, 808, 810, 812, 814.

The conveyor interface 1104 of FIG. 11 facilitates interactions between the merger control system 1100 and the conveyor 134 and/or better enables the merger control system 1100 to execute one or more example control methods to implement the conveyor 134. In some examples, the conveyor interface 1104 is communicatively coupled, via the link(s) 1122, to the first, second, third, fourth, fifth, and sixth ones of the conveyor actuator(s) 108. In particular, the conveyor interface 1104 is configured to direct the conveyor actuator(s) 108 to control respective speeds of the belts 142, 306, 308, 800, 802, 804, 806. For example, the conveyor interface 1104 generates one or more control signals or commands and/or otherwise provides the control signal(s) or command(s) and/or electrical power to respective ones of the conveyor actuator(s) 108. In such examples, each of the conveyor actuator(s) 108 generates an output based on and/or in response to receiving the control signal(s) or command(s) and/or the electrical power from the conveyor interface 1104.

In some examples, the conveyor interface 1104 directs the conveyor actuator(s) 108 to operate the conveyor belt(s) 142, 306, 308, 800, 802, 804, 806 at one or more particular speeds and/or within one or more particular ranges of speeds. In such examples, the conveyor interface 1104 directs a conveyor actuator 108 to operate a belt 142, 306, 308, 800, 802, 804, 806 at the aforementioned first belt speed and/or within a first example range of belt speeds (e.g., about 15 feet per second or more). Further, in some examples, the conveyor interface 1104 directs a conveyor actuator 108 to operate a belt 142, 306, 308, 800, 802, 804, 806 at the aforementioned second belt speed and/or within a second example range of belt speeds (e.g., between about 12 feet per second and about 15 feet per second). Further still, in some examples, the conveyor interface 1104 directs a conveyor actuator 108 to operate a belt 142, 306, 308, 800, 802, 804, 806 at the aforementioned third belt speed and/or within a third example range of belt speeds (e.g., about 12 feet per second or less).

Such belt speed(s) and/or range(s) of belt speeds is/are predetermined, preprogrammed into the controller 104, and/or otherwise stored in the database 1116 as part of the reference data 1123. That is, the reference data 1123 of FIG. 11 includes any one or more (e.g., all) of the first belt speed, the second belt speed, the third belt speed, the first range of belt speeds, the second range of belt speeds, and/or the third range of belt speeds. As such, in some examples, the data analyzer 1114 accesses and/or uses the reference data 1123 to determine how to control the conveyor actuator(s) 108 and/or the belt(s) 142, 306, 308, 800, 802, 804, 806.

The wind guard interface 1106 of FIG. 11 facilitates interactions between the merger control system 1100 and the wind guard(s) 200, 310, 860, 862 and/or better enables the merger control system 1100 to implement control of the wind guard(s) 200, 310, 860, 862. In some examples, the wind guard interface 1106 is communicatively coupled, via the link(s) 1122, to the first, second, third, fourth, fifth, and sixth ones of the wind guard actuator(s) 110. In particular, the wind guard interface 1106 is configured to direct the wind guard actuator(s) 110 to control respective position(s) and/or angle(s) of the wind guard(s) 200, 310, 860, 862. For example, the wind guard interface 1106 generates one or more control signals or commands and/or otherwise provides the control signal(s) or command(s) and/or electrical power to respective ones of the wind guard actuator(s) 110. In such examples, each of the wind guard actuator(s) 110 generates an output based on and/or in response to receiving the control signal(s) or command(s) and/or the electrical power from the wind guard interface 1106.

In some examples, the wind guard interface 1106 directs the wind guard actuator(s) 110 to move the wind guard(s) 200, 310, 860, 862 to one or more particular positions and/or angles, which correspond to the area(s) 501, 502, 504 of the conveyor 134 in which the material 114 will land resulting from such wind guard positioning. In such examples, the wind guard interface 1106 directs a wind guard actuator 110 to move a wind guard 200, 310, 860, 862 to or near a lowered position (e.g., corresponding to the first wind guard angle 426), which guides movement of a translating portion of the material 114 to the first area 501 of the conveyor 134. In this manner, the merger control system 1100 provides the seventh material distribution 848 of FIGS. 8C and 8D and/or the twelfth material distribution 858 of FIGS. 8C and 8D.

Further, in some examples, the wind guard interface 1106 directs a wind guard actuator 110 to move a wind guard 200, 310, 860, 862 to or near an intermediate position (e.g., corresponding to an angle between the first and second wind guard angles 426, 428), which guides movement of a translating portion of the material 114 to the second area 502 of the conveyor 134. In this manner, the merger control system 1100 provides the eighth material distribution 850 of FIGS. 8C and 8D and/or the eleventh material distribution 856 of FIG. 8C.

Further, in some examples, the wind guard interface 1106 directs a wind guard actuator 110 to move a wind guard 200, 310, 860, 862 to or near a raised position (e.g., corresponding to the second wind guard angle 428), which guides movement of a translating portion of the material 114 to the third area 504 of the conveyor 134. In such examples, the intermediate wind guard position is between the lowered and raised wind guard positions. In this manner, the merger control system 1100 provides the ninth material distribution 852 of FIGS. 8C and 8D, the tenth material distribution 854 of FIG. 8C, and/or the eleventh material distribution 856 of FIG. 8D.

Such wind guard position(s) and/or angles(s) is/are predetermined, preprogrammed into the controller 104, and/or otherwise stored in the database 1116 as part of the reference data 1123. That is, the reference data 1123 of FIG. 11 includes any one or more (e.g., all) of the lowered wind guard position, the intermediate wind guard position, and/or the raised wind guard position. As such, in some examples, the data analyzer 1114 accesses and/or uses the reference data 1123 to determine how to control the wind guard actuator(s) 110 and/or the wind guard(s) 200, 310, 860, 862.

The extractor interface 1108 of FIG. 11 facilitates interactions between the merger control system 1100 and the object extractor 900 and/or better enables the merger control system 1100 to execute one or more control methods to implement the object extractor 900. In some examples, the extractor interface 1108 is communicatively coupled, via the link(s) 1122, to the first, second, third, and fourth ones of the extractor actuator(s) 112. In particular, the extractor interface 1108 is configured to direct the extractor actuator(s) 112 to control output of the respective extractor actuator(s) 112, thereby controlling positions and/or orientations of respective ones of the portions 902, 904, 906 of the object extractor 900 and/or the state of the object extraction device 908. For example, the extractor interface 1108 generates one or more control signals or commands and/or otherwise provides the control signal(s) or command(s) and/or electrical power to respective ones of the extractor actuator(s) 112. In such examples, each of the extractor actuator(s) 112 generates an output based on and/or in response to receiving the control signal(s) or command(s) and/or the electrical power from the extractor interface 1108.

The sensor interface 1110 of FIG. 11 facilitates interactions and/or communications between the merger control system 1100 and one or more merger sensors such as, for example, the sensor(s) 150 of FIGS. 1, 7, and 8A. In some examples, the sensor interface 1110 is communicatively coupled, via the link(s) 1122, to the sensor(s) 150 to receive (e.g., repeatedly and/or continuously) example sensor data 1126 therefrom, as shown in FIG. 11. That is, in some examples, the sensor(s) 150 generate at least a portion of the sensor data 1126 in the database 1116. In some examples, at least a portion of the sensor data 1126 is indicative of one or more parameters associated with the material 114 such as, for example, any one or more of a location (e.g., a global location), a shape, a size or volume, a density, a moisture content, a fat content, a protein content, a sugar content, fiber content etc. In particular, the sensor(s) 150 and/or the sensor data 1126 enable the data analyzer 1114 to detect such parameter(s) and/or transmit one or more related detections to the data analyzer 1114 for further processing.

The user interface 1112 of FIG. 11 facilitates interactions and/or communications between an end user (e.g., a driver of the vehicle 159) and the merger control system 1100. The user interface 1112 includes, for example, a human-machine interface (HMI) and/or a graphical user interface (GUI). In some examples, the user interface 1112 is communicatively coupled, via the link(s) 1122, to the input device(s) 152 to receive example user data 1124 therefrom, as shown in FIG. 11. In some such examples, the user interface 1112 generates example user data 1124 and/or receives the user data 1124 from the input device(s) 152 in response to the user(s) interacting with the input device(s) 152 (e.g., pressing a button or touch screen to select an operating mode of the merger 102). Such data 1124 includes one or more example request (e.g., one or more user requests) and/or is indicative of a user selection corresponding to a particular operating mode of the merger 102. In particular, in such examples, the user data 1124 of FIG. 11 enables the data analyzer 1114 and/or, more generally, the merger control system 1100 to determine when and/or how to control the merger 102.

Additionally or alternatively, in some examples, the user interface 1112 is communicatively coupled, via the link(s) 1122, to the output device(s) 154 to provide example data thereto for presenting a user. For example, the user interface 1112 generates, via the output device(s) 154, any one or more of images, video, sound, speech, etc., thereby communicating data associated with the material 114 and/or the output windrow(s) 124, 126 to a user such as, for example, any one or more of the sensor data 1126, detected material parameter(s), and/or example harvesting instruction(s) 1132.

The data analyzer 1114 of FIG. 11 calculates and/or determines one or more example adjustments for the actuator(s) 106, 108, 110, 112 that are to be executed, for example, by any one or more (e.g., all) of the pickup interface 1102, the conveyor interface 1104, the wind guard interface 1106, and/or the extractor interface 1108. Such adjustment(s) includes increasing, maintaining, and/or decreasing output generated by the actuator(s) 106, 108, 110, 112. For example, the data analyzer 1114 detects the first shape 516 associated with the material 114 and determines, based on the first shape 516, a first example adjustment (e.g., an increase in output) for the first one of the pickup actuator(s) 106. Continuing with this example, the pickup interface 1102 directs the first one of the pickup up actuator(s) 106 based on the first adjustment and/or otherwise executes the first adjustment, which causes the speed of the first pickup 302 to increase. Additionally or alternatively, in another example, the data analyzer 1114 detects the first shape 516 associated with the material 114 and determines, based on the first shape 516, a second example adjustment (e.g., an increase in output) for the first one of wind guard actuator(s) 110. Continuing with this example, the wind guard interface 1106 directs the first and/or second one(s) of the wind guard actuator(s) 110 based on the second adjustment and/or otherwise executes the second adjustment, which causes the first wind guard 310 to move to or toward the second position of the first wind guard 310 and/or increases the first wind guard angle 426. Additionally or alternatively, in another example, the data analyzer 1114 detects the first shape 516 associated with the material 114 and determines, based on the first shape 516, a third example adjustment (e.g., an increase in output) for the first one of conveyor actuator(s) 108. Continuing with this example, the conveyor interface 1104 directs the first one of the conveyor actuator(s) 108 based on the third adjustment and/or otherwise executes the third adjustment, which causes the first belt 306 to accelerate or decelerate.

Thus, in some examples, the merger control system 1100 adjusts the output(s) of any of the actuator(s) 106, 108, 110, 112 based on the first detected shape 516 (i.e., based on a parameter associated with the material 114) to adjust the respective distribution(s) 830, 832, 834, 842, 844, 846, 848,

850, 852, 854, 856, 858 of the material 114 relative to the conveyor 134. In other words, the merger control system 1100 is configured to direct an actuator 106, 108, 110 to change at least one of (a) a speed of a pickup 136, 302, 304, 808, 810, 812, 814, (b) a speed of a conveyor belt 142, 306, 308, 800, 802, 804, 806, or (c) a position of a wind guard 200, 310, 860, 862 in response to detecting the first shape 516 (i.e., in response to detecting the parameter).

In such examples, the criteria 1130 include at least one shape criterion (e.g., a predefined shape). In particular, the data analyzer 1114 compares one or more detected shapes (e.g., the first shape 516) associated with the material 114 to the shape criterion, which indicates to the data analyzer 1114 whether to adjust at least one actuator 106, 108, 110. For example, if a detected shape associated with the material 114 does not substantially match and/or otherwise satisfy the shape criterion, the data analyzer 1114 accordingly determines one or more actuator adjustments and/or execute the adjustment(s).

In some examples, the data analyzer 1114 determines one or more harvesting instructions associated with processing the output windrow(s) 124, 126. In such examples, the data analyzer 1114 compares one or more detected moisture contents associated with the material 114 to at least a portion of the criteria 1130 corresponding to a moisture content threshold (e.g., a value corresponding to an appropriate moisture content). That is, in some examples, the criteria 1130 of FIG. 11 include one or more examples thresholds holds such as, for example, the moisture content threshold, which better enables the data analyzer 1114 to make such harvesting decisions. In some examples, if a detected moisture content of a particular area of a field in which the merger 102 is operating is relatively high, the data analyzer 1114 generates a first example harvesting instruction 1132 that instructs a user to wait for a time interval and/or until the moisture content has sufficiently decreased before operating the harvesting machine 148 in that area of the field.

Additionally, in some examples, the data analyzer 1114 generates a second example harvesting instruction 1132 that instructs the harvesting machine 148 and/or a user associated with the harvesting machine 148 where to operate the harvesting machine 148. That is, in such examples, the second harvesting instruction 1132 indicates one or more locations in which the harvesting machine 148 is to operate. The data analyzer 1114 determines such locational harvesting instruction(s) by processing a determined location of the fourth windrow 124 and/or a determined location of the fifth windrow 126.

The database 1116 of FIG. 11 stores (e.g., temporarily and/or permanently) and/or provides access to at least a portion of the data 1123, 1124, 1126, 1130, 1132. In some examples, the database 1116 is communicatively coupled, via the link(s) 1122, to one or more of the pickup interface 1102, the conveyor interface 1104, the wind guard interface 1106, the extractor interface 1108, the sensor interface 1110, the user interface 1112, the data analyzer 1114, and/or the network interface 1118. For example, any one or more of the pickup interface 1102, the conveyor interface 1104, the wind guard interface 1106, the extractor interface 1108, the sensor interface 1110, the user interface 1112, the data analyzer 1114, and/or the network interface 1118 transmit and/or otherwise provide (e.g., repeatedly and/or continuously) data to the database 1116. Conversely, in some examples, the database 1116 transmits and/or otherwise provides (e.g., repeatedly or continuously) data to any one or more of the pickup interface 1102, the conveyor interface 1104, the wind guard interface 1106, the extractor interface 1108, the sensor interface 1110, the user interface 1112, the data analyzer 1114, and/or the network interface 1118.

The network interface 1118 of FIG. 11 facilitates interactions and/or communications between the merger control system 1100 and one or more external resources associated with subsequent processing of the material 114 and/or removing detected objects of interest from the material 114. In some examples, the network interface 1118 is communicatively coupled, via the link(s) 1122, to the network(s) 1120 to provide data thereto and/or receive data therefrom. The network(s) 1120 includes, for example, any of a controller area network (CAN), a local area network (LAN), a wide area network (WAN), a satellite network, the Internet, etc. Further, in such examples, the network(s) 1120 of FIG. 11 are communicatively coupled, via the link(s) 1122, to the harvesting machine 148 and/or one or more other external resources to provide related data thereto.

Although an example merger control system 1100 is illustrated in FIG. 11, one or more of the elements, processes, and/or devices depicted in FIG. 11 may be combined, divided, re-arranged, omitted, eliminated, and/or implemented in any other way. Further, the example merger control system 1100 of FIG. 11 may include one or more elements, processes, and/or devices in addition or alternatively to those illustrated in FIG. 11, and/or may include more than one of any of the illustrated elements, processes, and devices.

Additionally, one or more of the example controller 104, the example pickup interface 1102, the example conveyor interface 1104, the example wind guard interface 1106, the example extractor interface 1108, the example sensor interface 1110, the example user interface 1112, the example data analyzer 1114, and the example database 1116, the example network interface 1118, and/or, more generally, the example merger control system 1100 of FIG. 11 may be implemented by hardware, software, firmware and/or any combination of thereof. For example, one or more (e.g., all) of the example controller 104, the example pickup interface 1102, the example conveyor interface 1104, the example wind guard interface 1106, the example extractor interface 1108, the example sensor interface 1110, the example user interface 1112, the example data analyzer 1114, and the example database 1116, the example network interface 1118, and/or, more generally, the example merger control system 1100 could be implemented by one or more circuits (e.g., an analog or digital circuit, a logic circuit, a programmable processor, etc.). Further, in some examples, at least one of the example controller 104, the example pickup interface 1102, the example conveyor interface 1104, the example wind guard interface 1106, the example extractor interface 1108, the example sensor interface 1110, the example user interface 1112, the example data analyzer 1114, and the example database 1116, the example network interface 1118, and/or the example merger control system 1100 include(s) a tangible machine-readable storage device or storage disk (e.g., a memory storing the software and/or firmware).

Flowcharts representative of example hardware logic or machine-readable instructions for implementing the example merger control system 1100 of FIG. 11 are shown in FIGS. 12-16. The machine-readable instructions may be a program or portion of a program for execution by a processor such as the processor 1702 shown in the example processor platform 1700, which is discussed in greater detail below in connection with FIG. 17. The program may be embodied in software stored on a tangible machine-readable storage medium such as a CD-ROM, a floppy disk, a hard drive, or a memory associated with the processor 1702, but the entire program and/or parts thereof could be alternatively executed by a different device and/or embodied in firmware or dedicated hardware. Further, although the example program is described with reference to the flowcharts illustrated in FIGS. 12-16, many other methods of implementing the example merger control system 1100 may alternatively be used. For example, the order of execution of the blocks may be changed, and/or some of the blocks described may be changed, eliminated, or combined. Additionally or alternatively, any of the blocks may be implemented by one or more hardware circuits (e.g., discrete and/or integrated analog and/or digital circuitry, logic circuit, a comparator, etc.).

As mentioned above, the example processes of FIGS. 12-16 may be implemented using executable or coded instructions (e.g. computer or machine readable instructions) stored on a tangible machine-readable storage medium such as a hard disk drive, a compact disk (CD), a flash memory, and/or other storage device or disk in which information is stored for any duration of time. As used herein, the term tangible machine-readable storage medium is expressly defined to include any type of computer or machine-readable storage device or disk and exclude propagating signals and all transmission media. Additionally or alternatively, the example methods of FIG. 12-16 may be implemented using coded instructions stored on a non-transitory machine-readable medium in which information is stored for any duration, which includes any type of computer or machine readable storage device or disk and excludes propagating signals and transmission media.

Figure 12:
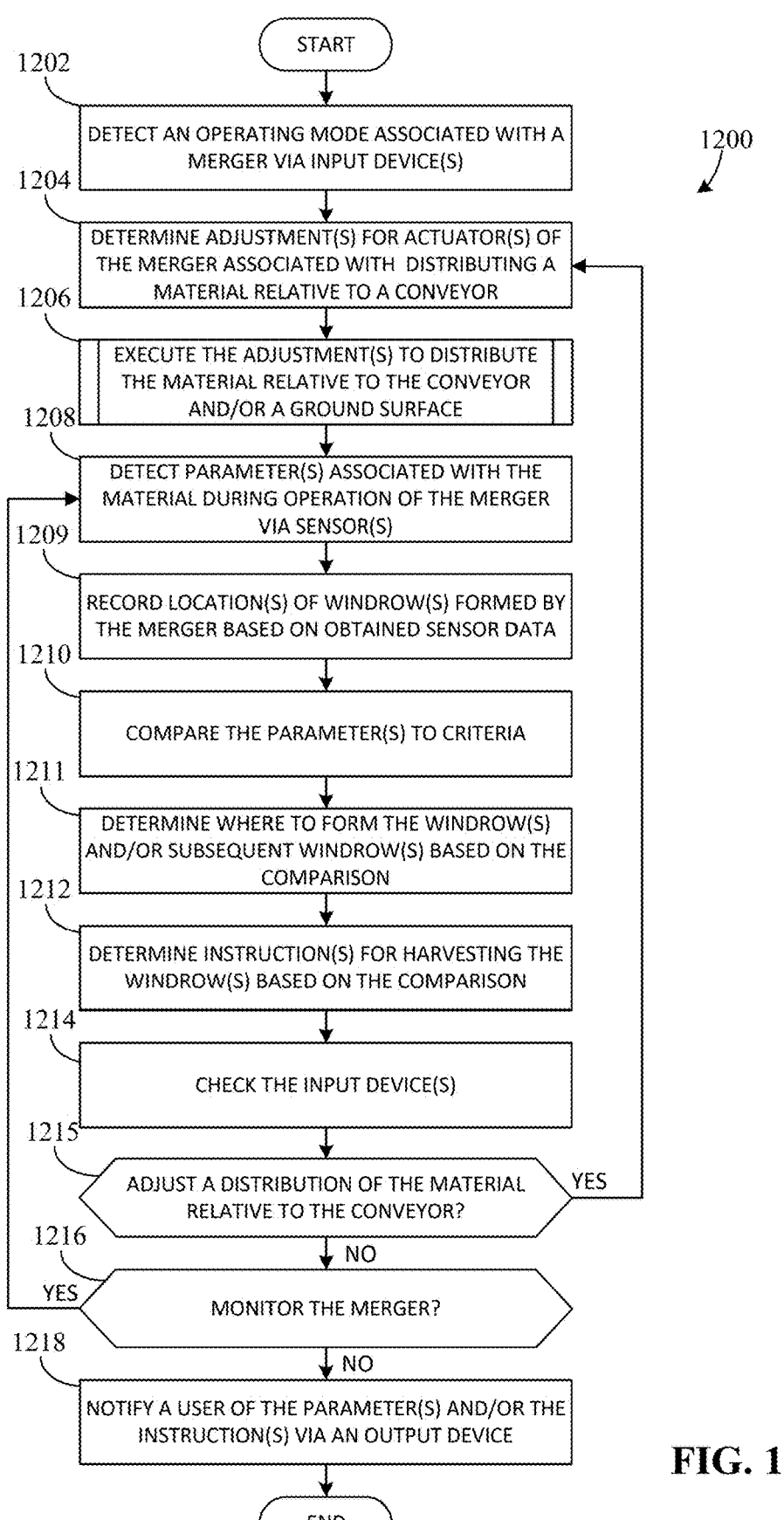
FIG. 12 is a flowchart representative of an example method that can be executed to implement the merger control system of FIG. 11 to process an example material on a ground surface.

FIG. 12 is a flowchart representative of an example method 1200 that can be executed to implement the merger control system 1100 of FIG. 11 to process an example material on a ground surface such as, for example, any one or more of the of the first windrow 118, the second windrow 120, and/or the third windrow 122. The example method 1200 of FIG. 12 can be implemented in any one or more of the controller 104 of FIGS. 1 and 11, the merger 102 of FIGS. 1, 2, 8A, 8B, 8C, and 8D, the vehicle 159 of FIGS. 1 and 2, and/or the merger control system 1100 of FIG. 11.

The example method 1200 of FIG. 12 begins by detecting an operating mode associated with a merger via an input device (block 1202). In some examples, the merger control system 1100 of FIG. 11 detects (e.g., via the user interface 1112 and/or the data analyzer 1114) one of the first operating mode (e.g., see FIG. 8A), the second operating mode 803 (e.g., see FIG. 8B), the third operating mode 805 (e.g., see FIG. 8C), and/or the fourth operating mode 807 (e.g., see FIG. 8D) via the input device(s) 152. Further, in some examples, the merger control system 1100 detects one or more different operating modes associated with the merger 102 in addition or alternatively to the first, second, third, and fourth operating modes 801, 803, 805, 807.

The example method 1200 of FIG. 12 also includes determining adjustment(s) for actuator(s) of the merger associated with distributing a material relative to a conveyor (block 1204). In some examples, the merger control system 1100 of FIG. 11 determines (e.g., via the data analyzer 1114) one or more adjustments associated with distributing the material 114 relative to the conveyor 134 for any one or more of (a) the pickup actuator(s) 106, (b) the conveyor actuator(s) 108, and/or (b) the wind guard actuator(s) 110. For example, the merger control system 1100 determines one or more of the aforementioned first adjustment, the second adjustment, and/or the third adjustment. As previously mentioned, the adjustment(s) include any one or more of increasing, decreasing, and/or maintaining output of the respective actuator(s) 106, 108, 110.

In some examples at block 1204, the merger control system 1100 determines the adjustment(s) based on the detected operating mode in connection with block 1202 or 1215. In such examples, the merger control system 1100 uses at least a portion of the reference data 1123 (e.g., any of the predetermined pickup speeds, the predetermine belt speeds, and/or the predetermine wind guard angles) to determine the adjustment(s). Additionally or alternatively, in some examples, the merger control system 1100 determines the adjustments based on the detected material parameter(s) (e.g., a shape such as the first shape 516 of FIG. 5) in connection with block 1208.

The example method 1200 of FIG. 12 also includes executing the adjustment(s) to distribute the material relative to the conveyor and/or a ground surface (block 1206). In some examples, the merger control system 1100 of FIG. 11 executes (e.g., via any one or more of the example pickup interface 1102, the example conveyor interface 1104, and/or the example wind guard interface 1106) the determined adjustment(s) in connection with block 1204 to distribute the material 114 relative to the conveyor 134 and/or the ground surface 116, which is discussed further below in connection with FIG. 13. In particular, in some such examples, as a result of carrying out the adjustment(s), the merger control system 1100 advantageously distributes the material 114 relative to the conveyor 134 in a manner that improves belt capacity and/or belt use efficiency (e.g., see FIG. 6). As a result, the merger 102 forms the windrow(s) 124, 126 such that each of the windrow(s) 124, 126 is substantially uniform and/or even. Additionally or alternatively, in some examples, as a result of carrying out the adjustment(s), the merger control system 1100 deposits the material 114 on a particular area of the ground surface 116 relative to a windrow previously formed by the merger 102 such as, for example, the completed windrow(s) 168.

The example method 1200 of FIG. 12 also includes detecting parameter(s) associated with the material during operation of the merger via sensor(s) (block 1208). In some examples, the merger control system 1100 of FIG. 11 detects (e.g., via the sensor interface 1110) one or more parameters associated with the material 114 via the sensor(s) 150 when the material 114 is on the conveyor 134 and/or being ejected therefrom such as, for example, any one or more of a location (e.g., a global location), a shape, a size or volume, a density, a moisture content, a fat content, a protein content, a sugar content, a fiber content etc. For example, the merger control system 1100 detects such parameter(s) associated with the any one or more of the first translated portion 508 of the material 114, the second translated portion 816 of the material 114, the third translated portion 818 of the material 114, the fourth translated portion 820 of the material 114, the fifth translated portion 822 of the material 114, the sixth translated portion 824 of the material 114. In such examples, the merger control system 1100 may monitor the parameter(s) while the merger 102 moves across at least a portion of a field.

In some such examples, the merger control system 1100 detects: (1) a first moisture content (e.g., a relatively high moisture content) associated with the material 114 and corresponding to a first area of the field in which the merger 102 operating: (2) a second moisture content (e.g., an appropriate moisture content) associated with a different portion of the material 114 and corresponding to a second area of the field; and (3) a third moisture content (e.g., a relatively high moisture content) associated with a different portion of the material 114 and corresponding to the third area of the field. As previously mentioned, such material parameter(s) indicate to the end user(s) when and/or how to harvest the output windrow(s) 124, 126 formed by the merger 102.

Additionally, in some examples, the merger control system 1100 repeats the operation of block 1208 using at least one secondary sensor. That is, in such examples, the merger control system 1100 determines the same parameter(s) using at least two different sensor(s) (e.g., two LiDAR sensors), which indicates to the merger control system 1100 whether at least some of the data generated by one of the two sensors is inaccurate and may be discarded. In this manner, the merger control system 1100 improves data accuracy by identifying and/or accounting for false data.

The example method 1200 of FIG. 12 also includes recording location(s) of windrow(s) formed by the merger based on obtained sensor data (block 1209). In some examples, the merger control system 1100 records (e.g., via the sensor interface 1110 and/or the database 1116) a location of the fourth windrow 124 and/or a location of the fifth windrow 126 based on at least some (e.g., GPS data or coordinates) of the sensor data 1126. In such examples, the merger control system 1100 determines (e.g., repeatedly or continuously) the location(s) of the respective windrow(s) 124, 126 via the sensor(s) 150 and stores the location(s) in the database 1116. Additionally, in some examples at block 1209, the merger control system 1100 obtains (e.g., via the database 1116) one or more previously recorded locations of the respective completed windrow(s) 168.

The example method 1200 of FIG. 12 also includes comparing the parameter(s) to criteria (block 1210). In some examples, the merger control system 1100 of FIG. 11 compares (e.g., via the data analyzer 1114) the detected parameter(s) in connection with block 1208 to at least a portion of the criteria 1130. In some examples, the merger control system 1100 compares the first detected shape 516 and/or the second detected shape 602 to the shape criterion. Additionally or alternatively, in some examples, the merger control system 1100 compares the detected moisture contents of the field to the moisture content threshold (e.g., a value corresponding to a material moisture content that is appropriate for harvesting). That is, in such examples, the merger control system 1100 compares the first moisture content to the moisture content threshold, the second moisture content to the moisture content threshold, and the third moisture content to the moisture content threshold. As such, in some examples at block 1210, the merger control system 1100 can perform one or more such comparisons, which indicates to the merger control system 1100 when and/or how to harvest the output windrow(s) 124, 126 and/or otherwise enables the merger control system 1100 to determine subsequent instructions for harvesting the material 114. Additionally or alternatively, in some examples at block 1210, the merger control system 1100 compares the location of fourth windrow 124, the location of the fifth windrow 126, and/or the location(s) of the completed windrow(s) 168 to example location criteria.

The example method 1200 of FIG. 12 also includes determining where to form the windrow(s) and/or subsequent windrow(s) based on the comparison (block 1211). In some examples, the merger control system 1100 of FIG. 11 determines (e.g., via the data analyzer 1114) where to form the fourth windrow 124, the fifth windrow 126, and/or one or more additional or subsequent windrows based on the performed comparison(s) in connection with block 1210. For example, the merger control system 1100 determines to form the fourth windrow 124 on or near the first one of the completed windrow(s) 168 in response to the merger control system 1100 comparing the recorded location of the fourth windrow 124 in connection with block 1209 to location criteria. Further, in another example, the merger control system 1100 determines to form the fifth windrow 126 on or near the second one of the completed windrow(s) 168 in response to the merger control system 1100 comparing the recorded location of the fifth windrow 126 in connection with block 1209 to the location criteria. Further, in another example, the merger control system 1100 determines to form the additional or subsequent windrow(s) on or adjacent the fourth and/or fifth windrow(s) 124, 126 in a similar manner.

The example method 1200 of FIG. 12 also includes determining instruction(s) for harvesting the windrow(s) based on the comparison (block 1212). In some examples, the merger control system 1100 determines (e.g., via the data analyzer 1114) the harvesting instruction(s) 1132 based on the performed comparison(s) in connection with block 1210. For example, the harvestings instruction(s) 1132 instruct a user to harvest the second area of the field before the first and third areas resulting from the merger control system 1100 determining that the first and third moisture contents are above the moisture content threshold. Additionally or alternatively, in some examples, the harvesting instruction(s) 1132 instruct a user where to drive the harvesting machine 148 (e.g., after operation of the merger 102 is complete).

The example method 1200 of FIG. 12 also includes checking the input device(s) (block 1214). In some examples, the merger control system 1100 of FIG. 11 checks (e.g. via the user interface 1112 and/or the data analyzer 1114) the input device(s) 152, for example, to detect a user selection and/or new user data 1124 (e.g., a new user request corresponding to a selected operating mode) corresponding to a different operating mode of the merger 102.

The example method 1200 of FIG. 12 also includes determining whether to adjust a distribution of the material relative to the conveyor (block 1215). In some examples, the merger control system 1100 determines (e.g., via the data analyzer 1114) whether to adjust any one or more of the first distribution 830, the second distribution 832, the third distribution 834, the fourth distribution 842, the fifth distribution 844, the sixth distribution 846, the seventh distribution 848, the eighth distribution 850, the ninth distribution 852, the tenth distribution 854, the eleventh distribution 856, and/or the twelfth distribution 858, for example, based on the detected parameter(s) in connection with block 1208 and/or the detected user selection in connection with block 1214. That is, in some examples, the merger control system 1100 determines that the material 114 is distributed substantially unevenly relative to the conveyor 134 based on a shape (e.g., see the first shape 516 of FIG. 5) associated with the material 114 when the material 114 is at or near an end 144, 146 of the conveyor 134 and/or being ejected therefrom (i.e., the merger control system 1100 provides a positive determination). Additionally or alternatively, in some examples, the merger control system 1100 determines to change the operating mode of the merger 102 based on updated and/or the new user data 1124 (i.e., the merger control system 1100 provides a positive determination).

In some examples, if the merger control system 1100 provides a positive determination (e.g., the first shape 516 was detected at block 1208) (block 1215: YES), control of the method 1200 returns to block 1204. On the other hand, in some examples, if the merger control system 1100 provides a negative determination (e.g., the second shape 602 was detected at block 1208) (block 1215: NO), control of the method 1200 proceeds to block 1216.

The method 1200 of FIG. 12 also includes determining whether to monitor the merger (block 1216). In some examples, the merger control system 1100 of FIG. 11 determines (e.g., via the data analyzer 1114) whether to monitor the merger 102, for example, based on a state of the merger 102. In some examples, if the merger control system 1100 provides a positive determination (e.g., the merger 102 is in operation) (block 1216: YES), control of the method 1200 returns to block 1208. On the other hand, in some examples, if the merger control system 1100 provides a negative determination (e.g., the merger 102 is not in operation) (block 1216: NO), the example method proceeds to block 1218.

The example method 1200 of FIG. 12 also includes notifying a user of the parameter(s) and/or the instruction(s) via output device(s) (block 1218). In some examples, the merger control system 1100 of FIG. 11 notifies (e.g., via the user interface 1112) the user of the detected parameter(s) (e.g., the moisture content(s) and/or locations corresponding the areas of the field) in connection with block 1208 and/or the determined harvesting instructions 1132 in connection with block 1212 via the output device(s) 154.

Although the example method 1200 is described in connection with the flowchart of FIG. 12, one or more other methods of implementing the example merger control system 1100 may alternatively be used. For example, the order of execution of the blocks 1202, 1204, 1206, 1208, 1209, 1210, 1211, 1212, 1214, 1215, 1216, 1218 may be changed, and/or at least some operations of the blocks 1202, 1204, 1206, 1208, 1209, 1210, 1211, 1212, 1214, 1215, 1216, 1218 described may be changed, eliminated, or combined.

Figure 14:
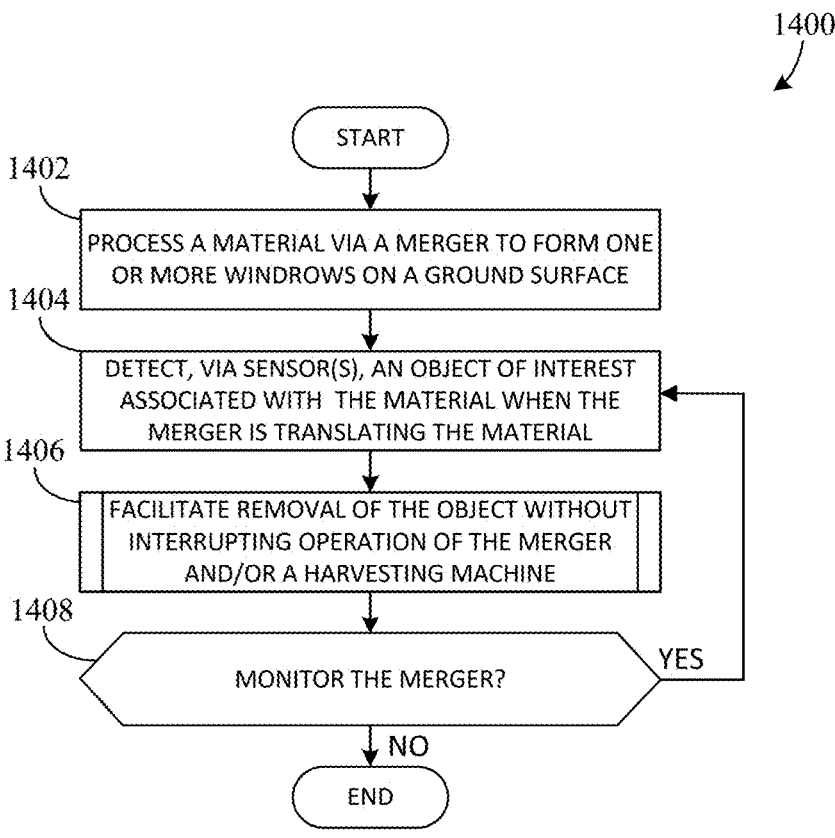
FIG. 14 is a flowchart representative of another example method that can be executed to implement the merger control system of FIG. 11 to process an example material on a ground surface.

FIG. 13 is a flowchart representative of an example method 1206 that may be executed to implement the example merger control system 1100 of FIG. 11 to carry out adjustments for one or more actuators to distribute a material relative to a conveyor and/or a ground surface. The example method 1206 of FIG. 13 can be implemented in any one or more of the controller 104 of FIG. 1, the merger 102 of FIGS. 1, 2, 8A, 8B, 8C, and 8D, the vehicle 159 of FIGS. 1 and 2, and/or the merger control system 1100 of FIG. 11. Example operations of blocks 1302, 1304, 1306, 1308, 1310 may be used to implement block 1206 of FIG. 12. In particular, the example method 1206 of FIG. 14 is effective in advantageously distributing the material 114 relative to one or more of the first belt 306, the second belt 308, the third belt 800, the fourth belt 802, the fifth belt 804, the sixth 806, and/or the ground surface 116.

The example method 1206 of FIG. 13 begins by controlling pickup(s) via pickup actuator(s) to generate a pickup speed gradient across the merger (block 1302). In some examples, the merger control system 1100 of FIG. 11 controls (e.g., via the pickup interface 1102) the pickup(s) 136, 302, 304, 808, 810, 812, 814 via the respective pickup actuator(s) 106 to generate a pickup speed gradient at least partially across the merger 102. For example, the merger control system 1100 controls the first, second, and third pickups 302, 304, 808 via the respective first, second, and third ones of the pickup actuator(s) 106 to generate the first pickup speed gradient across the first reconfigurable portion 836 portion of the merger 102 in the sixth direction 826 (e.g., see FIG. 8C). Additionally or alternatively, in some examples, the merger control system 1100 controls the fifth, sixth, and seventh pickups 810, 812, 814 via the respective fourth, fifth, and sixth ones of the pickup actuator(s) 106 to generate the second pickup speed gradient across the second reconfigurable portion 838 portion of the merger 102 in the seventh direction 828 (e.g., see FIG. 8C).

The example method 1206 of FIG. 13 also includes controlling belt(s) to generate a conveyor speed gradient across the merger via conveyor actuator(s) (block 1304). In some examples, the merger control system 1100 of FIG. 11 controls (e.g., via the conveyor interface 1104) the belt(s) 142, 306, 308, 800, 804, 806 via the respective conveyor actuator(s) 108 to generate a conveyor speed gradient at least partially across the merger 102. For example, the merger control system 1100 controls the first, second, and third belts 306, 308, 800 via the respective first, second, and third ones of the conveyor actuator(s) 108 to generate the first conveyor speed gradient across the first reconfigurable portion 836 portion of the merger 102 in the sixth direction 826 (e.g., see FIG. 8A). Additionally or alternatively, in some examples, the merger control system 1100 controls the fourth, fifth, and sixth belts 802, 804, 806 via the respective fourth, fifth, and sixth ones of the conveyor actuator(s) 108 to generate the second conveyor speed gradient across the second reconfigurable portion 838 portion of the merger 102 in the seventh direction 828 (e.g., see FIG. 8A).

The example method 1206 of FIG. 13 also includes controlling wind guard(s) to generate a wind guard angle gradient across the merger via wind guard actuator(s) (block 1306). In some examples, the merger control system 1100 of FIG. 11 controls (e.g., via the wind guard interface 1106) the wind guard(s) 200, 310, 860, 862 via the respective wind guard actuator(s) 110 to generate a wind guard angle gradient at least partially across the merger 102. For example, the merger control system 1100 controls the first wind guard 310 and at least a portion of the second wind guard 860 via the respective first, second, and third ones of the wind guard actuator(s) 110 to generate the first wind guard angle gradient across the first reconfigurable portion 836 portion of the merger 102 in the sixth direction 826 (e.g., see FIG. 8C). Additionally or alternatively, in some examples, the merger control system 1100 controls the third wind guard 862 and at least a different portion of the second wind guard 860 via the respective fourth, fifth, and sixth ones of the wind guard actuator(s) 110 to generate the second wind guard angle gradient across the second reconfigurable portion 838 portion of the merger 102 in the seventh direction 828 (e.g., see FIG. 8C).

The example method 1206 of FIG. 13 also includes adjusting output(s) of the actuator(s) based on a detected shape of the material to adjust a distribution associated with the material (block 1308). In some examples, the merger control system 1100 of FIG. 11 adjusts (e.g., via the pickup interface 1102) output(s) the respective pickup actuator(s) 106 based on the first detected shape 516 to adjust the related distribution(s) 848, 850, 852, 854, 856, 858 of the material 114 relative to the conveyor 134. Additionally or alternatively, in some examples, the merger control system 1100 adjusts (e.g., via wind guard interface 1106) output(s) of the respective wind guard actuator(s) 110 based on the first detected shape 516 to adjust the related distribution(s) 848, 850, 852, 854, 856, 858 of the material 114 relative to the conveyor 134. Additionally or alternatively, in some examples, the merger control system 1100 adjusts (e.g., via the conveyor interface 1104) output(s) of the conveyor actuator(s) 108 based on the first detected shape 516 to adjust related distribution(s) 830, 832, 834, 842, 844, 846 of the material 114 relative to the conveyor 134.

The example method 1206 of FIG. 13 also includes adjusting output(s) of the conveyor actuator(s) to deposit the material on or near a completed windrow (block 1310). In some examples, during a first occurrence of the example method 1206 of FIG. 13, the merger control system 1100 of FIG. 11 adjusts (e.g., via the conveyor interface 1104) the output of the first one of the conveyor actuator(s) 108 to deposit at least a portion of the material 114 on or near the first one the completed windrow(s) 168. That is, the merger control system 1100 increases or decrease the speed of the first belt 306 to vary the deposition of the material 114, which achieves a desired or final location of the material 114. Similarly, in such examples, the merger control system 1100 adjusts the output of the sixth one of the conveyor actuator(s) 108 to deposit at least a portion of the material 114 on or near the second one of the completed windrow(s) 168. That is, the merger control system 1100 increases or decreases the speed of the sixth belt 806 to further vary the deposition of the material 114. Additionally, in some examples, during a subsequent occurrence of the example method 1206 of FIG. 13 after the merger 102 completes forming the fourth windrow 124 and/or the fifth windrow 126, the merger control system 1100 adjusts the output(s) of the first and/or sixth ones of the conveyor actuator(s) 108 to similarly deposit the material 114 on or near the first windrow 124 and/or the fifth windrow 126, for example, based on the recorded location of the fourth windrow 124 in connection with block 1209 and/or the recorded location of the fifth windrow 126 in connection with block 1209.

In some examples, after the completing the operation of block 1310, control of the example method 1206 of FIG. 13 returns to a calling function such as the example method 1200 of FIG. 12.

Although the example method 1206 is described in connection with the flowchart of FIG. 13, one or more other methods of implementing the example merger control system 1100 may alternatively be used. For example, the order of execution of the blocks 1302, 1304, 1306, 1308, 1310 may be changed, and/or at least some operations of the blocks 1302, 1304, 1306, 1308, 1310 described may be changed, eliminated, or combine FIG. 14 is another flowchart representative of an example method 1400 that can be executed to implement the merger control system 1100 of FIG. 11 to process an example material on a ground surface such as, for example, any one or more of the of the first windrow 118, the second windrow 120, and/or the third windrow 122. The example method 1200 of FIG. 12 can be implemented in any one or more of the controller 104 of FIG. 1, the merger 102 of FIGS. 1, 2, 8A, 8B, 8C, and 8D, the vehicle 159 of FIGS. 1 and 2, and/or the merger control system 1100 of FIG. 11.

The example method 1400 of FIG. 14 begins by processing a material via a merger to form one or more windrows on a ground surface (block 1402). In some examples, the merger control system 1100 of FIG. 11 processes (e.g., via any of the pickup interface 1102, the conveyor interface 1104, and/or the wind guard interface 1106) the material 114 via the merger 102 to form the fourth windrow 124 and/or the fifth windrow 126 on the ground surface 116 (e.g., see FIG. 1).

The example method 1400 of FIG. 14 also includes detecting an object of interest associated with the material when the merger is translating the material (block 1404). In some examples, the merger control system 1100 of FIG. 11 detects (e.g., via the sensor interface 1110 and/or the data analyzer 1114) the first object of interest 156 (and/or the second object of interest 158) when the merger 102 is translating the portion(s) 508, 816, 818, 820, 822, 824 of the material 114, for example, from a first or initial location on the ground surface 116 and/or to a second or discharged location on the ground surface 116.

The example method 1400 of FIG. 14 also includes facilitating removal of the object without interrupting operation of the merger and/or a harvesting machine (block 1406). In some examples, the merger control system 1100 of FIG. 11 facilitates (e.g., via any one or more of the extractor interface 1108, the user interface 1112, and/or the network interface 1118) removal of the detected object of interest 156 in connection with block 1404 from the output windrow(s) 124, 126 without interrupting operation of the merger 102 and/or the harvesting machine 148, which is discussed in greater detail below in connection with FIGS. 15 and 16. By facilitating and/or otherwise enabling the removal of the object 156 according to examples disclosed herein, the merger control system 1100 reduces downtime for the merger 102 and/or the harvesting machine 148 that would have otherwise occurred as well as prevents the harvesting machine 148 from wearing, degrading, and/or receiving damage associated with processing such an object.

The example method 1400 of FIG. 14 also includes determining whether to monitor the merger (block 1408). In some examples, the merger control system 1100 of FIG. 11 determines (e.g., via the data analyzer 1114) whether to monitor the merger 102, for example, based on a state of the merger 102. In some examples, if the merger control system 1100 provides a positive determination (e.g., the merger 102 is in operation) (block 1408: YES), control of the method 1200 returns to block 1404. In this manner, the merger control system 1100 similarly detects one or more other objects of interest and facilitates removal thereof such as, for example, the second object of interest 158. On the other hand, in some examples, if the merger control system 1100 provides a negative determination (e.g., the merger 102 is not in operation) (block 1408: NO), the process ends.

Although the example method 1400 is described in connection with the flowchart of FIG. 14, one or more other methods of implementing the example merger control system 1100 may alternatively be used. For example, the order of execution of the blocks 1402, 1404, 1406, 1408 may be changed, and/or at least some operations of the blocks 1402, 1404, 1406, 1408 described may be changed, eliminated, or combined.

FIG. 15 is a flowchart of an example method 1406 that may be executed to implement the example merger control system 1100 of FIG. 11 to facilitate removal of the object without interrupting operation of the merger and/or a harvesting machine. The example method 1406 of FIG. 14 can be implemented in any one or more of the controller 104 of FIG. 1, the merger 102 of FIGS. 1, 2, 8A, 8B, 8C, and 8D, the vehicle 159 of FIGS. 1 and 2, and/or the merger control system 1100 of FIG. 11. Example operations of blocks 1502, 1504, 1506, 1508 may be used to implement block 1406 of FIG. 14.

The example method 1406 of FIG. 15 begins by determining a location of the object based on detected data associated with the object (block 1502). In some examples, the merger control system 1100 of FIG. 11 determines (e.g., via the sensor interface 1110 and/or the data analyzer 1114) the location of the first object of interest 156 based on at least a portion (e.g., GPS data or coordinates) of the sensor data 1126 and/or other appropriate detected data associated with the first object of interest 156. That is, in some examples (e.g., where the sensor(s) 150 include a GPS locator), the merger control system 1100 detects the first location via the sensor(s) 150.

The example method 1406 of FIG. 15 also includes storing the location in a database for subsequent identification of the object during an object removal process (block 1504). In some examples, the merger control system 1100 stores the determined location in connection with block 1502 in the database 1116 for subsequent removal of the first object of interest 156 during an example object removal process, for example, that occurs during and/or after the merger 102 completes processing all of the material 114. Additionally or alternatively, in some examples at block 1504, the merger control system 1100 provides the location to the network(s) 1120 for similar storage in an external database in communication with the network(s) 1120.

The example method 1406 of FIG. 15 also includes notifying a user of the object and/or the location via output device(s) (block 1506). In some examples, the merger control system 1100 of FIG. 11 notifies (e.g., via the user interface) a user (e.g., the driver of the vehicle 159) of the first object of interest 156 and/or the location thereof via the output device(s) 154, which enables the user to locate, retrieve, and/or otherwise remove the first object of interest 156 after merger operation is complete. That is, in such examples, merger control system 1100 controls the output device(s) 154 to notify the user of the first object of interest 156 and/or the location thereof.

In some examples, after the operation of block 1506, the example method 1406 of FIG. 15 returns to a calling function such as the example method 1400 of FIG. 14.

Although the example method 1406 is described in connection with the flowchart of FIG. 15, one or more other methods of implementing the example merger control system 1100 may alternatively be used. For example, the order of execution of the blocks 1502, 1504, 1506 may be changed, and/or at least some operations of the blocks 1502, 1504, 1506 described may be changed, eliminated, or combined.

FIG. 16 is a flowchart of another example method 1406 that may be executed to implement the example merger control system 1100 of FIG. 11 to facilitate removal of the object without interrupting operation of the merger and/or a harvesting machine. The example method 1406 of FIG. 14 can be implemented in any one or more of the controller 104 of FIG. 1, the merger 102 of FIGS. 1, 2, 8A, 8B, 8C, and 8D, the vehicle 159 of FIGS. 1 and 2, and/or the merger control system 1100 of FIG. 11. Example operations of blocks 1602, 1604, 1606 may be used to implement block 1406 of FIG. 14.

The example method 1406 of FIG. 16 begins by determining a location of the object based on detected data associated with the object (block 1602). In some examples, the merger control system 1100 of FIG. 11 determines (e.g., via the sensor interface 1110 and/or the data analyzer 1114) the location of the first object of interest 156 based on at least a portion (e.g., GPS data or coordinates) of the sensor data 1126 and/or other appropriate detected data associated with the first object of interest 156. That is, in some examples (e.g., where the sensor(s) 150 include a GPS locator), the merger control system 1100 detects the first location via the sensor(s) 150.

The example method 1406 of FIG. 16 also includes determining, based on the location, adjustment(s) for actuator(s) operatively coupled to an extractor of the merger (block 1604). In some examples, the merger control system 1100 determines (e.g., via the data analyzer 1114), based on the detected location in connection with block 1404 of FIG. 14, one or more adjustments for any one or more of the respective first, second, third, and/or fourth one(s) of the extractor actuator(s) 112, each of which is operatively coupled to the object extractor 900 of the merger 102, as previously mentioned.

The example method 1406 of FIG. 16 also includes executing the adjustment(s) to separate the object from the material (block 1606). In some examples, the merger control system 1100 of FIG. 11 executes (e.g., via the extractor interface 1108) the determined adjustment(s) in connection with block 1604 to separate the first object of interest 156 from the material 114. That is, in such examples, the merger control system 1100 adjusts any one or more of the first, second, third, and/or fourth one(s) of the extractor actuator(s) 112 based on the adjustment(s), for example, to separate the first object of interest 156 from the material 114. In such examples, as result of the merger control system 1100 executing the adjustment(s), the object extraction device 908 grabs the first object of interest 156 (e.g., see FIG. 9) when the first object of interest 156 is on a portion (e.g., one of the belts 306, 308, 800, 802, 804, 806) of the conveyor 134 or being ejected therefrom and carries the object of interest 156 away from a nearby portion of the material 114.

The example method 1406 of FIG. 16 also includes executing the adjustment(s) to dispose the object in a receptacle coupled to the merger (block 1608). In some examples, the merger control system 1100 of FIG. 11 executes (e.g., via the extractor interface 1108) the determined adjustment(s) in connection with block 1604 to dispose the first object of interest 156 in the receptacle 1000. That is, in such examples, the merger control system 1100 adjusts any one or more of the first, second, third, and/or fourth one(s) of the extractor actuator(s) 112 to remove the first object of interest 156 (e.g., see FIG. 10).

In some examples, after the operation of block 1608, control of the example method 1406 returns to a calling function such as the example method 1400 of FIG. 14.

Although the example method 1406 is described in connection with the flowchart of FIG. 16, one or more other methods of implementing the example merger control system 1100 may alternatively be used. For example, the order of execution of the blocks 1602, 1604, 1606, 1608 may be changed, and/or at least some operations of the blocks 1602, 1604, 1606, 1608 described may be changed, eliminated, or combined.

Figure 17:
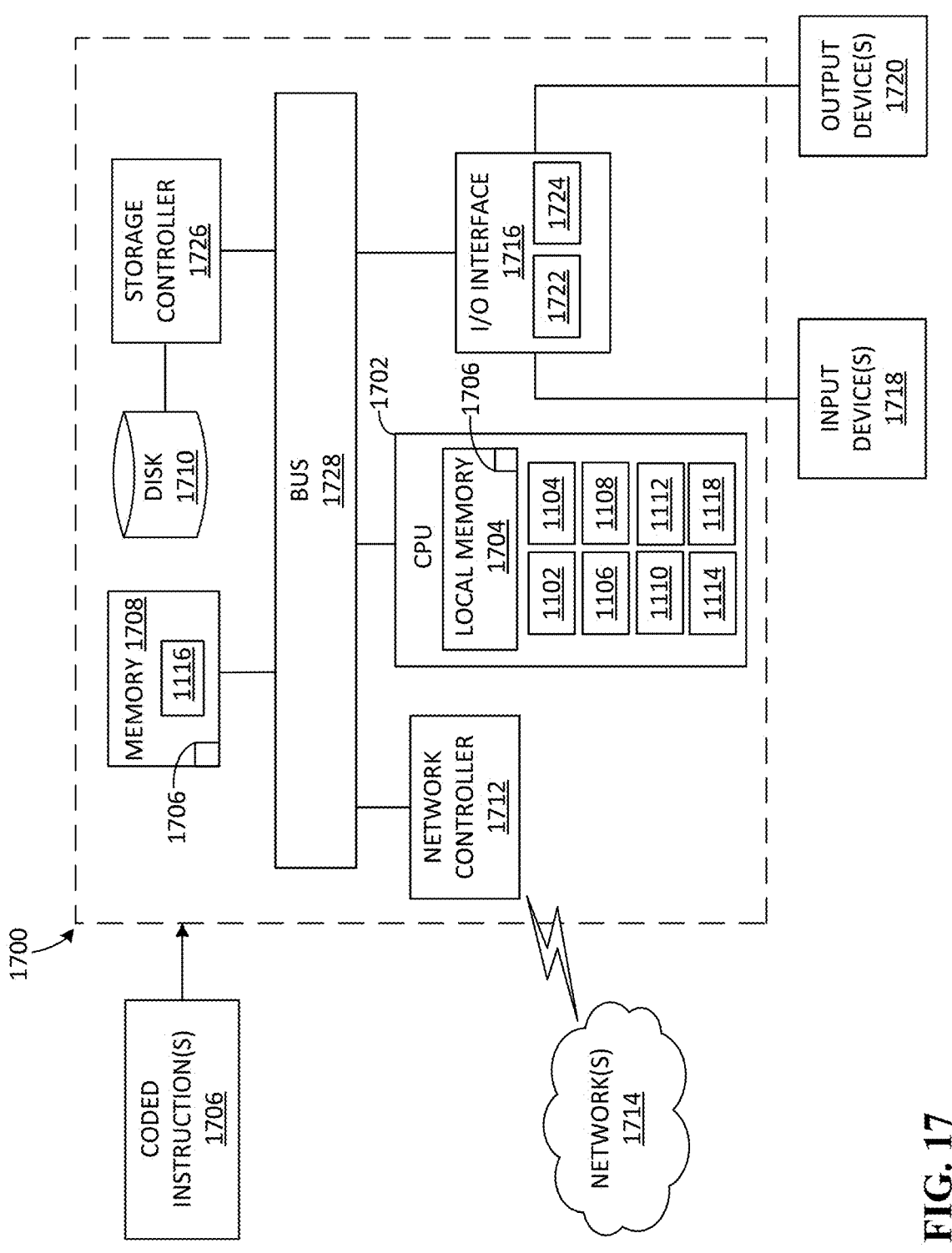
FIG. 17 is a block diagram of an example processor platform structured to execute instructions to carry out the methods of FIGS. 12-16 and/or, more generally, to implement the merger control system of FIG. 11.

FIG. 17 is a block diagram of an example processor platform 1700 structured to execute instructions to carry out the methods of FIGS. 12-16 and/or, more generally, to implement the merger control system 1100 of FIG. 11. For example, the processor platform 1700 can be a personal computer, a server, a mobile device (e.g., a cell phone, a smart phone, a tablet, etc.) or any other type of computing device. According to the illustrated example of FIG. 17, the processor platform 1700 includes a central processing unit (CPU) 1702 (sometimes referred to as a processor), which is hardware (e.g., one or more integrated circuits, logic circuits, microprocessors, etc.). The CPU 1702 of FIG. 17 includes a local memory 1704 such as, for example, a cache. According to the illustrated example of FIG. 17, the CPU 1702 implements the example pickup interface 1102, the example conveyor interface 1104, the example wind guard interface 1106, the example extractor interface 1108, the example sensor interface 1110, the example user interface 1112, the example data analyzer 1114, and the example network interface 1118.

Coded instruction(s) 1706 to implement the methods of FIGS. 12-16 may be stored in a main memory 1708 of the processing platform 1700. The memory 1708 may include a volatile memory (e.g., random access memory device(s) such as Dynamic Random Access Memory (DRAM)) and a non-volatile memory (e.g., flash memory). Such processes and/or instructions may also be stored on a storage medium disk 1710 associated with the processor platform 1700, such as a hard drive (HDD) or portable storage medium, or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the processing platform 1700 communicates, such as a server or computer for example.

Further, the claimed advancements may be provided as a utility application, background daemon, or component of an operating system, or combination thereof, executing in conjunction with the CPU 1702 and an operating system such as, for example, Microsoft Windows 7, Microsoft Windows 10, UNIX, Solaris, LINUX, Apple MAC-OS or any other system(s) known to those skilled in the art.

The hardware elements in order to achieve the processing platform 1700 may be realized by various circuitry elements, known to those skilled in the art. For example, the CPU 1702 may be a Xenon or Core processor from Intel of America or an Opteron processor from AMD of America, or may be other processor types that would be recognized by one of ordinary skill in the art. Alternatively, the CPU 1702 may be implemented on an FPGA, ASIC, PLD or using discrete logic circuits, as one of ordinary skill in the art would recognize. Further, the CPU 1702 may be implemented as multiple processors cooperatively working in parallel to perform the instructions of the inventive processes described above.

In some examples, the processor platform 1700 of FIG. 17 also includes a network controller 1712 such as, for example, an Intel Ethernet PRO network interface card from Intel Corporation of America for interfacing with one or more networks 1714. As can be appreciated, the network(s) 1714 can be one or more public networks (e.g., the Internet), private networks (e.g., a local area network (LAN), a wide area network (WAN), etc.) and/or sub-networks (e.g., a public switched telephone network (PSTN), an integrated services digital network (ISDN), etc.). The network(s) 1714 can also be wired, such as an Ethernet network, or can be wireless such as a cellular network including EDGE, 3G and 4G wireless cellular systems. The wireless network can also be WiFi, Bluetooth, or any other wireless form of communication that is known.

The processing platform 1700 of FIG. 17 includes a general purpose I/O interface circuit 1716 that interfaces and/or otherwise communicates with one or more input devices 1718 and/or one or more output devices 1720. The I/O interface circuit 1716 of FIG. 17 may be implemented as an Ethernet interface, a universal serial bus (USB), a PCI express interface, and/or any other type of standard interface.

The input devices 1718 are connected to the I/O interface 1716 and may include, for example, a keyboard, a mouse, a touchscreen, a button, a microphone, a voice recognition system, a camera, and/or any other suitable device(s) for enabling a user to input data and/or commands to the CPU 1702.

The output device(s) 1720 are also connected to the I/O interface circuit 1716 and may include display devices such as, for example, a light-emitting diode (LED), a liquid crystal display, a touchscreen, a printer, a scanner (e.g., an OfficeJet or DeskJet from Hewlett Packard), a speaker, and/or any other device(s) for providing or presenting information (e.g., visual information and/or audible information) to a user. As such, in some examples, the I/O interface circuit

1716 includes a display controller 1722 such as, for example, a NVIDIA GeForce GTX or Quadro graphics adaptor from NVIDIA Corporation of America for interfacing with a display (e.g., a Hewlett Packard HPL2445w LCD monitor). Additionally, in some examples, the I/O interface circuit includes a sound controller 1724 such as, for example, Sound Blaster X-Fi Titanium from Creative, to interface with a speaker and/or a microphone.

The processor platform 1700 of FIG. 17 also includes a general purpose storage controller 1726 that connects the storage medium disk 1710 with a communication bus 1728. The storage controller 1726 may also control access to the memory 1708. The communication bus 1728 of FIG. 17 may be an ISA, EISA, VESA, PCI, etc. for interconnecting all of the components of the processor platform 1700. For example, the CPU 1702 communicates with the main memory 1708 via the bus 1728.

It will be appreciated that the systems, apparatus, and methods for use with mergers disclosed in the foregoing description provide numerous advantages. Examples disclosed herein advantageously distribute a material relative to a conveyor of a merger when the merger is processing the material, which improves conveyor efficiency. Additionally or alternatively, examples disclosed herein enable the removal of detected objects from the material without interrupting operation of the merger and/or a harvesting machine, which reduces and/or eliminates downtime typically associated with such material processing systems.

Although certain example systems, apparatus, methods, and articles of manufacture have been disclosed herein, the scope of coverage of this patent is not limited thereto. Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

What is claimed is:

1. An agricultural machine comprising:
a pickup configured to pick up material from a ground, the pickup including extraction members rotating relative to a first axis;
a conveyor configured to eject the material provided thereon by the pickup, the conveyor including a belt moving in a direction parallel to the first axis;
a wind guard configured to change a trajectory of the material from the pickup to the conveyor, the wind guard including a material guiding member positioned near the extraction members and having a surface configured to engage the material when the extraction members convey the material to the conveyor;
a wind guard actuator operatively coupled to the wind guard;
a controller configured to control the wind guard actuator to adjust a position of the wind guard to adjust a distribution of the material relative to the conveyor; and a sensor configured to detect a parameter associated with the material, wherein the controller is configured to control the wind guard actuator based on the parameter, and wherein the controller is configured to control a speed of the belt based on the parameter.

2. An agricultural machine comprising:

a pickup configured to pick up material from a ground, the pickup including extraction members rotating relative to a first axis;

a conveyor configured to eject the material provided thereon by the pickup, the conveyor including a belt moving in a direction parallel to the first axis;

a wind guard configured to change a trajectory of the material from the pickup to the conveyor, the wind guard including a material guiding member positioned near the extraction members and having a surface configured to engage the material when the extraction members convey the material to the conveyor;

a wind guard actuator operatively coupled to the wind guard;

a controller configured to control the wind guard actuator to adjust a position of the wind guard to adjust a distribution of the material relative to the conveyor; and a sensor configured to detect a parameter associated with the material, wherein the controller is configured to control the wind guard actuator based on the parameter, and wherein the controller is configured to control a speed of the pickup based on the parameter.

3. The agricultural machine of claim 1, wherein the sensor is positioned at an end of the conveyor or near an end of the conveyor from which the material is to be ejected.

4. The agricultural machine of claim 1, wherein the wind guard includes a support structure that supports the material guiding member.

5. The agricultural machine of claim 1, wherein the agricultural machine is a merger.

6. The agricultural machine of claim 1, wherein the controller is configured to:

determine, based on the parameter, an instruction associated with harvesting the material, and notify a user of the instruction via an output device.

7. An agricultural machine comprising:

a pickup configured to pick up material from a ground, the pickup including extraction members rotating relative to a first axis;

a conveyor configured to eject the material provided thereon by the pickup, the conveyor including a belt moving in a direction parallel to the first axis;

a wind guard configured to change a trajectory of the material from the pickup to the conveyor, the wind guard including a material guiding member positioned near the extraction members and having a surface configured to engage the material when the extraction members convey the material to the conveyor;

a wind guard actuator operatively coupled to the wind guard;

a controller configured to control the wind guard actuator to adjust a position of the wind guard to adjust a distribution of the material relative to the conveyor; and a sensor configured to detect a parameter associated with the material, wherein the controller is configured to control the wind guard actuator based on the parameter, and wherein the parameter includes a shape or a moisture content of the material when the material is on the conveyor or ejected from the conveyor.

8. An agricultural machine comprising:

a pickup configured to pick up material from a ground, the pickup including extraction members rotating relative to a first axis;

a conveyor configured to eject the material provided thereon by the pickup, the conveyor including a belt moving in a direction parallel to the first axis;

a wind guard configured to change a trajectory of the material from the pickup to the conveyor, the wind guard including a material guiding member positioned near the extraction members and having a surface configured to engage the material when the extraction members convey the material to the conveyor;

a wind guard actuator operatively coupled to the wind guard;

a controller configured to control the wind guard actuator to adjust a position of the wind guard to adjust a distribution of the material relative to the conveyor; and a sensor configured to detect a parameter associated with the material, wherein the controller is configured to control the wind guard actuator based on the parameter, and wherein the parameter includes a position or a location of the material when the material is on the conveyor or ejected from the conveyor.

9. The agricultural machine of claim 1, wherein the surface of the material guiding member is curved.

10. The agricultural machine of claim 7, wherein the controller is configured to:

determine, based on the parameter, an instruction associated with harvesting the material, and notify a user of the instruction via an output device.

11. The agricultural machine of claim 8, wherein the controller is configured to:

determine, based on the parameter, an instruction associated with harvesting the material, and notify a user of the instruction via an output device.

* * * * *